US 8,200,663 B2

(12) United States Patent
Jones et al.

(10) Patent No.: US 8,200,663 B2
(45) Date of Patent: Jun. 12, 2012

(54) METHOD AND SYSTEM FOR IMPROVEMENT OF RELEVANCE OF SEARCH RESULTS

(75) Inventors: Scott A. Jones, Carmel, IN (US); Thomas E. Cooper, Indianapolis, IN (US)

(73) Assignee: ChaCha Search, Inc., Carmel, IN (US)

( * ) Notice: Subject to any disclaimer, the term of this patent is extended or adjusted under 35 U.S.C. 154(b) by 665 days.

(21) Appl. No.: 12/109,776

(22) Filed: Apr. 25, 2008

(65) Prior Publication Data
US 2008/0270389 A1 Oct. 30, 2008

Related U.S. Application Data

(60) Provisional application No. 60/913,944, filed on Apr. 25, 2007, provisional application No. 60/980,049, filed on Oct. 15, 2007, provisional application No. 60/979,565, filed on Oct. 12, 2007, provisional application No. 60/980,010, filed on Oct. 15, 2007.

(51) Int. Cl.
*G06F 17/30* (2006.01)
(52) U.S. Cl. ........ 707/723; 707/711; 707/733; 709/203; 705/12; 705/14.4
(58) Field of Classification Search .................. 707/723, 707/711, 733, 805; 705/12, 319, 7.29, 14.4; 709/203; 715/758
See application file for complete search history.

(56) References Cited

U.S. PATENT DOCUMENTS

| 5,559,940 | A | 9/1996 | Hutson |
| 5,583,763 | A | 12/1996 | Atcheson |
| 5,732,259 | A | 3/1998 | Konno |
| 5,862,223 | A | 1/1999 | Walker |
| 5,867,799 | A | 2/1999 | Lang |
| 5,875,231 | A | 2/1999 | Farfan et al. |
| 5,884,282 | A | 3/1999 | Robinson |
| 5,915,010 | A | 6/1999 | McCalmont |
| 5,991,735 | A | 11/1999 | Gerace |
| 6,026,148 | A | 2/2000 | Dworkin |
| 6,101,515 | A | 8/2000 | Wical et al. |
| 6,115,709 | A | 9/2000 | Gilmour |
| 6,134,532 | A | 10/2000 | Lazarus |

(Continued)

FOREIGN PATENT DOCUMENTS
WO WO/2007/052285 A2 5/2007

OTHER PUBLICATIONS

International Search Report mailed on Aug. 20, 2008 and issued in PCT/US 08/61605.

(Continued)

*Primary Examiner* — Cheryl Lewis

(57) ABSTRACT

A system and method for improving the relevance of search results is disclosed. Voters who may be human searchers or guides may review search results or other review items associated with a search request or other reference item. A review may be activated based on a usage indicator(s) which may improve utilization of guides. A vote by a voter may be weighted based on a voting history associated with the voter and one or more reference voters who may be designated by the system. A voter may be presented with a group of items for review including simultaneously. A number of comparison voting sessions or elections may be used to determine a rating or ranking of a review item associated with a reference item.

46 Claims, 34 Drawing Sheets

U.S. PATENT DOCUMENTS

| | | |
|---|---|---|
| 6,205,472 B1 | 3/2001 | Gilmour |
| 6,236,978 B1 | 5/2001 | Tuzhilin |
| 6,253,202 B1 | 6/2001 | Gilmour |
| 6,289,353 B1 | 9/2001 | Hazlehurst |
| 6,308,175 B1 | 10/2001 | Lang |
| 6,314,420 B1 | 11/2001 | Lang |
| 6,327,590 B1 | 12/2001 | Chidlovskii |
| 6,377,949 B1 | 4/2002 | Gilmour |
| 6,393,423 B1 | 5/2002 | Goedken |
| 6,405,197 B2 | 6/2002 | Gilmour |
| 6,421,669 B1 | 7/2002 | Gilmour |
| 6,434,549 B1 | 8/2002 | Linetsky |
| 6,460,036 B1 | 10/2002 | Herz |
| 6,505,166 B1 | 1/2003 | Stephanou |
| 6,507,821 B1 | 1/2003 | Stephanou |
| 6,507,841 B2 | 1/2003 | Rivereiulx de Varax |
| 6,513,013 B1 | 1/2003 | Stephanou |
| 6,523,010 B2 | 2/2003 | Lauffer |
| 6,526,404 B1 | 2/2003 | Slater |
| 6,539,377 B1 | 3/2003 | Culliss |
| 6,578,010 B1 | 6/2003 | Teacherson |
| 6,578,022 B1 | 6/2003 | Foulger et al. |
| 6,640,229 B1 | 10/2003 | Gilmour |
| 6,647,383 B1 | 11/2003 | August et al. |
| 6,647,384 B2 | 11/2003 | Gilmour |
| 6,662,177 B1 | 12/2003 | Martino |
| 6,675,159 B1 | 1/2004 | Lin et al. |
| 6,801,899 B2 | 10/2004 | Lauffer |
| 6,832,218 B1 | 12/2004 | Emens |
| 6,877,034 B1 | 4/2005 | Machin et al. |
| 6,895,406 B2 | 5/2005 | Fables et al. |
| 6,901,394 B2 | 5/2005 | Chauhan |
| 6,952,678 B2 | 10/2005 | Williams et al. |
| 6,970,879 B1 | 11/2005 | Gilmour |
| 6,993,496 B2 | 1/2006 | Pittelli |
| 7,062,510 B1 | 6/2006 | Eldering |
| 7,085,771 B2 | 8/2006 | Chung et al. |
| 7,120,647 B2 | 10/2006 | Venkatesh |
| 7,162,433 B1 | 1/2007 | Foroutan |
| 7,162,522 B2 | 1/2007 | Adar |
| 7,165,119 B2 | 1/2007 | Fish |
| 7,167,855 B1 | 1/2007 | Koenig |
| 7,203,725 B1 | 4/2007 | Gilmour |
| 7,249,045 B2 | 7/2007 | Lauffer |
| 7,287,021 B2 | 10/2007 | De Smet |
| 7,483,894 B2 | 1/2009 | Cao |
| 7,676,034 B1 | 3/2010 | Wu |
| 7,793,326 B2 | 9/2010 | McCoskey |
| 2002/0024532 A1 | 2/2002 | Fables |
| 2002/0087520 A1 | 7/2002 | Meyers |
| 2002/0111934 A1 | 8/2002 | Narayan |
| 2002/0120619 A1 | 8/2002 | Marso et al. |
| 2002/0140715 A1 | 10/2002 | deSmet |
| 2002/0167539 A1 | 11/2002 | Brown et al. |
| 2003/0028451 A1 | 2/2003 | Ananian |
| 2003/0046098 A1 | 3/2003 | Kim |
| 2003/0061092 A1* | 3/2003 | Dutta et al. .................... 705/12 |
| 2003/0088554 A1 | 5/2003 | Ryan |
| 2003/0120653 A1 | 6/2003 | Brady et al. |
| 2003/0140037 A1 | 7/2003 | Deh-Lee |
| 2003/0145001 A1 | 7/2003 | Craig et al. |
| 2003/0174818 A1 | 9/2003 | Hazenfield |
| 2003/0198325 A1 | 10/2003 | Bayne |
| 2003/0217335 A1 | 11/2003 | Chung et al. |
| 2004/0010484 A1 | 1/2004 | Foulger et al. |
| 2004/0023644 A1 | 2/2004 | Montemer |
| 2004/0024752 A1 | 2/2004 | Manber et al. |
| 2004/0030566 A1 | 2/2004 | Brooks Rix |
| 2004/0049541 A1 | 3/2004 | Swahn |
| 2004/0064351 A1 | 4/2004 | Mikurak |
| 2004/0088313 A1 | 5/2004 | Torres |
| 2004/0203634 A1 | 10/2004 | Wang et al. |
| 2004/0205065 A1 | 10/2004 | Petras |
| 2004/0210550 A1 | 10/2004 | Williams et al. |
| 2005/0033761 A1 | 2/2005 | Guttman et al. |
| 2005/0035199 A1* | 2/2005 | Goci et al. .................... 235/386 |
| 2005/0086290 A1 | 4/2005 | Joyce et al. |
| 2005/0097188 A1 | 5/2005 | Fish |
| 2005/0105712 A1 | 5/2005 | Williams et al. |
| 2005/0131866 A1 | 6/2005 | Badros |
| 2005/0136949 A1 | 6/2005 | Barnes, Jr. |
| 2005/0160107 A1 | 7/2005 | Liang |
| 2005/0165780 A1 | 7/2005 | Omega et al. |
| 2005/0210042 A1 | 9/2005 | Goedken |
| 2005/0240580 A1 | 10/2005 | Zamir |
| 2005/0256848 A1 | 11/2005 | Alpert et al. |
| 2005/0289124 A1 | 12/2005 | Kaiser et al. |
| 2006/0010105 A1 | 1/2006 | Sarukkai et al. |
| 2006/0020593 A1 | 1/2006 | Ramsaier et al. |
| 2006/0042483 A1 | 3/2006 | Work |
| 2006/0047615 A1 | 3/2006 | Ravin |
| 2006/0074864 A1 | 4/2006 | Naam |
| 2006/0074890 A1 | 4/2006 | Sundharam |
| 2006/0129536 A1 | 6/2006 | Foulger et al. |
| 2006/0136589 A1 | 6/2006 | Konig |
| 2006/0155693 A1 | 7/2006 | Chowdhury |
| 2006/0224442 A1* | 10/2006 | Round et al. .................... 705/12 |
| 2006/0287878 A1 | 12/2006 | Wadhwa |
| 2006/0288087 A1 | 12/2006 | Sun |
| 2006/0294085 A1 | 12/2006 | Rose |
| 2007/0005344 A1 | 1/2007 | Sandor et al. |
| 2007/0005698 A1 | 1/2007 | Kumar et al. |
| 2007/0014422 A1 | 1/2007 | Wesemann et al. |
| 2007/0014537 A1 | 1/2007 | Wesemann et al. |
| 2007/0016563 A1 | 1/2007 | Omoigui |
| 2007/0027859 A1 | 2/2007 | Harney et al. |
| 2007/0050388 A1 | 3/2007 | Martin |
| 2007/0067210 A1 | 3/2007 | Rishell et al. |
| 2007/0067297 A1 | 3/2007 | Kublickis |
| 2007/0081197 A1 | 4/2007 | Omoigui |
| 2007/0112761 A1 | 5/2007 | Xu |
| 2007/0112762 A1 | 5/2007 | Brubaker |
| 2007/0156677 A1 | 7/2007 | Szabo |
| 2007/0192166 A1 | 8/2007 | VanLuchene |
| 2007/0192277 A1 | 8/2007 | Jackson |
| 2007/0192300 A1 | 8/2007 | Reuther |
| 2007/0204308 A1 | 8/2007 | Nicholas |
| 2007/0233552 A1* | 10/2007 | Maggio .................... 705/12 |
| 2009/0024457 A1* | 1/2009 | Foroutan .................... 705/12 |
| 2009/0037255 A1 | 2/2009 | Chiu |

OTHER PUBLICATIONS

International Search Report issued Jan. 28, 2008 in PCT/US07/75369.

International Search Report issued Feb. 12, 2008 in PCT/US07/60467.

International Search Report issued Feb. 27, 2008 in PCT/US07/60459.

International Search Report issued Feb. 15, 2008 in PCT/US07/60468.

International Search Report issued Feb. 7, 2008 in PCT/US07/60472.

Carmel et al., "Searching XML Documents via XML Fragments," 2003, ACM, pp. 151-158.

Karat et al., "Patterns of Entry and Correction in Large Vocabulary Continuous Speech Recognition Systems," 1999, ACM, pp. 568-575.

Google Tutor, "Googling from your Mobile Phone-no Web Browser Needed!," 2005, Google Tour.

Varshney et al., "Voice Over IP," 2002, Communications of the ACM, vol. 45, No. 1, pp. 89-96.

Knoblock, Craig A., "Searching the World Wide Web," 1997, IEEE Expert, pp. 8-14.

Sullivan, Danny, "Google Launches Personalized Home Page," Search Engine Watch, May 2005.

International Search Report mailed on Dec. 12, 2008 and issued in PCT/US08179733.

International Search Report mailed on Dec. 10, 2008 and issued in PCT/US08179973.

Non-Final Office Action mailed Dec. 8, 2010, U.S. Appl. No. 12/250,267, filed Oct. 13, 2008.

Non-Final Office Action mailed Feb. 23, 2011. U.S. Appl. No. 12/251,876, filed Oct. 15, 2008.

Final Office Action mailed May 10, 2011, U.S. Appl. No. 12/250,267, filed Oct. 13, 2008.
Final Office Action mailed Jul. 26, 2011, U.S. Appl. No. 12/251,876, filed Oct. 15, 2008.

Lin et al. "Automatic Information Discovery form the 'Invisible Web'" International Conference on Information Technology, Apr. 10, 2002; pp. 332-337.

* cited by examiner

450

REQUEST RECORD 800

| | Description | Example Content |
|---|---|---|
| 805 | Request ID | 'Request1' |
| 810 | Request content | 'What is the best Thai restaurant in Indy?' |
| 815 | Request user ID | 'User1';'User2' |
| 820 | Request guide ID | 'Guide1';'Guide2' |
| 825 | Request category ID | 'Category1';'Category2' |
| 830 | Request profile ID | 'Profile1' |
| 835 | Request result ID | 'Result1.1';'Result1.2';'Result1.3';...... |
| 840 | Request result rank | '1';'3';'4';..... |
| 845 | Request advertisement ID | 'Advert1';'Advert4';'Advert2';..... |
| 850 | Request advertisement rank | '3';'1';'5';.... |
| 855 | Request usage info | 'use counter = 20' |

FIG. 8

GUIDE RECORD 900

| | Description | Example Content |
|---|---|---|
| 905 | Guide ID | 'Guide1' |
| 910 | Guide category ID | 'Category1';'Category3' |
| 915 | Guide topic ID | Topic1.1='reggie miller';Topic1.2='basketball';Topic3.1='fishing' |
| 920 | Guide profile ID | 'Demoprofileg1';'Geoprofileg1';'Persprofileg1' |
| 925 | Guide result ID | 'Result1.1';'Result3.1';'Result3.2' |
| 930 | Guide communication info | guidecomg1typ1='guide1'; guidecomg1typ2='guide1@chacha.com'; guidecomg1typ3='guide1@AIM'; guidecomg1typ4='317.224.2242'; |
| 935 | Guide request ID | 'Request1';'Request3';........ |

USER RECORD

| | Description | Example Content |
|---|---|---|
| 1005 | User ID | 'User1' |
| 1010 | User profile ID | 'DemoprofileU1';'GeoprofileU1';'PersprofileU1' |
| 1015 | User request ID | 'Request1';'Request2' |
| 1020 | User result ID | 'Result1.1';'Result1.2';'Result2.1'; |
| 1025 | User advertisement ID | 'Advert1';'Advert2' |
| 1030 | User communication info | usercomu1typ1='user1'; usercomu1typ2='user1@chacha.com'; usercomu1typ3='twitter:user1'; usercomu1typ4='317.924.2242'; |

FIG. 10

PROFILE RECORD 1100

| | Description | Example Content |
|---|---|---|
| 1105 | Profile ID | 'Profile1' |
| 1110 | Profile geographic info | 'Indiana' |
| 1115 | Profile demographic info | 'under30'AND'over20' |
| 1120 | Profile personality info | 'Foodie' |
| 1125 | Profile guide ID | 'Guide1','Guide3','Guide2','Guide4','Guide5',... |
| 1130 | Profile guide rating | '2','2','1','3','3',... |

FIG. 11

CATEGORY RECORD

1200

| | Description | Example Content |
|---|---|---|
| 1205 | Category ID | 'Category1' |
| 1210 | Category description | 'Entertainment>Dining' |
| 1215 | Category guide ID | 'Guide1','Guide2',.....'GuideN' |
| 1220 | Category guide rating | '10','6',.....'2' |
| 1225 | Category resource ID | 'Resource1','Resource2',.....'ResourceN' |
| 1230 | Category resource rating | '8','8.5',.....'3' |
| 1235 | Category advertisement ID | 'Advert1','Advert2',.......'AdvertN' |
| 1240 | Category advertisement rating | '1','3',.....'9' |

FIG. 12

RESULT RECORD 1300

| | Description | Example Content |
|---|---|---|
| 1305 | Result ID | 'Result1.1' |
| 1310 | Result guide ID | 'Guide1' |
| 1315 | Result content info | 'Thai sensations is the best Thai restaurant in Indy' |
| 1320 | Result resource ID | 'Resource2' |
| 1325 | Result usage information | 'use counter = 120' |

FIG. 13

RESOURCE RECORD 1400

| | Description | Example Content |
|---|---|---|
| 1405 | Resource ID | 'Resource2' |
| 1410 | Resource guide ID | 'Guide1' |
| 1415 | Resource description | 'Dining in Indiana' |
| 1420 | Resource access info | 'www.diningindy.com' |
| 1425 | Resource usage information | 'use counter = 180' |

FIG. 14

1500 ADVERTISEMENT RECORD

| | Description | Example Content |
|---|---|---|
| 1505 | Advertisement ID | 'Advert1' |
| 1510 | Advertisement description | 'Gokimchee the asian grocery in fishers' |
| 1515 | Advertisement access info | 'https://adserver.chacha.com|gokimchee' |
| 1520 | Advertisement usage information | 'use counter = 180' |

FIG. 15

| Guide ID | Rank | Notification indicator | Availability indicator |
|---|---|---|---|
| Guide1 | 1 | No | No |
| Guide3 | 2 | No | Yes |
| Guide2 | 3 | No | Yes |
| Guide4 | 4 | No | No |
| . | . | , | . |
| GuideN | N | No | Yes |
| Notification table ID | | 'Review1Request2' | |

Time = t1

| Guide ID | Rank | Notification indicator | Availability indicator |
|---|---|---|---|
| Guide1 | 1 | No | No |
| Guide3 | 2 | Yes | Yes |
| Guide2 | 3 | Yes | Yes |
| Guide4 | 4 | No | No |
| . | . | , | . |
| GuideN | . | No | Yes |
| Notification table ID | | 'Review1Request2' | |

Time = t2

| Guide ID | Rank | Notification indicator | Availability indicator |
|---|---|---|---|
| Guide1 | 1 | Yes | Yes |
| Guide3 | 2 | Yes | Yes |
| Guide2 | 3 | Yes | No |
| Guide4 | 4 | No | No |
| . | . | , | . |
| GuideN | N | No | Yes |
| Notification table ID | | 'Review1Request2' | |

Time = t3

| Guide ID | Rank | Notification indicator | Availability indicator |
|---|---|---|---|
| Guide1 | 1 | Yes | Yes |
| Guide3 | 2 | Yes | Yes |
| Guide2 | 3 | Yes | No |
| Guide4 | 4 | No | No |
| . | . | , | . |
| GuideN | N | Yes | Yes |
| Notification table ID | | 'Review1Request2' | |

Time = t4

| Guide ID | Rank | Notification indicator | Availability indicator |
|---|---|---|---|
| Guide0 | 1 | No | Yes |
| Guide1 | 2 | Yes | Yes |
| Guide2 | 3 | Yes | Yes |
| Guide5 | 4 | No | Yes |
| Guide3 | 5 | Yes | Yes |
| Guide4 | 6 | No | Yes |
| . | . | . | . |
| . | . | . | . |
| . | . | . | . |
| . | . | . | . |
| GuideN | M | Yes | Yes |
| Notification table ID | | 'Review2Request2' | |

Time = t5

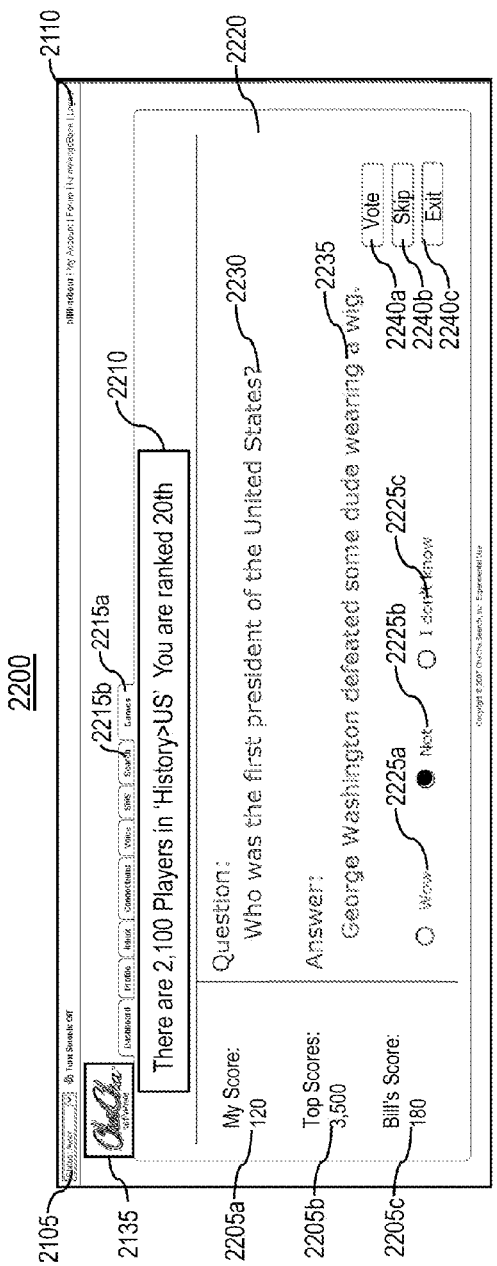
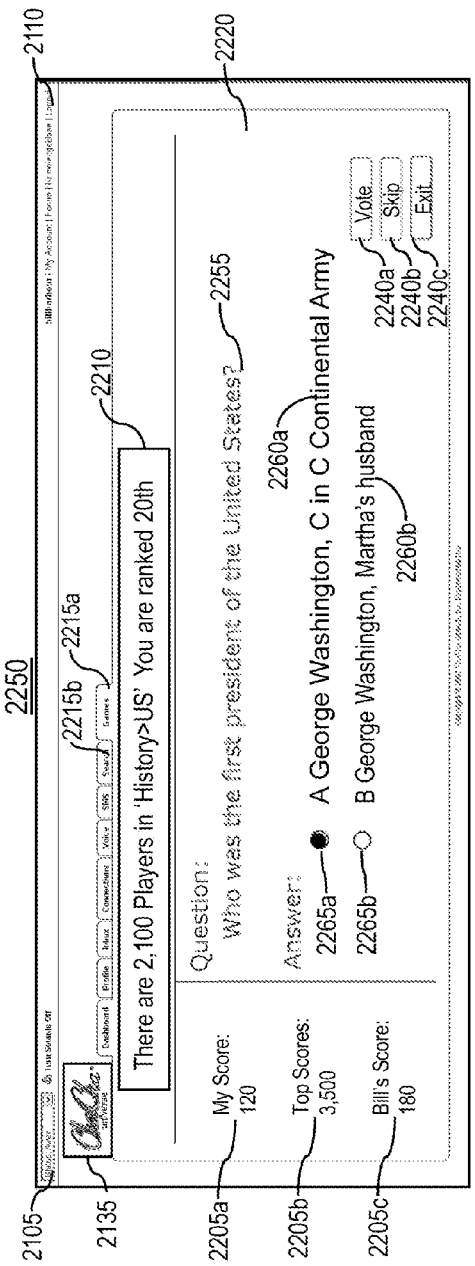
FIG. 20A
FIG. 20B

METHOD AND SYSTEM FOR IMPROVEMENT OF RELEVANCE OF SEARCH RESULTS

CROSS-REFERENCE TO RELATED APPLICATIONS

This application is related to and claims the benefit of the following U.S. Provisional and U.S. patent applications, each of which are incorporated herein by reference in its entirety: U.S. Provisional Application Ser. No. 60/913,944 entitled "KNOWLEDGE VETTING SYSTEM AND METHOD FOR SEARCH RESULTS", by Scott A. Jones et al., filed Apr. 25, 2007, U.S. Provisional Patent Application, Ser. No. 60/980,049 entitled, "METHOD AND SYSTEM FOR IMPROVEMENT OF RELEVANCE OF SEARCH RESULTS", by Scott A. Jones, et. al., filed Oct. 15, 2007, U.S. application Ser. No. 11/336,928, allowed, entitled "A SCALABLE SEARCH SYSTEM USING HUMAN SEARCHERS", by Scott A. Jones, filed Jan. 23, 2006, U.S. application Ser. No. 11/779,502, entitled "ANONYMOUS SEARCH SYSTEM USING HUMAN SEARCHERS", by Scott A. Jones, et al., filed Jul. 18, 2007, U.S. application Ser. No. 11/780,297, entitled "METHOD, SYSTEM, AND COMPUTER READABLE STORAGE FOR PODCASTING AND VIDEO TRAINING IN AN INFORMATION SEARCH SYSTEM", by Scott A. Jones, et al., filed Jul. 19, 2007, U.S. patent application Ser. No. 11/774,852, Pat. No. 7,792,967, entitled "METHOD AND SYSTEM FOR SHARING AND ACCESSING RESOURCES", by Scott A. Jones, et al., filed Jul. 9, 2007, U.S. patent application Ser. No. 11/835,016, Pat. No. 8,024,308, entitled "ELECTRONIC PREVIOUS SEARCH RESULTS LOG", by Scott A. Jones, et al., filed Aug. 7, 2007, U.S. patent application, Ser. No. 11/834,911, Pat. No. 7,801,879, entitled, "METHOD, SYSTEM, AND COMPUTER READABLE STORAGE FOR AFFILIATE GROUP SEARCHING", by Scott A. Jones, et. al., filed Aug. 7, 2007, U.S. Provisional Application Ser. No. 60/979,565, entitled METHOD AND SYSTEM FOR CREATION OF USER/GUIDE PROFILE IN A HUMAN-AIDED SEARCH SYSTEM, filed Oct. 12, 2007, and U.S. Provisional Application Ser. No. 60/980,010 entitled METHOD AND SYSTEM FOR MATCHING INFORMATION SEEKERS AND SEARCHERS, filed Oct. 15, 2007, in the United States Patent and Trademark Office, the disclosures of which are incorporated herein by reference.

BACKGROUND

1. Field of the Invention

The present invention is related to search engine technologies and more specifically to human-assisted search engines. A method and system for improving the relevance of search results is disclosed.

2. Description of the Related Art

In general search engines are keyword driven systems. Keywords are generated from a user request and matched to target documents, advertisements, etc. This practice is generally established by such services as Google® or Dogpile®. The use of keywords allows a search engine to produce relevant documents by using various methods of ranking documents, etc. An algorithm is applied to the content of each document and a ranking is assigned. When a query is entered by a user, the search system analyzes the query to extract keywords contained in the query and presents documents in an order related to the ranking.

In the case of an automated search, the algorithm used to determine relevance may be generalized in order to search various types of documents. The algorithm used is designed to approximate human judgment. Such systems have enjoyed commercial success.

However these systems have weaknesses. For example, a more specific query may not produce a more specific result. The number of keywords in a query will typically increase with the length of the query, and the relative strength of any keyword may decrease. Relevance of results may be affected by factors such as search engine optimization. If an algorithm for determining relevance is known, a website designer may optimize his or her website to improve the website ranking. Relevance is not a static property of a resource. Relevance may be affected by time and/or other factors which can not be deduced from keywords. A typical indexing strategy may be limited by the dynamic nature of sites, such as game playing sites, auction sites etc. Such resources may be easily accessible to a person, but are not easily indexed by a search engine.

In the case of a human-assisted search engine, human judgment may be used to determine the relevance of a result or resource. This technique is used by open directory projects such as DMOZ. Such systems are mainly constrained by the need to have a large number of human editors. For example, DMOZ had 75,000 editors, 500,000 categories, and 4,800,000 websites in its index.

In light of the above and other existing problems, a scalable method and system for producing relevant targeted search results responsive to a user request which is based on use of human judgment and intelligence would be greatly appreciated.

SUMMARY

A method and system are disclosed to improve the relevance of search results, search resources, advertisements, or other information to be presented to a user responsive to a search request. A method is disclosed for ranking items. Human judgment is used to rank the items with respect to a reference item(s). The order in which items such as search results are presented to a user may be affected by the ranking. A search result(s) ranked higher than algorithmically produced results may be displayed responsive to a search request(s).

Humans are used as voters. Guides or searchers may be presented with information of a reference item(s) and a review item(s) and may vote on the relevance of an item(s). Users or information seekers may be used as voters in at least one embodiment.

The method and system may be used to rank various types of information. For example, a response to a search request which is associated with a category and a location may be reviewed by voters who are associated with a profile which may be associated with a search request. Any combination of items might be used as a reference item(s) and/or a review item(s). For example, a category might be presented as a reference item, and a topic such as a person's name might be a review item, and voters might be selected based on an affiliation such as membership in a group.

In at least one embodiment, the votes cast by voters are weighted. For example, one group of voters might have a vote weight of three, while others might have a vote weight of one, and others might have a vote weight of zero. The weight of a voter's vote may be determined based on a voting history associated with the voter. A voter's vote weight may be assigned based on his voting pattern relative to one or more reference voters.

Various methods may be utilized to determine a ranking of an item based on voting. If an item is referenced frequently, the item may be reviewed more often than an item which is referenced infrequently. A review item(s) associated with a reference item may be identified to be ranked based on a number of times that a reference item has been used or presented, or on a number of review items which have been associated with reference item, or based on various other criteria.

Additional aspects and/or advantages will be set forth in part in the description which follows and, in part, will be apparent from the description, or may be learned by practice of the invention.

These together with other aspects and advantages which will be subsequently apparent, reside in the details of construction and operation as more fully hereinafter described, reference being had to the accompanying drawings forming a part hereof, wherein like numerals refer to like parts throughout.

BRIEF DESCRIPTION OF THE DRAWINGS

Aspects and advantages of the disclosure will become apparent and more readily appreciated from the following description of the embodiments, taken in conjunction with the accompanying drawings, of which:

FIG. 8 illustrates a database record for a request.

FIG. 9 illustrates a database record for a guide.

FIG. 10 illustrates a database record for a user.

FIG. 11 illustrates a database record for a profile.

FIG. 12 illustrates a database record for a category.

FIG. 13 illustrates a database record for a result.

FIG. 14 illustrates a database record for a resource.

FIG. 15 illustrates a database record for an advertisement.

FIG. 17A is a diagram illustrating a process of notification of reviewers.

FIGS. 18A-18G illustrate GUIs.

FIG. 20A-20C illustrate GUIs.

DETAILED DESCRIPTION OF THE PREFERRED EMBODIMENTS

Figure 1:
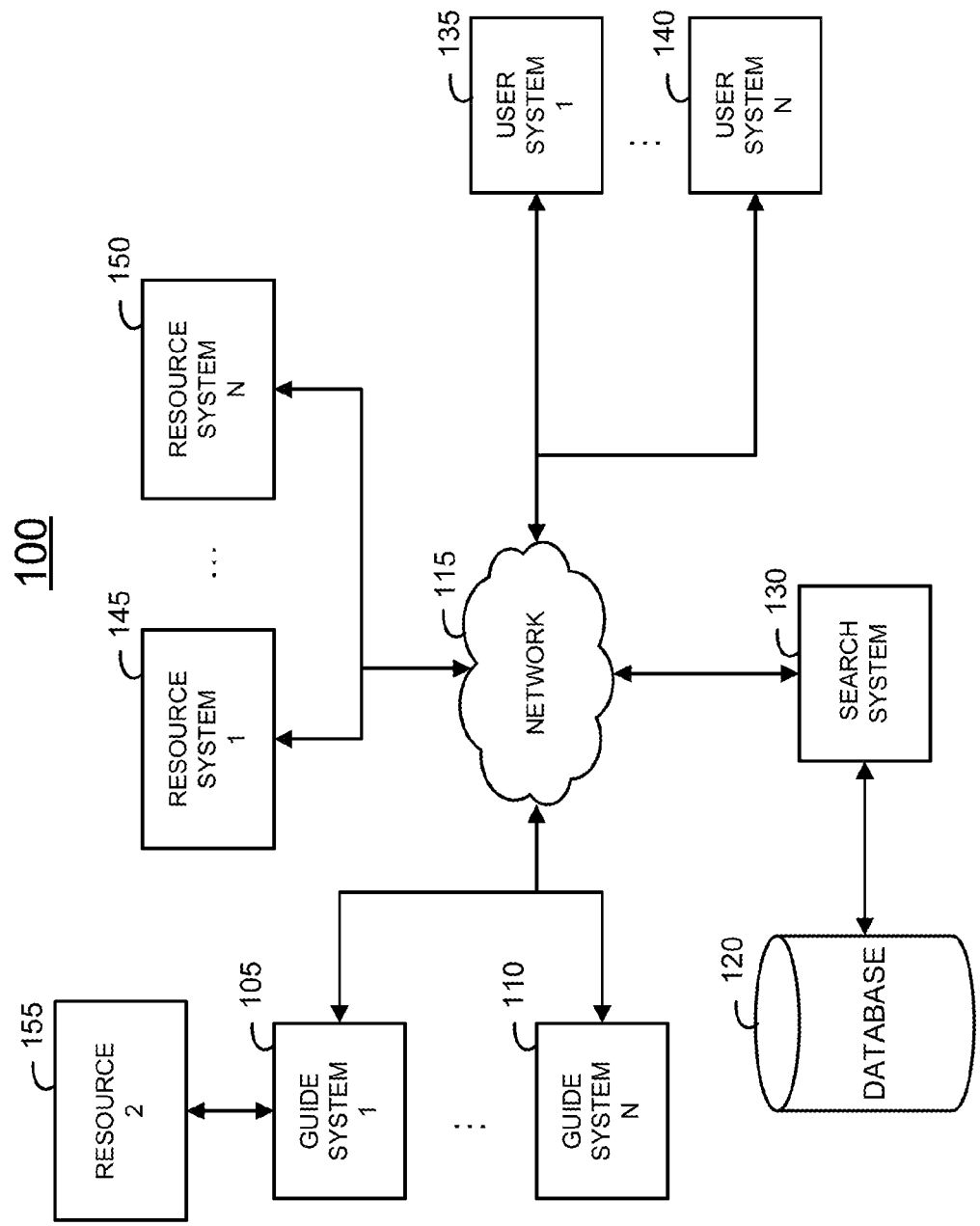
FIG. 1 is a block diagram of an exemplary system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

A system and method is provided which allows a user or InfoSeeker™ who may be any person to submit a search request or search query or request to a search service and receive a response to the search request. A search system which allows communication to occur between a user(s), a searcher(s) or guide(s), a resource(s), and/or the search system allows queries to be processed. A database comprising information regarding a user(s), a guide(s), a resource(s), an advertisement(s), a category(ies), a keyword(s), a tag(s), etc. is provided.

A search request or query submitted by a user, which may include a keyword(s), a category(ies), a fully formed question(s), a statement(s), any type of media, implicit data such as information associated with a user identifier(s) and/or device(s), which may request a response, may receive a response which is produced automatically and/or utilizing the assistance of one or more human searchers or guides. In at least one embodiment a search request submitted by a user is compared to a database of search requests in order to determine if a matching search request is found in the database. If a matching request is found, a search result(s) associated with the matching search request(s) may be presented to a user(s) responsive to a search request(s).

If multiple search result(s) are associated with a search request(s) the search result(s) may be ranked to determine an order in which the search result(s) will be presented to a user(s). A ranking of a search result(s) may be based on voting by voters. A search request is identified, and other information such as a category(ies), geographic information and/or a profile(s) may be selected to be associated with the search request. The search request is in this case a 'reference item' which is presented to voters. An indicator of items such as a category(ies), geographic information, time information, or other information associated with a reference item may also be presented to voters. Voters may be selected based on association of a voter with any or all information associated with a reference item. Voters may be provided with the ability to record a preference regarding a review item such as a search result(s). A vote(s) cast by a voter(s) may be weighted, (i.e. one voter may not get one vote). A group of voters may be designated by system administrator(s), and members of the group may have specific voting privileges. Voter(s) may also be identified as having certain voting privileges based on experience, knowledge, and/or any other factor indicating ability to assist in providing relevant result(s) pertaining to a request. Such voters may be referred to as Permanent Trusted Guides (PTG).

A vote cast by a voter(s) may be compared to a vote(s) cast by a PTG, and a rating of the voter may be calculated based on the comparison. For example, if a voter votes in agreement with a PTG, the voter's rating may increase, while if a voter votes contrary to the vote of a PTG, the voter's rating may decrease. A PTG designation and/or a voter rating(s) may be associated with various items. For example, a guide who is a PTG when associated with a category such as "Sports>Football" might not be a PTG when associated with a category such as "Science>Astronomy". Likewise a rating of a voter(s) may be associated with a category(ies), a profile(s), a location(s), a topic(s), a keyword(s), etc. The weight of a vote cast by a voter may be determined based on a rating associated with the voter.

In at least one embodiment, review items are voted upon and rated based on votes cast by voters viewing a reference item and a number of items associated with a reference item. For example, a voter(s) may be presented with a category and a resource(s) which are to be reviewed, or a voter(s) may be presented with a search query, a category, and a location, and an answer(s) which are to be reviewed. In at least one embodiment, a reviewer may be selected based on items associated with a reference item, which may not be displayed and/or selected by the reviewer. For example, a search query may be associated with a location, a profile, and one or more categories, and reviewers may be selected to review search results associated with the query based on a ranking determined at least in part by ratings and/or rankings associated with the location, profile and category(ies), but the profile, location, and/or category(ies) may not be presented to the reviewer(s). In at least one embodiment, a reviewer may be allowed to select a keyword(s), category(ies), topic(s) and/or other information, which may be used to select reference items and review items to be presented to the reviewer.

Reference and review items may be selected to be presented to a reviewer based at least in part on criteria such as time, usage, agreements with advertisers, a number of available and/or eligible reviewers, etc. For example, a reviewer may be presented with items in an order based on a time at which a review item was associated with a reference item, such as presenting a review item which has been pending for the longest time first, or if multiple pairs of search requests and search results are pending review, the pairs which have been pending for the longest time period may be preferentially presented to selected reviewers.

Review items presented for voting may be selected and presented using various processes and GUIs. For example, a side-by-side comparison of two or more review items may be presented to a reviewer or voter. A voter may be allowed to select a limited number of review items from a list of review items. For example, if two or more items are provided for review, a voter may be allowed to vote for only one item, while implicitly voting against the others. Review items may be presented in a list, and a voter may be allowed to vote using a binary choice, or a voter may be allowed to forced-rank a list of review items from best to worst. Combinations of voting processes may be used.

A ranking of review item(s) may be determined using various processes. For example, a single review item may be paired with a number of other review items and a ranking may be determined based on the outcome of a comparison vote(s) between each pair of items. Review items might be grouped according to a current ranking and ranked again based on the outcome of voting sessions regarding the grouped review items. Review items might be ranked based on voting, and subsequently a new review item(s) may be ranked using a comparison voting between the new review item(s) and existing review items.

Ranking or rating of review items may be triggered by criteria associated with a reference item. For example, if a search result has been presented to a user responsive to a search query more than a number of times, a search result may be subjected to review by one or more voters to determine whether the search result is still relevant. Alternately, if a search request is received more than a number of times, a ranking process for search results associated with the search request may be initiated. In at least one embodiment, if a number of search requests are associated with a category, tag, keyword, profile and/or location a ranking of review items which are associated with the category, tag, keyword, profile and/or location may be triggered.

The terms voice and speech are used interchangeably herein. A user, a resource, and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail or any other type of communication. A connection may be established using any device which is capable of utilizing a communication service. For example, a wireless device such as a cell phone, PDA, smart phone, etc. might be used to establish a communication session using voice, SMS, IM, email and/or internet protocols. A desktop, laptop or server system might be used to establish a communication session. A landline phone, a specialized communication terminal, or any other communication device might be used to establish a communication session.

Communication between a guide, a user, a resource and/or a search system may include conversion of text to speech and speech to text. Any type of media which can be sent or received using a communication system may be part of a communication session. A communication session may be conducted using any or all communication service(s) associated with a user, a resource and/or a guide.

An advertisement may be transmitted including during any or all communication sessions between a user, a guide and/or a search system. A resource, a guide, and/or an advertisement may be rated. Rating information may be obtained from a user, a guide(s), and/or a search system. Rating information may be used to select a resource(s), a guide(s), an advertisement(s) and/or any item(s) based on information associated with an item indicated in a database. The search service may be compensated by advertising revenue.

As illustrated in FIG. 1, system 100 includes guide system(s) 105, 110, a network 115 such as the Internet, a search system 130, user system(s) or information seeker system(s) 135, 140, a database 120, which may comprise various records, resource 155, and resource systems 145, 150.

While only a limited number of systems associated with a guide (also referred to as a human searcher), resource (also referred to as a search resource), user (also referred to as an information seeker or requester) and as a search system are depicted in FIG. 1, it is within the scope of the disclosure for multiple systems for guide, resource, information seeker and search systems to be utilized.

Any user system (e.g., the user systems 135, 140) can be operated by an information seeker, who may be a person, to submit a search request to the search system 130 and/or receive a search result(s) and/or other information. Any guide system (e.g., the guide systems 105, 110) can be operated by a human searcher to obtain a search result(s) for an information seeker located at a user system (e.g., the user systems 135, 140). Any resource system (e.g., the resource systems 145, 150) may be operated by a human provider of information and/or may be an automated system which may provide a search result(s) and/or other information to a guide and/or a user, such as a search engine, a database, a local information source of a guide system such as a disk or removable memory, etc. A resource may not be accessible using the network 115. For example, a resource such as the resource 155 may be accessible to a guide operating a guide system such as the guide system 105. A resource might include printed materials, images, video, and/or audio information, a software application(s), any information accessible to a guide(s), a database(s), and/or any combination thereof.

The network 115 (FIG. 1) may be a global public network of networks (the Internet) and/or consist in whole or in part of one or more private networks and communicatively couples the guide systems, the resource systems and the user systems with the other components of the system such as the search system 130, and the database 120.

The search system 130 allows interaction to occur among the guide systems 105, 110, the resource systems 145, 150 and the user systems 135, 140. For example, an information search query(ies) can be transmitted from the user systems 135, 140 to the search system 130, where a search query(ies) can be accessed by the guide systems 105, 110 and/or the resource systems 145, 150. Similarly, a search result(s) produced from the resource systems 145, 150 using the guide systems 105, 110 in response to a search query(ies) submitted by the user systems 135, 140 may be transmitted to the search system 130, where it may be stored by the search system 130 and/or may be transmitted to the user systems 135, 140.

The search system 130 is communicatively coupled with the database 120. As will be described herein in further detail below, the database 120 includes data that is processed in association with operation(s) of the embodiments. Although FIG. 1 illustrates the database 120 as a separate component of the system, the database 120 may be integrated with the search system 130. Further, the records maintained in the database 120 may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100.

The user systems 135, 140, the guide systems 105, 110, the search system 130 and the resource systems 145, 150 may include equipment, software, systems and personnel required to send and/or receive messages between a user system, a guide system, a resource system and/or the search system using the network 115. The database 120 includes information which may allow the search system 130 to establish communication between the other elements of the system.

A user system, a guide system, and/or a resource system may be a desktop or laptop PC or Mac®, a mobile phone, a smart phone, a PDA, a server system, a landline phone, a specialized communication terminal, a terminal connected to a mainframe, or any other communication device. The search system 130 may include one or more servers, computers, etc. After being presented with the disclosure herein, one of ordinary skill in the relevant art will immediately realize that any viable computer system(s) or communication device(s) known in the art may be used as user systems, guide systems, resource systems, and/or to implement the search system 130.

A guide may be required to register with the search system 130. As part of a registration process, at least one communication method is associated with a guide. In at least one embodiment, a guide may register with the search system 130 and establish a username and password which are associated with the guide. A guide may login to the search system 130 using a web browser functionality of guide system 105, 110 in order to communicate with the search system 130. Multiple communication services may be associated with a guide and may allow a communication session to be established between a guide system such as the guide system 105 and a user system, a resource system and/or the search system 130. Multiple identifiers of a guide may be associated with each other. Information such as IM credential(s), an email address(es), a phone number(s), a URL, a username, etc. of a guide may be identified which may allow the search system 130 to establish a communication session between a guide system and a user system, a resource system, and/or the search system 130.

When a guide registers with the search system 130 the guide may be associated with one or more keywords, categories, and/or other information. For example a keyword(s) or category(ies) may be selected by a guide, or may be associated with a guide based on a test(s) administered to a guide and/or other information provided during and/or after a registration process. Information associated with a guide may be stored in the database 120 and may be used for purposes such as matching a guide to a user request, determining and/or providing compensation for a guide, communicating with a guide, etc. as will be described further herein below.

A user may be identified by the search system 130. When a user system such as the user system 135 establishes a communication session with the search system 130, an identifier of a user system is determined. An identifier of a user system may be associated with other information regarding a user. A user system may be identified using an email address, a telephone number, an IM credential, a username, or any other identifier which may be used to associate information with a user. Multiple identifiers of a user may be associated with each other. Using information of communication services associated with a user, a communication session may be established between a user system such as the user system 135 and a guide system, a resource system and/or the search system 130. Information such as a keyword(s), a category(ies), a user profile(s), a previous search request(s), a search result(s), etc. may be associated with a user. Information of a user may be stored in the database 120.

A resource, which may be a person(s), an entity(ies), a search engine, a database, a software application, a corpus of one or more types of media such as text or printed information, images, audio, video, etc. or a combination thereof, may be identified by the search system 130. Information of at least one method of communication is associated with a resource system which allows a communication session to be established between the search system 130, a user system 135, 140, and/or a guide system 105, 110 and a resource system such as the resource systems 145, 150. An identifier of a resource system may be associated with other information regarding a resource. A resource system may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource system such as the resource system 145 and a user system, a guide system, and/or the search system 130. Information such as a keyword(s), a category(ies), a profile(s), or other information may be associated with a resource. Information of a resource may be stored in the database 120.

A resource such as the resource 155 and/or resources accessible via the resource systems 145, 150 may include any system(s), software, hardware, personnel and/or other facility(ies) which may provide information to a guide(s), a user(s), and/or the search system 130. For example, a resource may be a search engine, a database system, a library, a personal hard drive and/or other local storage, printed materials, recordings of any sort, a software program(s), a person or person(s), an organization, etc. A resource may be freely accessible to any user(s) and/or guide(s) and/or may be available on a restricted basis. The resource system(s) 145, 150 may include resource(s) which are available on an unrestricted and/or restricted basis. A resource may not be accessible using the network 115, but may be accessible to selected guide(s). For example, a resource such as the resource 155 may be accessible to one or more guide(s) operating a guide system(s) such as the guide system 105 using any type of communication. For example, a guide(s) may obtain information of an event(s) to provide a search result(s). Information in any form, such as printed media, audio and/or visual information, software, hardware, etc. which may be accessible to a guide(s), a user(s) and/or an operator(s) of a resource system(s) may be a resource.

The search system 130 may establish a communication session between any user system(s), guide system(s), or resource system(s) using information indicated in the database 120. For example, the user system 135 may establish a voice communication session with the search system 130, the search system 130 may establish a voice communication session between the user system 135 and the guide system 105, and the search system 130 may establish a voice communication session between the user system 135 and the resource system 145. While a voice communication session is used in this example, any type of communication session using one or more services such as SMS, EMS, MMS, email, IM, chat, web based communication, etc. may be established between any user system(s), guide system(s), and/or resource system(s) and/or the search system 130.

Information associated with a user(s), a guide(s) and/or a resource(s) may be obtained in various ways. For example, a registration process may be performed using a web form(s) provided by the search system 130, and/or information may be obtained from an external database, and/or information may be obtained based on analysis of information indicated by a user, a guide, and/or a resource. A 'profile' is one or more characteristics which may be associated with one or more individuals. A profile may include geographic data such as a street address, latitude and longitude, etc., may include demographic information such as age, gender, race, income, family size, political affiliations, etc., may include personality information such as results of psychometric testing, subjective evaluations of an individual, etc., may include affiliation information such as employment, club, activity, societal membership information, information of a device(s), service(s), transaction(s) or any other information which might be associated with a user(s) and/or a guide(s).

Figure 2:
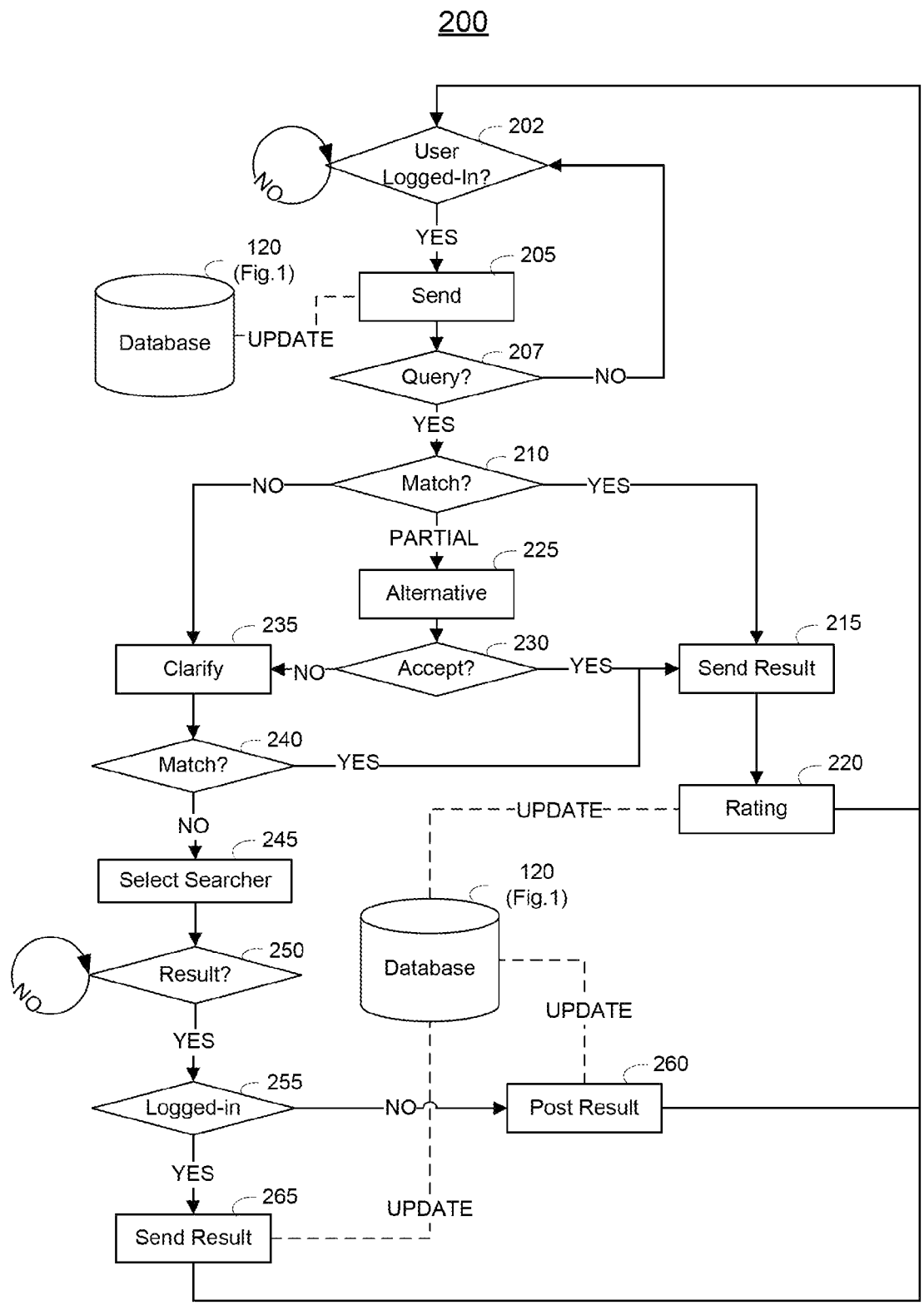
FIG. 2 is a flowchart of a process of handling a search request.

As illustrated in FIG. 2, a process 200 for performing an information search is provided.

In operation 202 (FIG. 2), a determination is made as to whether a user is logged into the search system 130 (FIG. 1). If it is determined in operation 202 that a user is not logged-in control remains at operation 202 and process 200 continues to wait. If it is determined in operation 202 that a user is logged-in, control is passed to operation 205 and process 200 continues.

The determination in operation 202 may be made based on various criteria. A user may be determined to be logged into a search system based on presence information associated with any or all communication services and/or devices of the user. For example, a user may be determined to be logged-in when a device associated with a user is accessible using a communication service(s) of a user.

In operation 205, any pending previous search result(s) is presented to a user, user rating information may be obtained, and the database 120 (FIG. 1) is updated. An advertisement(s) and/or other information may be presented to a user before, during and/or after any or all search results are presented to a user. A user may be presented with information in any format(s) which is suitable for the device(s) associated with a user. A result(s) and/or an advertisement(s) may be presented using one or more devices. The same or different information may be presented to a user at different times, based on conditions such as the device(s) accessible to the user and/or the search system 130. For example, a user may be presented with an SMS message relating to a search result, and may subsequently be presented with a URL associated with a search result(s) when accessing the search system using a browser functionality of a user device. Control is passed to operation 207 and process 200 continues.

In operation 207 (FIG. 2), a determination is made as to whether a search query or search request is received. If it is determined in operation 207 that a search query is not received, control is passed to operation 202 and process 200 continues. If it is determined in operation 207 that a search query is received, control is passed to operation 210 and process 200 continues.

In operation 210, a determination is made as to whether a search query matches an existing query indicated in the database 120 (FIG. 1). If it is determined in operation 210 (FIG. 2) that a query exactly matches an existing query, control is passed to operation 215 and process 200 continues. If it is determined in operation 210 that a partial match is found to an existing query control is passed to operation 225 and process 200 continues. If it is determined in operation 210 that no match is found to an existing query control is passed to operation 235 and process 200 continues.

In operation 215, the user ID and/or other information associated with a user entering a query is associated with a query or search request. A result(s) may be presented to a user and the database 120 (FIG. 1) is updated. An order of presentation of a result(s) may be determined based on rating data associated with the search result(s). In at least one embodiment, a ratings may be based on a profile(s) associated with a user submitting a query, a profile(s) associated with a searcher(s) who produced a result(s), a profile(s) associated with a searcher(s) and/or a user(s) who have rated a result(s) associated with a query. Processes for associating a user profile, a searcher profile(s) and a query are described further in the related application U.S. Provisional Application Ser. No. 60/980,010 previously mentioned and incorporated herein by reference. Control is passed to operation 220 and process 200 continues.

In operation 220, user ratings of a search result(s) may be obtained. The database 120 (FIG. 1) is updated. Usage information of a search result(s), an advertisement(s), etc. are recorded. Control is passed to operation 202 and process 200 continues.

In operation 225, result(s) of query(ies) determined to partially match a query submitted by a user may be presented to the user and/or a guide(s) as an alternative. The process of presentation may include a drop-down list, auto-fill functionality, or any other suitable process. Further, the determination may be made based upon content of a user profile associated with the user and/or profile(s) associated with a searcher(s) that produced a search result(s) associated with the query(ies). Control is passed to operation 230 and process 200 continues.

In operation 230, a determination is made as to whether a user and/or a guide has accepted at least one of the presented results of queries presented as matching the submitted query. If in operation 230 it is determined that at least one of the presented queries is accepted, control is passed to operation 215 and process 200 continues. If in operation 230 it is determined that at least one of the presented queries is not accepted, control is passed to operation 235 and process 200 continues.

In operation 235, a query is clarified. A parsing operation may be performed to extract a keyword(s) and/or category(ies) associated with the query. In at least one embodiment the parsing and categorization may be done by the search system 130 (FIG. 1). In at least one embodiment the parsing and categorization may be performed by a human guide. Interaction between a guide and an information seeker may occur to clarify the intent of a query. In operation 235 (FIG. 2) a categorized and/or rephrased query is preferably obtained and a category(ies) and/or keyword(s) may be associated with a query. In a preferred embodiment, a categorization and/or a keyword(s) selected by a human guide is compared to that algorithmically selected by the search system 130 to provide feedback to the algorithmic selection. Control is passed to operation 240 and process 200 continues.

In operation 240, a determination is made as to whether a clarified query matches an existing query in the database 120 (FIG. 1). If in operation 240 it is determined that a query matches an existing query, control is passed to operation 215 and process 200 continues. If in operation 240 it is determined that a query does not match an existing query, control is passed to operation 245 and process 200 continues.

In operation 245, a query record may be created, a query ID may be assigned, a user list is updated, and a searcher is selected. An eligible searcher(s) may be determined using various processes. Preferred processes are described in the related U.S. patent application Ser. No. 11/336,928, U.S. application Ser. No. 11/779,502, and U.S. application Ser. No. 11/780,297, all of the above identified applications previously mentioned are incorporated herein by reference. An eligible searcher(s) may be presented with resources and a graphical user interface (GUI) for producing search results such as those described in the related U.S. patent application Ser. No. 11/774,852 previously mentioned. Control is passed to operation 250 and process 200 continues.

In operation 250, a determination is made as to whether a search result(s) has been returned by a searcher(s). If it is determined that a result has not been returned, process 200 continues to wait. If a predetermined wait period is exceeded or if a searcher(s) indicates that the searcher(s) is unable to obtain a result an alternate searcher may be selected, an automated search result from a search engine such as Google® or Yahoo!® may be returned, etc. in order to obtain a search result(s). If in operation 250 it is determined that a search result(s) has been returned, the search system database 120 (FIG. 1) is updated and control is passed to operation 255.

In operation 255, a determination is made as to whether a user is logged-in to the search system 130 (FIG. 1). If it is determined in operation 255 that a user is not logged-in, control is passed to operation 260 and process 200 continues. If it is determined in operation 255 that a user is logged-in control is passed to operation 265 and process 200 continues.

In operation 265, a search result(s) is transmitted to a user. User rating information may be obtained, the database 120 (FIG. 1) is updated, control is passed to operation 202 and process 200 continues.

In operation 260, a search result(s) associated with a query and a user(s) are posted or stored in the database 120 (FIG. 1) with an indicator that the search result(s) are pending transmission to a user(s). Control is passed to operation 202 and process 200 continues.

In at least one embodiment, an association between a query and a search result may be created without requiring an information seeker. This facility may be used to obtain query/result associations from an external source which may be produced in various ways. A query may be created and a search result(s) may be associated with the query by an interactive session between one or more guides (also referred to as searchers or providers or PaidSearcher™), for example, as part of a training session. A query may be associated with a search result(s) by submission of a query to an automated search engine, such as Google®, Ask®, or Yahoo!®. A query and associated search result(s) may be modified by annotations produced by processes such as those described in the related U.S. Provisional Application Ser. No. 60/913,944 previously mentioned. A query may be associated with a search result(s) and/or other information by review of a search process record such as that described in U.S. patent application Ser. No. 11/835,016, previously mentioned, the contents of which are incorporated herein by reference.

In at least one embodiment, an indexed resource, such as a dictionary or encyclopedia may be processed to associate a query and a search result(s) and/or a category(ies), profile(s), etc. which may be comprised within the database 120 (FIG. 1). In some embodiments a query may be associated with a search result(s) by selecting a precise search result(s) which may be used to create another query and/or an equivalent form(s) of the query which may be associated with the query.

Any number of equivalent queries may be associated with a search request, and a search result(s) which may be associated with the search request. As a search query or search request may be associated with multiple search result(s), it may be desirable to rank the result(s) associated with a query to determine an order in which to present a result(s) to a user who has submitted a query. In at least one embodiment, a rating is associated with a result, a query and a profile(s). A profile may contain information regarding a guide(s) and/or a user(s) who may rate a result(s). Result(s) associated with a query may be presented in a different order based on a profile associated with a query. A method for rating of a search result(s) is disclosed in the related U.S. Provisional Application Ser. No. 60/913,944, previously mentioned the disclosure of which is incorporated herein by reference.

Figure 3:
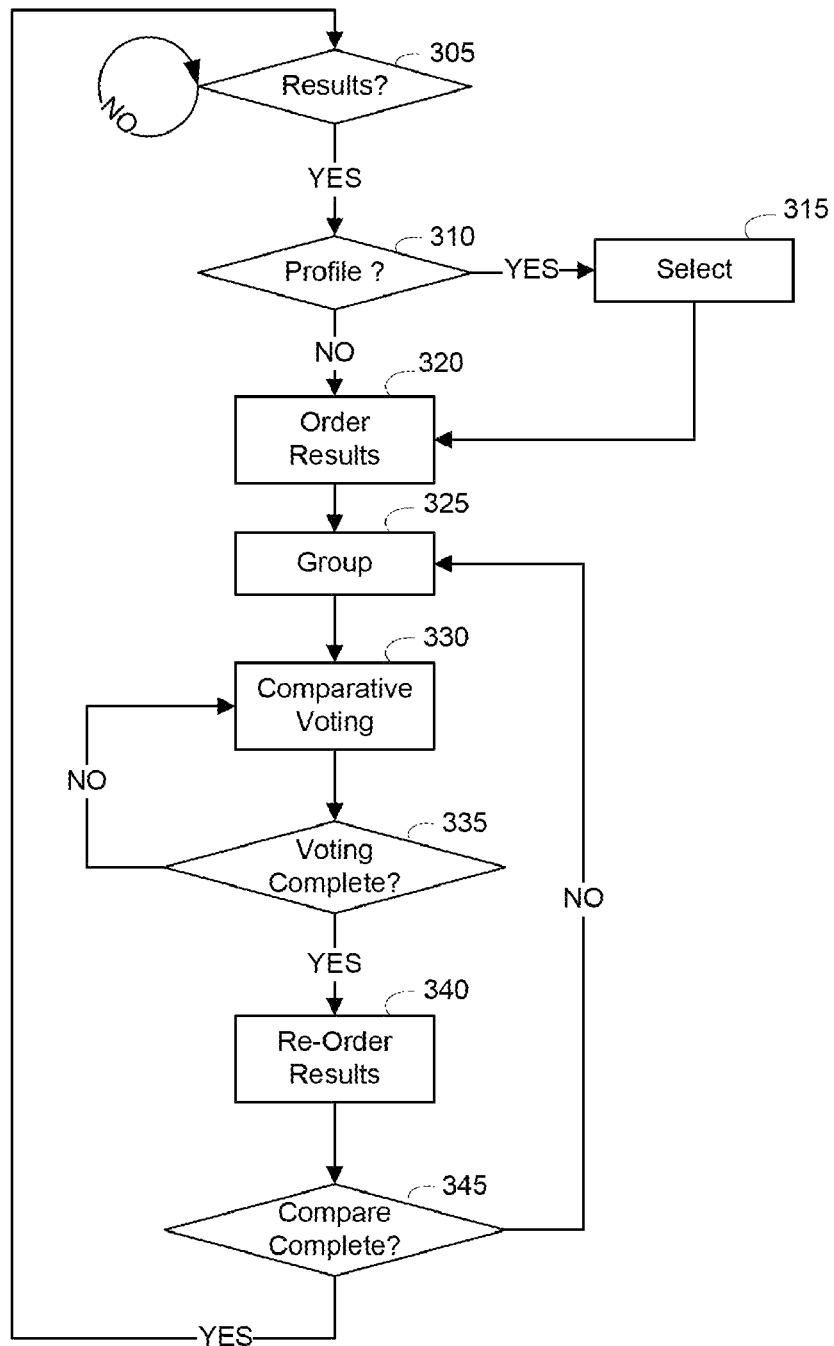
FIG. 3 is a flowchart of a process of ranking items.

As illustrated in FIG. 3, a process 300 for ranking search results and/or items associated with a query using a human searcher(s) or voter(s) is provided.

In operation 305 a determination is made as to whether eligible search result(s) are associated with a query. If it is determined in operation 305 that there are not eligible results associated with a query, control remains at operation 305 and process 300 continues. If in operation 305 it is determined that there are eligible results associated with a query, control is passed to operation 310 and process 300 continues. In at least one embodiment, a query may be submitted to at least one automated search system and one or more automated search result(s) may be associated with a query.

The determination of eligibility of a search result(s) in operation 305 may be made based on various criteria. The criteria may include the presence of at least one "human-touched" result which was selected and/or reviewed by a person(s), at least one automatically produced result, at least one certified result, a result(s) which has an average rating above a pre-set threshold, whether a result has been evaluated previously, any combination of the above, etc. In at least one embodiment, having at least one "human-touched" search result (i.e., a search result selected by a human guide) which has not been evaluated and three other search results are the criteria for the determination in operation 305. The determination in operation 305 may be made based on any suitable criteria as will be further described herein below.

In operation 310, a determination is made as to whether a profile is to be used as part of the process for rating results. If it is determined in operation 310 that a profile is to be used, control is passed to operation 315 and process 300 continues. If it is determined in operation 310 that a profile is not to be used, control is passed to operation 320 and process 300 continues.

The determination in operation 310 may be made based on various condition(s). For example, if a number of searchers associated with a profile which is associated with a query is greater than a predetermined value, a profile-based comparison may be conducted. Alternately, if a number of users associated with a profile associated with a query exceeds a predetermined value, profile-based comparison may be conducted. Moreover, other criteria may be used for the determination in operation 310 without departing from the spirit and scope of the embodiments described herein.

In operation 315, a profile to be used for reviewing a result(s) associated with a query is selected. The selected profile may be any profile. If no ratings are associated with a result(s), a query and a profile, a current rating(s) associated with a query and a result(s) may be used to determine a rating(s) associated with a query, a result(s) and a profile. A profile may be selected based on information associated with a query or available to the search system 130 (FIG. 1). For example, if a number of user(s) submitting a query are associated with a profile(s), the profile may be associated with the query for the purpose of ranking a search result(s). Likewise for a query which may require a subjective judgment, one or more profiles which may differentiate a group(s) of voters may be associated with a search query. Control is passed to operation 320 and process 300 continues.

In operation 320, the results are sorted for a comparison voting. The sorting may be performed in various ways. For example, a voting process such as that described in related U.S. Provisional Application Ser. No. 60/913,944 previously mentioned may be used to determine a ranking for any or all result(s). Alternately, results from various sources may be assigned a rating based on the source of the result(s). For example, a result produced by an affiliate organization as described in related U.S. application Ser. No. 11/834,911, previously mentioned, may be given a high rating, as it was produced by a trusted source, and a result from an automated search resource might receive a medium rating, and a result obtained from a search by a low-ranking guide might receive a low rating. Results may be sorted from the highest rating to the lowest rating. Alternately, a random ordering might be selected. Control is passed to operation 325 and process 300 continues.

Figure 7A:
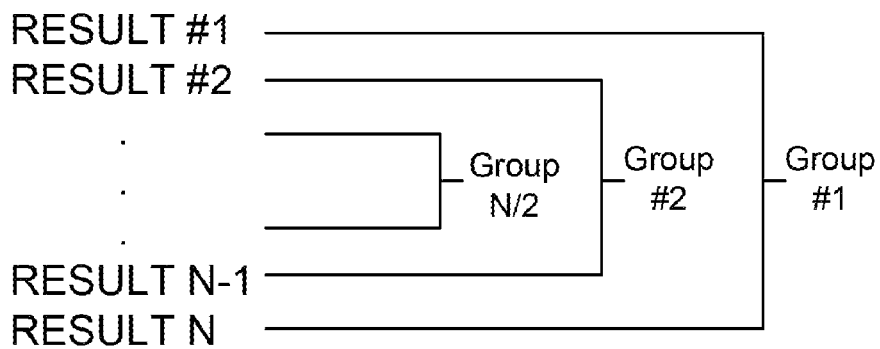
FIGS. 7A thru 7E are diagrams illustrating a process for pairing of items.
Figure 7B:
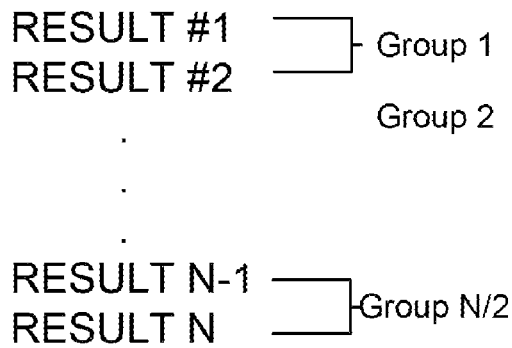
Figure 7C:
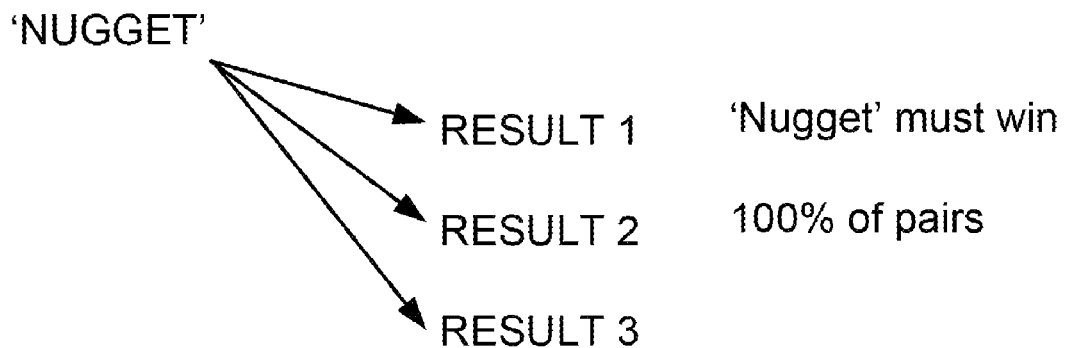

In operation 325, results are grouped. Grouping may be based on the ranking operation performed in operation 320. Results may be grouped in groups of two or more. The grouping may be based on various processes. In one embodiment, the highest rated result is matched with the lowest rated result, the second-highest rated result is matched with the second lowest rated result, etc. as illustrated in FIG. 7A. Alternately, the highest rated result is matched with the second highest rated result, and the lowest rated result is matched with the second lowest rated result as illustrated in FIG. 7B. In a case where there is no parity (i.e., the total number of results is not divisible by the number of results in a group) one or more groups may have added members to allow any result(s) to be voted upon. Alternately, one or more results may be removed from the comparison process. In at least one embodiment, a group(s) consists of two results. In at least one embodiment, a human produced 'nugget' result is paired with each of three results as illustrated in FIG. 7C. Control is passed to operation 330 and process 300 continues.

In operation 330, comparative voting is conducted on members of one or more groups from operation 325. In at least one embodiment, a voter is allowed to select only one member of a group as a preferred result. A voter(s) may be presented with one or more result groups, along with a query which is associated with a group(s) of results. If profile based voting is selected, voters may be eligible to vote based on a profile associated with a voter and a selected profile(s) from operation 315. Control is passed to operation 335 and process 300 continues.

In operation 335, a determination is made as to whether comparison voting is complete. If in operation 335 it is determined that comparison voting is not complete, control is passed to operation 330 and process 300 continues. If in operation 335 it is determined that comparison voting is complete, control is passed to operation 340 and process 300 continues.

The determination in operation 335 may be made based on various criteria. For example, the determination may be based on whether a number of votes associated with one or more result group(s) exceeds a predetermined value, whether a total number of votes for any result group exceed a predetermined threshold, or any other criteria. In at least one embodiment, an election (or comparison of a group of results) is determined to be complete when at least three eligible guides have voted. In at least one embodiment, a comparison vote is determined to be complete based on whether a member of a group of guides has voted. Voting may be determined to be complete when all groups created in operation 325 have been determined to have met the completion criteria for a voting process. For example, if there are 4 groups of results being compared, and each comparison is determined to be complete when the total number of votes for any member of a group exceeds a value (e.g., 5 votes), the voting may be determined to be complete when one member of each group of results has received at least 6 votes.

Figure 7D:
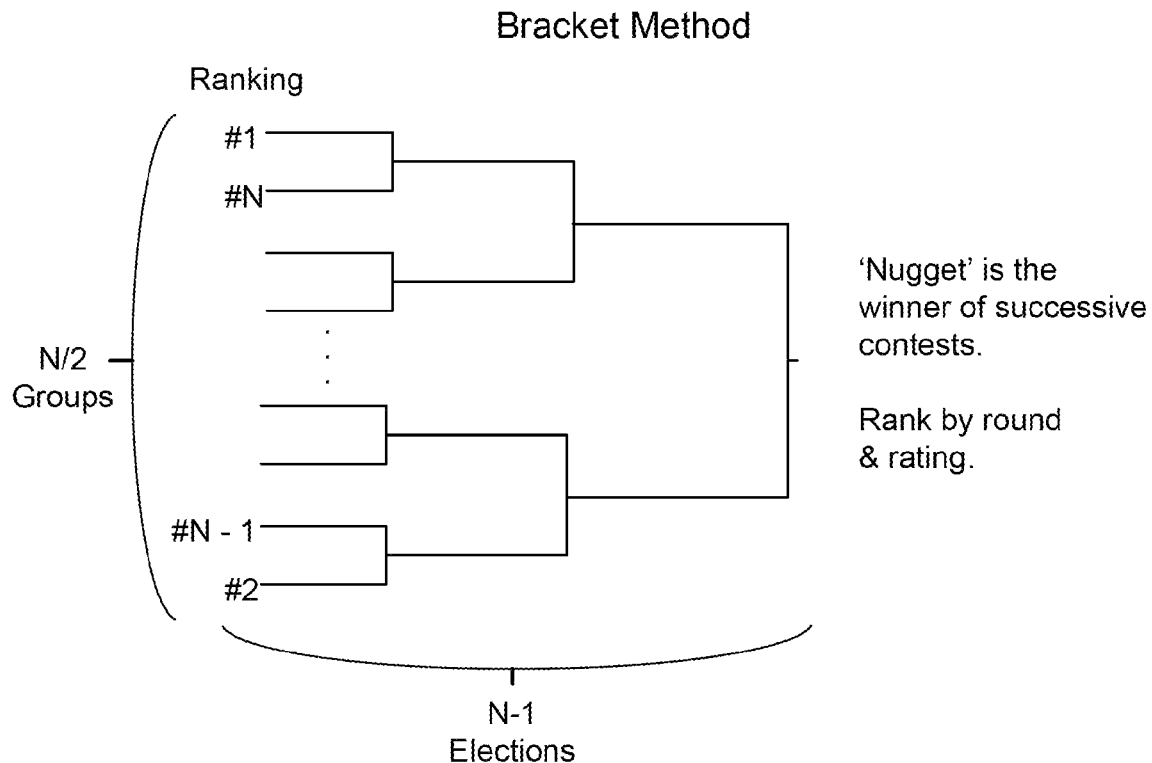
Figure 7E:
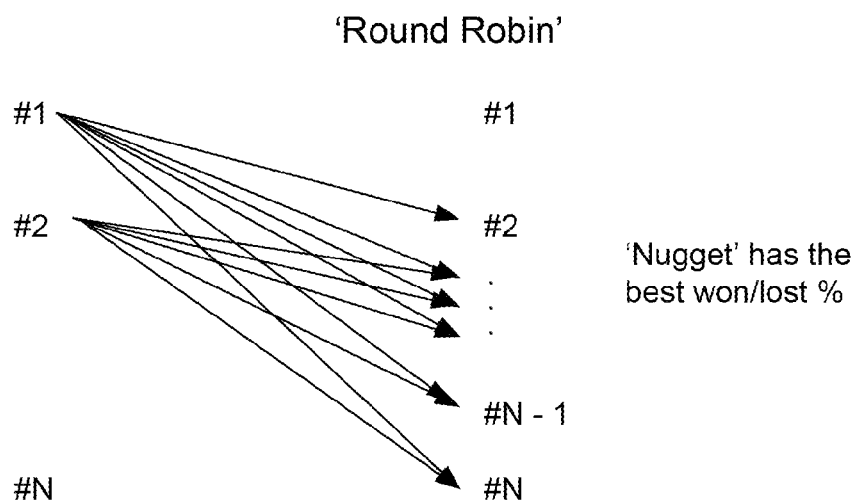

In operation 340, the search results are sorted based on the comparative voting sessions conducted in operation 330. A result(s) which receives a higher number of votes may be ranked higher than a result which receives a lower number of votes. For results which are in different groups a process for inter-group ranking may be applied. Various processes for inter-group ranking may be used. For example, a higher rated result(s) may be grouped with higher rated result(s), and a lower rated result(s) may be grouped with a lower rated result(s). Various exemplary processes for grouping results after completion of a comparative vote for a group(s) are illustrated in FIGS. 7D and 7E. A winning result(s) may be grouped with a winning result in a pre-seeded fashion as illustrated in FIG. 7D. A 'best' result (also referred to herein as a 'nugget') may be the winner of the 'tournament' pairing. Alternately, results may be grouped in a 'round-robin' fashion as illustrated in FIG. 7E. A 'best' result may be one which has the highest won/lost percentage. In at least one embodiment, a 'nugget' must win a comparative vote versus each of three other result(s), as illustrated in FIG. 7C. Control is passed to operation 345 and process 300 continues.

In operation 345, a determination is made as to whether a results comparison operation is complete. If it is determined in operation 345 that a comparison operation is complete, control is passed to operation 305 and process 300 continues. If it is determined in operation 345 that a comparison operation is not complete, control is passed to operation 325 and process 300 continues.

The determination of completion in operation 345 may be based on criteria such as the completion of a predetermined number of comparative voting sessions, no change in the ranking of the results, the expiration of a predetermined time period, etc. In at least one embodiment the determination in operation 345 (FIG. 3) is made based on completion of three elections or comparison votes relating the three pairings described in FIG. 7C (i.e., a human-touched result versus three other search results).

Exemplary processes for comparative result grouping are illustrated in FIGS. 7D and 7E. Other grouping processes and other end conditions might be utilized to produce a ranking of a predetermined number of results using a predetermined number of voting comparisons.

The ranking of results associated with a query may be used to determine an order in which results are presented to a user when a query matching the query associated the search result(s) is submitted. The top-ranked result may preferably be presented to a user first. Results may be presented to a user in rank order and/or in an order which may be determined based on data indicated in the search database 120 (FIG. 1).

Figure 4:
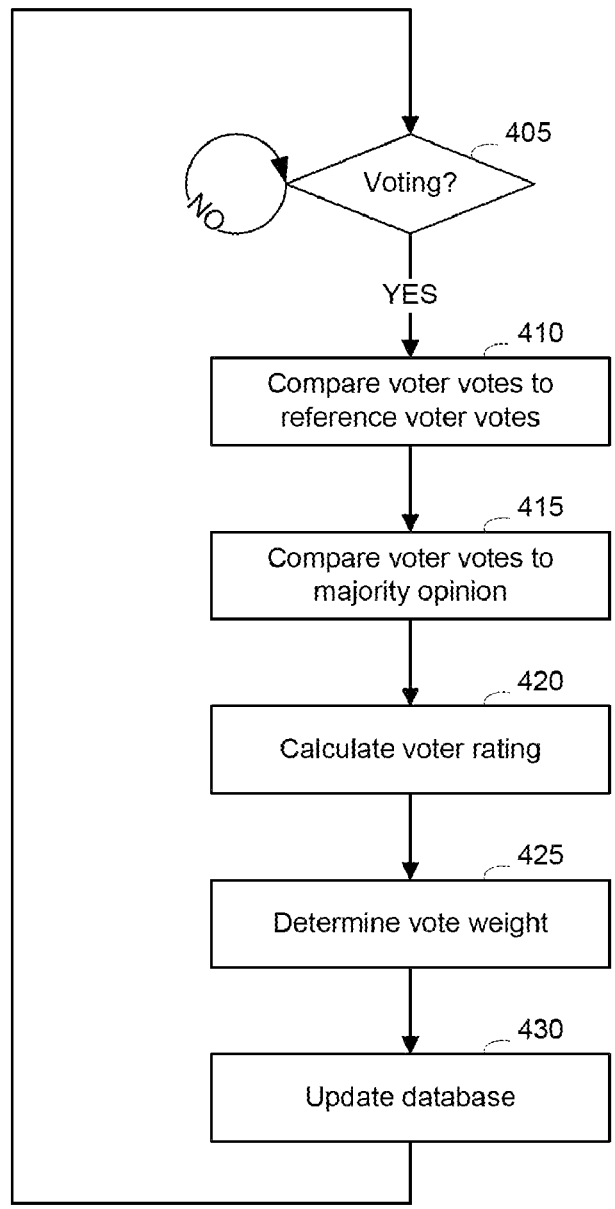
FIG. 4 is a flowchart of a process of determining a voter rating.

As illustrated in FIG. 4, a process 400 for determining a vote weight for human searcher(s) or voter(s) is provided.

In operation 405, a determination is made as to whether voting results are available. If it is determined in operation 405 that voting results are not available, control remains at operation 405 and process 400 continues. If in operation 405 it is determined that voting results are available, control is passed to operation 410 and process 400 continues. In at least one embodiment, completion of a voting session is used to determine if voting results are available.

In operation 410, the votes associated with a voter or reviewer and a query or other reference item(s) and a review item such as a search result(s) are compared to the votes of one or more reference voters. A reference voter(s) may be a group of one or more voters identified by the search system 130 (FIG. 1). For example, one or more guides may be designated as a system representative or Permanent Trusted Guide (PTG). The designation of PTG may be associated with various types of information. For example, a guide may be designated as a PTG when associated with one or more categories, or regions, or topics, or profiles. A voter may be a reference voter based on historical voting patterns. For example, if a guide has voted in alignment with a PTG a percentage of the time, and/or an aggregate number of times, the guide may be designated as a Trusted Guide (TG). A group of reference guides may be identified based on testing activities, qualifications, or other information indicated in the database 120 (FIG. 1). Control is passed to operation 415 and process 400 continues.

In operation 415, the votes associated with a voter or reviewer and a query or other reference item(s) and a review item such as a search result(s) are compared to votes of the majority or plurality of voters associated with the review item and the reference item(s). Such comparisons may be used to determine a vote weighting associated with a voter. In at least one embodiment, the vote of a PTG and/or a TG may be compared to the vote of a majority or plurality of voters, which may affect a vote weight associated with a voter(s). Control is passed to operation 420 and process 400 continues.

In operation 420, a voter rating is calculated for a voter(s). For example, a rating function such as the voter rating function 455 depicted in FIG. 4A may be computed. The total number of votes contrary to the vote of a PTG(s) may be subtracted from the total number of votes in agreement with a PTG(s) in order to compute a rating of a voter. Alternately the ratio of votes in agreement with a TG and/or PTG to votes contrary to a PTG and/or TG may be utilized to calculate a rating of a voter. A rating function for a voter may be based on any mathematical relationship between votes cast by a voter and votes cast by a reference voter(s). In at least one embodiment, a differential of aligned versus misaligned votes is applied to an exponential function to determine a rating of a voter. Similarly a rating function may include the alignment between a voter and a majority and/or plurality of voters. Control is passed to operation 425 and process 400 continues.

In operation 425, a vote weight is calculated for a voter(s). For example, a vote weighting function such as the weighting function 485 (FIG. 4A) is evaluated. The weight assigned to a voter is based on the value of the rating function, as is further described herein below. Any weighting function may be utilized to determine a vote weight associated with a voter. For example, a PTG may have a vote weight which is greater than that of other voter(s), and greater than that associated with the vote weighting function. Likewise, a TG may have a higher vote weight than a guide who has a limited voting history. Likewise, a guide who votes contrary to a PTG and/or TG may receive a low vote weight. In at least one embodiment, a TG has a vote weight of 2, a guide initially has a vote weight of 1, and a guide who consistently votes contrary to a PTG and/or TG has a vote weight of 0. Control is passed to operation 430 and process 400 continues.

In operation 430, the search database 120 (FIG. 1) is updated. Information of a rating and/or vote weight associated with a voter(s) and/or a profile(s), a category(ies), keyword(s), etc. is recorded. Control is passed to operation 405 and process 400 continues.

Figure 4A:
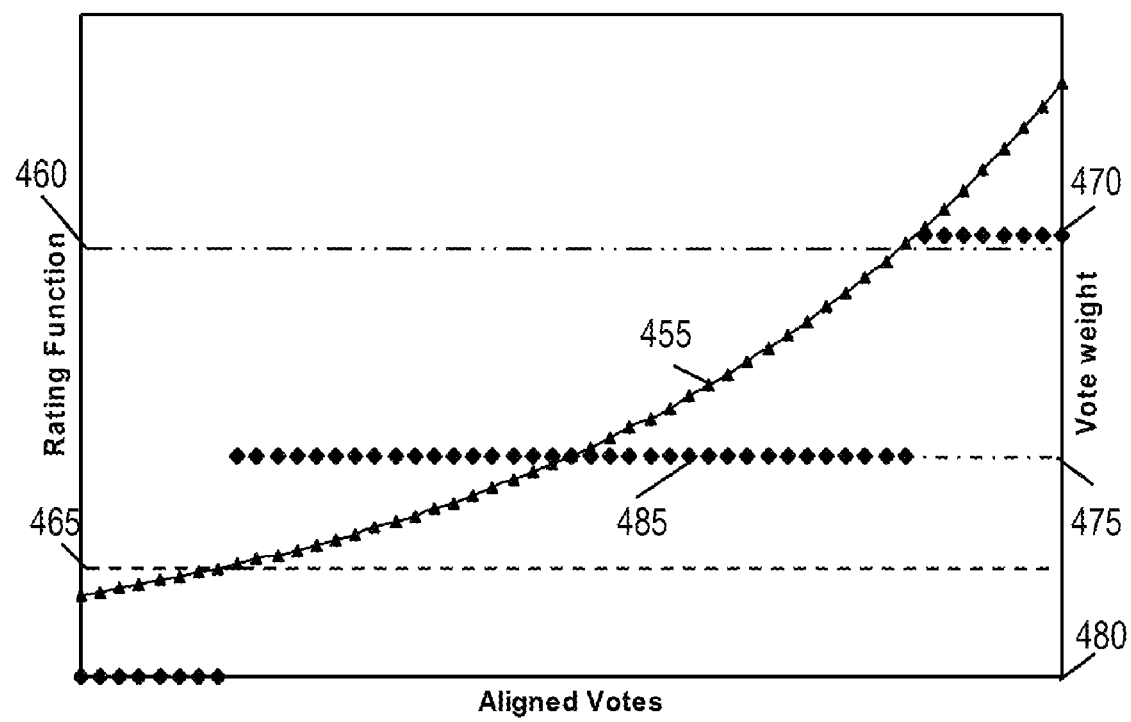
FIG. 4A is a diagram illustrating a process of determining vote weighting.

FIG. 4A illustrates an exemplary relationship 450 between votes cast by a voter, a rating of a voters and a vote weight assigned to a voter.

A number or percentage of aligned and/or contrary votes by a voter is represented on the x-axis in FIG. 4A. A voter rating function is applied to the computed number of aligned and/or misaligned votes as represented by the triangle indication curve 455. A threshold may be applied to the vote rating function 455 as represented by the threshold values 460 and 465 represented by the dashed lines in FIG. 4A. The threshold values relate the voter rating function to the vote weighting function illustrated by the diamond indication curve 485. Associated with each threshold value, is a vote weight. For example, when the rating function exceeds the high threshold 460, a high vote weight designated by the high weight value 470 is assigned to a voter. Likewise when the rating function is below the upper threshold 460 and above the lower threshold 465, the vote weight is the middle weight value 475, and when the rating function is below the lower threshold 465, the vote weight is the low weight value 480. While two thresholds and three vote weights have been used for the purposes of illustration in FIG. 4A, any number of threshold values and vote weight values might be utilized. Likewise various types of rating functions may be utilized which may combine one or more elements of voting behaviors associated with a voter may be utilized within the spirit and scope of the disclosure herein.

Figure 5:
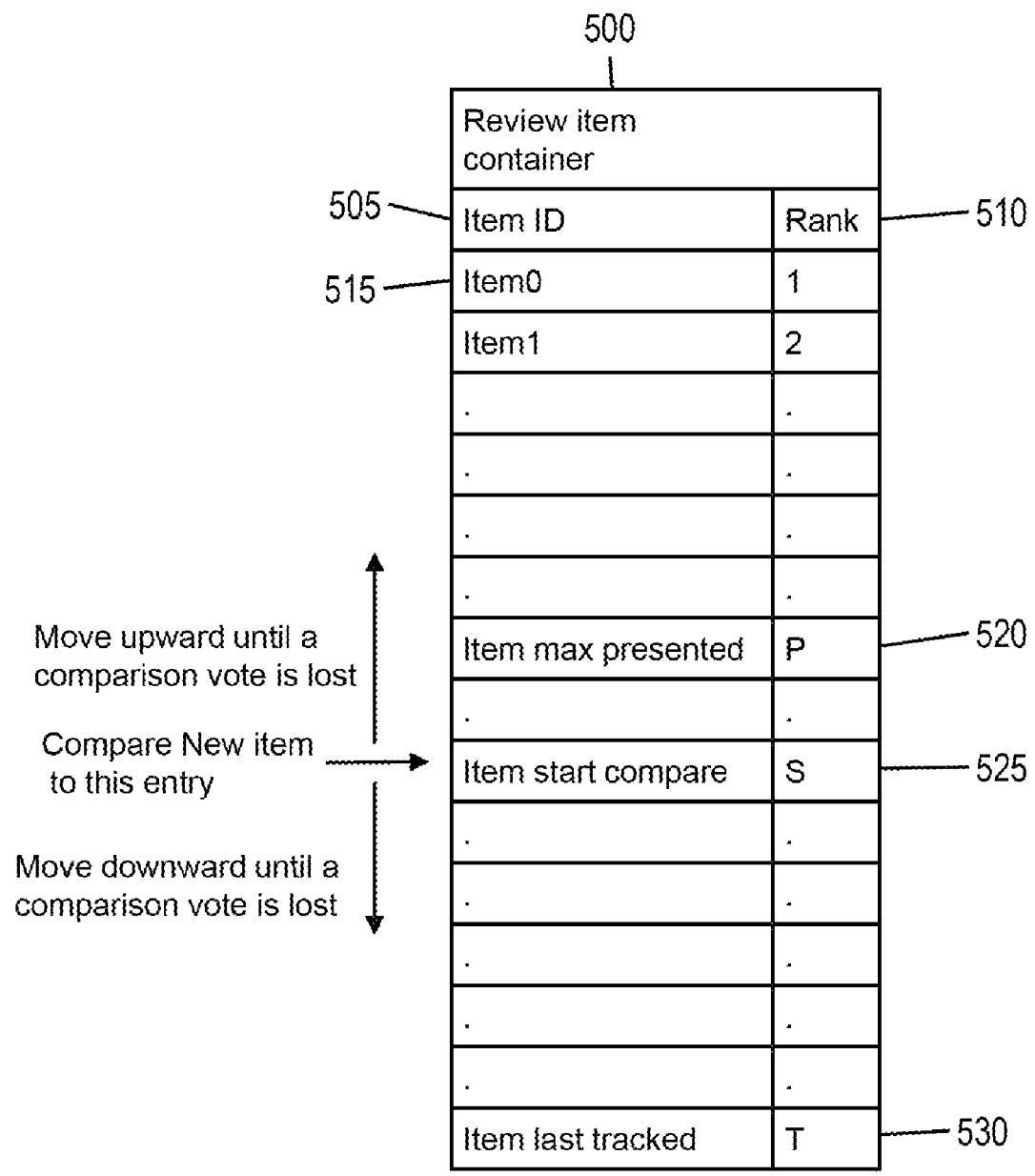
FIG. 5 is a diagram illustrating a process of ranking of items.

FIG. 5 illustrates a process for ranking items based on comparisons between pairs of items. A review item container 500 or list which contains two or more review items which are to be ranked is created. Each item is assigned an item identifier (ID) which may be stored in the item ID list 505 of the review item container 500. A ranking is assigned to each item as it is added to the review item container 500. A ranking associated with each item ID indicated in the item ID list field 505 is stored in the item rank list 510. In at least one embodiment, the item ID list field 505 and the item rank list field 510 are linked by for example a pointer. Any number of items may be indicated in the review item container 500. In at least one embodiment, the number of items in the review item container 500 is limited to a value T as indicated in the rank field 530 of the item rank list 510 of the review item container 500. The number of items to be presented to a user may be determined by a value P as indicated in the rank field 520 associated with the last item to be presented. An item to be added to the review item container 500 is initially compared to an item at the position S as indicated in the rank field 525 associated with the initial comparison item.

When an item(s) is to be added to the review item container 500 a list of review items may be sorted. For example, a list of search results may be sorted based on time stamp information associated with the search results. An initial item may be inserted into the review container 500 at the location S. In the case of search results sorted by time stamp, the oldest search result might be added at the starting rank position S. A review item is then compared to the item at the position S. If the new item wins the comparison (i.e. voting) the new item is inserted at the position above the initial comparison item, if that location is unoccupied. If that location is occupied, the new item is compared to the item at that location. If the new item wins the comparison, it is then promoted to the next higher rank and compared to a result at that position, if any. The process continues until the new item either reaches the top of the list (i.e. the highest open ranking, or the first position), or loses a comparison. If the new item reaches the top of the list, it is inserted at the top rank position and all other results are moved downward, if needed. If the new item loses a comparison before reaching the top of the list, it is inserted at the position below the item which won the comparison, and the other results are shifted down by one position. If the new item loses the comparison to the item at the start position S, the new item is then compared to the item, if any at the next lower position in the Item ID list 505. If new item wins the comparison, it is inserted at that location and the other items are shifted down by one position. If the new item loses, it is compared to the next lower item until it wins a comparison, reaches the bottom of the list (i.e., an unoccupied position), or loses to the item at the last tracked position T.

By changing a number of items tracked (T) relative to the start comparison position (S) the number of elections or comparisons required to discard a review item may be modified. A smaller value of T relative to S reduces the number of comparisons, and the associated cost to remove an item from the review container 500. Adjusting the number of items presented (P) relative to S changes the number of comparisons required for a review item to be presented to a user. By decreasing P relative to S, the number of comparisons and the associated cost for a successful item to be presented to a user is increased. By varying the values P, S and T, the cost of the review process may be modified. Different types of reference and review items may utilize different values of P, S and T as determined by the operators of the system 100 (FIG. 1).

Figure 6:
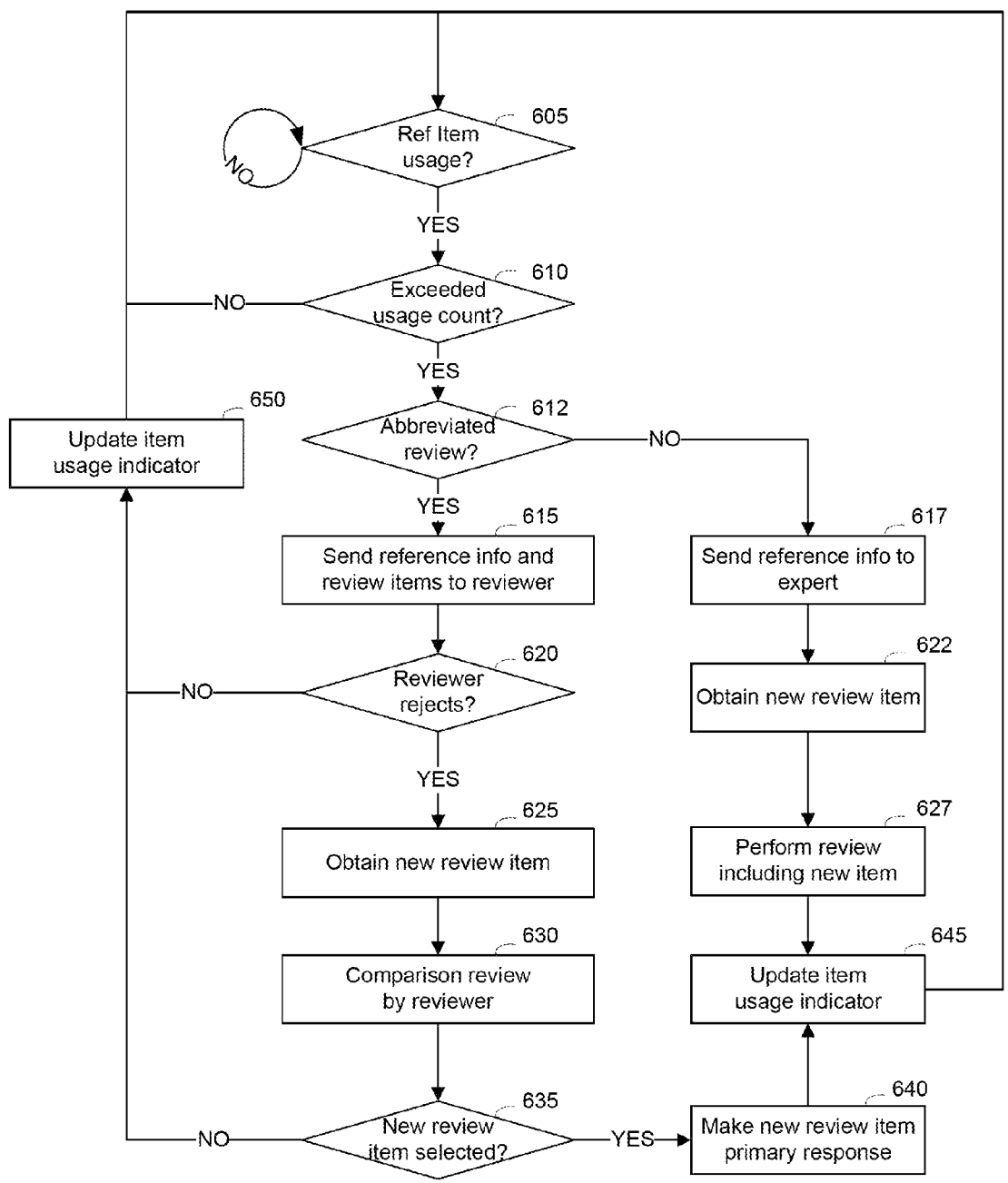
FIG. 6 is a flowchart of a method of reviewing items.

As illustrated in FIG. 6, a process 600 for reviewing a review item(s) associated with a reference item(s) is provided.

In operation 605, a determination is made as to whether a reference item has been utilized. If it is determined in operation 605 that an item has not been utilized, control remains at operation 605 and process 600 continues. If in operation 605 it is determined that an item has been utilized, control is passed to operation 610 and process 600 continues. In at least one embodiment, presenting a search result(s) responsive to a search request is used to determine whether an item has been utilized. In at least one embodiment, access to a search resource (the review item) by a searcher or guide responsive to a search request is used to determine whether an item has been utilized. Usage of a reference item(s) and/or a review item(s) may be used to determine if an item has been accessed. For example, if a search request which matches an existing search request is submitted by a user, it may be determined that the reference item (i.e. the search request) has been utilized.

In operation 610, a determination is made as to whether a usage limit has been exceeded. If it is determined in operation 610 that a usage limit has not been exceeded, control is passed to operation 605 and process 600 continues. If in operation 610 it is determined that a usage limit (count) has been exceeded, control is passed to operation 612 and process 600 continues. A usage limit may be established in various ways. In at least one embodiment, a guide may determine a usage limit (count) for an item(s). A usage limit (count) for an item may be determined based on content of the item. For example, a search result which is factual information such as historical data or the definition of a word may have a high usage limit as compared to news items or sports information which may have a low usage limit.

In operation 612, a determination is made as to whether an abbreviated review is to be performed. If it is determined in operation 612 that an abbreviated review is not to be performed, control is passed to operation 617 and process 600 continues. If in operation 612 it is determined that an abbreviated review is to be performed, control is passed to operation 615 and process 600 continues. The determination in operation 612 may be made based on various criteria. For example, the content of or data associated with a reference item may be utilized to determine if an abbreviated review is to be performed. In at least one embodiment, a number of available reviewers may be used to determine if an abbreviated review is to be performed. An abbreviated review may be performed based on pricing information associated with a reference item(s) and/or a review item(s). For example, a keyword(s) and/or category(ies) associated with a high bid amount may receive a different level of effort than a keyword(s) and/or category(ies) associated with a lower bid amount, or a query associated with a high payment per result might receive a different level of effort than a query associated with a low payment per result. Any information indicated in the database 120 (FIG. 1) may be used to determine whether an abbreviated review is to be conducted. In at least one embodiment, an abbreviated review may not be performed. An abbreviated review may be selected in order to modify effort associated with performing a review of a review item(s) associated with a reference item(s).

In operation 615, a reference item(s) and a review item are presented to a reviewer. For example, information of a search request and a search result associated with the search request may be presented to a guide. A reviewer may be selected based on information associated with the reviewer. For example, a guide associated with a keyword(s), a category(ies) or a profile(s) associated with a search request may be selected to review a search result associated with the search request. Alternately, a guide associated with a category might be might be selected to review a search resource or an advertisement associated with the category. Control is passed to operation 620 and process 600 continues.

In operation 617, information of a reference item(s) is delivered to a reviewer (expert). For example, information of a search request may be presented to a guide. A reviewer may be selected based on information associated with the reviewer. For example, a guide(s) associated with a keyword(s), a category(ies) or a profile(s) associated with a search request may be selected to receive information of the search request. Alternately, a guide(s) associated with a category might be selected to receive information of the category. In at least one embodiment, a reviewer may be an automated system and/or an API. Control is passed to operation 622 and process 600 continues.

In operation 622 a new review item is obtained. For example, a selected guide or researcher may perform an information search and provide a search result responsive to a request presented in operation 617. Alternately, a guide(s) associated with a category might identify a search resource, an advertisement, training materials, or any other type of information responsive to the category information presented in operation 617. In at least one embodiment, information of a reference item may be submitted to an automated search in order to obtain a new review item. Control is passed to operation 627 and process 600 continues.

In operation 627 a review is performed which includes an item(s) obtained in operation 622. In a preferred embodiment, a review process such as those described herein with respect to FIG. 4, FIG. 5, and FIG. 7 may be used. For example, a selected guide(s) may review any or all search results associated with a search request. Likewise, a guide(s) associated with a category might review a search resource(s), an advertisement(s), training material(s), or any other type(s) of information associated with the category. Any review item(s) associated with a reference item may be reviewed. Control is passed to operation 645 and process 600 continues.

In operation 620 a determination is made as to whether a reviewer rejects a review item(s). If it is determined in operation 620 that a reviewer does not reject a review item(s), control is passed to operation 650 and process 600 continues. If in operation 620 it is determined that a reviewer rejects a review item(s), control is passed to operation 625 and process 600 continues.

In operation 650 an item usage indicator is updated. Information regarding the review of the item is recorded in the database 120 (FIG. 1). For example, an identifier of the reviewer, time and date information associated with the review, etc. may be recorded. Control is passed to operation 605 and process 600 continues.

In operation 625 a new review item is obtained. For example, a searcher or guide may obtain a search result responsive to a search request which was presented to a reviewer in operation 615 or the search request may be submitted to an automated search system. Likewise a new search resource might be located by a guide, or a new advertisement might be obtained from a database of advertisements. Control is passed to operation 630 and process 600 continues.

In operation 630 a comparison review by a reviewer is conducted. For example, a searcher or guide may be presented with a search request, the new search result obtained in operation 625 and the previous search result which was rejected in operation 620. Control is passed to operation 635 and process 600 continues.

In operation 635 a determination is made as to whether a reviewer selects the new review item. If it is determined in operation 635 that a reviewer does not select the new review item, control is passed to operation 650 and process 600 continues. If in operation 635 it is determined that a reviewer selects the new review item, control is passed to operation 640 and process 600 continues.

In operation 640 the new review item is associated with the reference item(s). For example, a new search result may be associated with a search request, or a new resource may be associated with a category, etc. Control is passed to operation 645 and process 600 continues.

In operation 645 the item usage counter is updated to reflect the results of the comparison process. Information associated with reference items such as a search request, a keyword(s), a category(ies), a profile(s), etc. and/or review items such as a search result(s), a search resource(s), an advertisement(s), etc. may be recorded or modified. Control is passed to operation 605 and process 600 continues.

An exemplary process for grouping review items is illustrated in FIG. 7A. A list of items has length N. The highest rated item is paired with the lowest rated item, the second highest with the second lowest, etc. Such a pairing process may be used in conjunction with the process 300 illustrated in FIG. 3. Results of comparisons may be used to re-compute a ranking of the items in the list. For example, after an initial comparison, the winning items may be compared to each other. In such a case, N−1 comparisons may be used to determine a 'best' item.

An exemplary process for grouping review items is illustrated in FIG. 7B. A list of items has length N. The top-ranked result is paired with the second ranked result, and the lowest ranked result is paired with the second lowest ranked result. Such a pairing process may be used in conjunction with the process 300 illustrated in FIG. 3. Results of comparisons may be used to re-compute a ranking of the items in the list. For example, after an initial comparison, only the winning items might be compared to winning items, and losing results may be compared to each other.

An exemplary process for grouping of review items is illustrated in FIG. 7C. A single item is compared to each of three other items. If the item is a winner in each of the three comparisons, it may be designated as a top-ranked item which is to be used. For example, if only one search result is to be presented to a user(s) responsive to a search request, a human touched search result which is determined to be superior to three automated search results produced responsive to the search request may be presented.

An exemplary process for determining a ranking of items is illustrated in FIG. 7D. A list of N items is grouped, using for example the grouping processes illustrated in FIG. 7A or FIG. 7B, and successive comparisons are conducted between the members of the list. After each round of voting, the list of losing items may be sorted, and inserted at the lower end of a ranking based on their prior ranking. The best item is the item which has not been determined to be inferior in any comparison. The number of comparisons is N−1 when groups of 2 items are used.

An exemplary process for determining a ranking of items is illustrated in FIG. 7E. A list of N items is grouped in pairs. Each of the N items is compared to each of the other items. The ranking of an item is determined based on the total number of comparisons in which it was judged to be superior. Every item is compared to every other item, and thus the ranking takes more comparisons (i.e., N factorial), but may provide a more consistent ranking of items as all items are compared regardless of rank. The processes illustrated in FIGS. 7A through 7E are used for the purposes of illustration, and other methods for pairing items for comparison and ranking will readily occur to one of ordinary skill in the relevant art.

As illustrated in FIG. 8, an exemplary request record 800 is provided, of which one or more may be associated with or resident in the search database 120 (FIG. 1), and may include a request identification (ID) field 805, a request content field 810, a request user ID field 815, a request guide ID field 820, a request category ID field 825, a request profile ID field 830, a request result ID field 835, a request result rank field 840, a request advertisement ID field 845, a request advertisement rank field 850 and a request usage information field 855.

A request record may be created by various processes, including a guided search session, an interactive training session, a non-interactive training session, may be imported from an external resource accessible to the search system, submission of a search request to a resource(s) such as a search engine(s), etc.

The request ID field 805 preferably contains a unique identifier of a request, which is preferably used consistently. For example, in at least one embodiment, the request ID field 805 can include a randomly generated numerical code, and/or a text string indicating the content of a query. A request ID serves to distinguish the request record associated with a request from a request record associated with other requests. Other unique identifiers of a search request may be utilized without departing from the spirit and scope of the embodiments.

A unique identifier is assigned to a request when it is entered into the search database. If it is determined that a search request is identical to a request in the search database, the request may be assigned the same request ID and information of the search request may be added to the request record associated with the request ID. A query or search request may include information that is not explicitly entered by a user/requester. For example, location information, profile information, etc. may be associated with a query which might differentiate the query from a query in the search database 120 (FIG. 1). A search request which is determined to be unique may receive a new request ID and an associated query record. As illustrated in FIG. 8, 'Request1' is the request ID associated with the request record 800 (FIG. 8).

The request content field 810 includes information regarding the content of a search request. For example, text associated with a query submitted by a user may be indicated in the request content field 810. Such information may be processed in order to associate a keyword(s) and/or category(ies) or other information with a search request. In at least one embodiment, a structured query which conforms to a specific context may be indicated in the request content field 810. User queries which are associated with a structured query which may have been submitted by more than one user may be indicated in the request content field 810. Information such as audio recordings, images, etc. which are associated with a search request may be indicated in the request content field 810. Using the example illustrated in FIG. 8, the query 'What is the best Thai restaurant in Indy?' is the query content associated with the request record 800. This may indicate that the query 'What is the best Thai restaurant in Indy?' may be presented to a voter(s) selected to vote regarding a search result(s) or other item(s) associated with the request 'Request1'.

The request user ID field 815 includes information of a user(s) that submitted a query to the search system 130 (FIG. 1). The request user ID field 815 (FIG. 8) may be used to associate a user(s) with a query. Multiple users may submit an equivalent search request to the search system 130 (FIG. 1). A search result(s) and/or other item(s) associated with a search request may be presented to a user(s) and/or a guide(s) responsive to a search request in an order based at least in part on a ranking of the item(s) associated with the search request. An identifier(s) of a number of users may be indicated in the request user ID field 815. Information indicated in the request user ID field 815 may be used to obtain information of a user(s) using a record(s) such as the user record 1000 illustrated in FIG. 10. Using the example illustrated in FIG. 8 the users 'User1' and 'User2' have been associated with the request 'Request1'.

The request guide ID field 820 includes information of a guide(s) who are associated with a search request. For example, if a guide obtains a search result(s) responsive to the search request 'Request1', an identifier of the guide may be indicated in the request guide ID field 820. Likewise, if a guide was selected to respond to a search request, an identifier of the guide may be indicated in the request guide ID field 820. Information indicated in the request guide ID field 820 may be used to obtain information associated with a guide using a record(s) such as the guide record 900 illustrated in FIG. 9. Using the example illustrated in FIG. 8 the guides 'Guide1' and 'Guide2' have been associated with the request 'Request1'.

The request category ID field 825 includes information of a category(ies) and/or keyword(s) associated with a request. The content of the request category ID field 825 may be modified by an automated classification of a request. A human may select a category(ies) and/or keyword(s) which is associated with a request. For example, a request may be associated with the category "Science>Astronomy", while another may be associated with the category "Arts>Music. A category may be associated with a search resource(s) such as a search engine, or a website, etc., a guide(s), an advertisement(s), etc. An item(s) associated with a category may be presented to a guide(s) and/or a user(s) when a search request associated with a category is submitted to the search system 130 (FIG. 1). An item(s) associated with a category and/or other information may be presented to a voter(s) for review. Association of a category with a request may be used to select items such as an advertisement(s) associated with the category to be presented to a user(s) responsive to a search request. Association of a category with a search request may be used to select a voter(s) associated with the category to vote regarding an item associated with the search request. Using the example illustrated in FIG. 8, the categories 'Category1' and 'Category2' are associated with the request 'Request1'.

The request profile ID field 830 includes information of a profile(s) which is associated with a search request. For example, a profile may be associated with a search request based at least in part on a profile(s) associated with a user(s) associated with a search request. For example, a geographic profile which is common to one or more users associated with a search request may be associated with a search request, or a guide may determine that a profile is to be associated with a search request based on the content of a search request(s) associated with a user(s). A guide selected to respond to a search request may be selected at least in part based on a profile(s) associated with the search request. A voter(s) may be selected to vote regarding an item(s) associated with a search request based at least in part on a profile(s) associated with a search request. Using the example illustrated in FIG. 8, the profile 'Profile1' is associated with the request 'Request1'.

The request result ID field 835 includes information of a result(s) which is associated with a search request. For example, a result may be associated with a search request when a guide obtains the search result responsive to the search request. For example, if a search request is submitted to the search system 130 (FIG. 1), a guide may be selected, and the guide may provide a search result(s) responsive to the request. Alternately, a search result(s) may be associated with a search request if the search request is submitted to a resource such as a search engine, or other resource system.

Any number of search results may be associated with a search request. Using the example illustrated in FIG. 8, the result 'Result1.1', the result 'Result1.2', the result 'Result1.3' and others have been associated with the request 'Request1'.

The request result rank field 840 includes information regarding a ranking of a search result(s) associated with a search request. In at least one embodiment, the request result ID field 835 and the request result rank field 840 are linked by for example a pointer. Using the example illustrated in FIG. 8, the result 'Result1.1' has a ranking of '1', the result 'Result1.2' has a ranking of '3', and the result 'Result1.3' has a ranking of '4'. The content of the request result ID field 835 and the request result rank field 840 may be used at least in part to determine an order in which a search result(s) are presented to a user(s) responsive to a search request. Using the example illustrated in FIG. 8, the result 'Result1.1' might be preferentially presented to a user(s) responsive to the request 'Request1'.

The request advertisement ID field 845 includes information of an advertisement(s) which is associated with a search request. For example, an advertisement may be associated with a search request when a guide selects the advertisement to be presented to a user responsive to the search request. For example, if a search request is submitted to the search system 130 (FIG. 1), a guide may be selected, and the guide may provide an advertisement(s) responsive to the request. Alternately, an advertisement(s) may be associated with a search request automatically such as when a category(ies) and/or a keyword(s) is associated with the search request. Any number of advertisements may be associated with a search request. Using the example illustrated in FIG. 8, the advertisements 'Advert1'; 'Advert4', 'Advert2', and others have been associated with the request 'Request1'.

The request advertisement rank field 850 includes information regarding a ranking of an advertisement(s) associated with a search request. In at least one embodiment, the request advertisement ID field 845 and the request advertisement rank field 850 are linked by for example a pointer. Using the example illustrated in FIG. 8, the advertisement 'Advert1' has a ranking of '3', the advertisement 'Advert4' has a ranking of '1', and the advertisement 'Advert2' has a ranking of '5'. The content of the request advertisement ID field 845 and the request advertisement rank field 850 may be used at least in part to determine an order in which an advertisement(s) are presented to a user(s) responsive to a search request. Using the example illustrated in FIG. 8, the advertisement 'Advert4' might be preferentially presented to a user(s) responsive to the request 'Request1'.

The request usage information field 855 may include information regarding a number of times that a search request has been submitted to the search system 130 (FIG. 1). For example, each time a search request is submitted to the search system, the usage counter may be updated. In at least one embodiment, request usage information may be utilized to determine whether a search result(s) associated with a search request are to be reviewed. Using the example illustrated in FIG. 8, the request 'Request1' has 'use counter=20', which may indicate that the search request 'Request1' has been submitted twenty times.

As illustrated in FIG. 9, an exemplary guide record 900 is provided, of which one or more may be associated with or resident in the search database 120 (FIG. 1), and may include a guide identification (ID) field 905, a guide category ID field 910, a guide topic ID field 915, a guide profile ID field 920, a guide result ID field 925, a guide communication info field 930, and a guide request ID field 935.

The guide ID field 905 preferably contains a unique identifier of a guide, which is preferably used consistently. For example, in at least one embodiment, the guide ID field 905 can include a randomly generated numerical code, and/or a text string indicating a name associated with a guide. A guide ID serves to distinguish the guide record associated with a guide from a guide record associated with other guides. Other unique identifiers of a guide may be utilized without departing from the spirit and scope of the embodiments. Using the example illustrated in FIG. 9, 'Guide1' is the guide ID associated with the guide record 900.

The guide category ID field 910 includes information of a category(ies) associated with a guide. The content of the guide category ID field 910 may be modified based on actions of a guide. A person may select a category(ies) and/or keyword(s) which is associated with a guide. A category may be associated with a guide based on testing of a guide(s). A category may be associated with a guide based on an affiliate group associated with a guide. For example, if a guide has chosen to be affiliated with affiliate groups associated with a type of music, a category associated with the type of music might be associated with the guide. A category(ies) associated with a guide may be used to select items which are to be presented to a guide. A guide(s) may be selected to vote regarding an item(s) based on the association of a guide with a category(ies). Using the example illustrated in FIG. 9, the categories 'Category1' and 'Category3' are associated with the guide 'Guide1'.

The guide topic ID field 915 includes information of a topic(s) associated with a guide. The content of the guide topic ID field 915 may be modified based on actions of a guide. A person may select a topic which is associated with a guide. For example, a guide may select a topic(s) to be associated with the guide during a registration process. A topic may be associated with a guide based on testing of a guide(s). For example, a guide may be required to demonstrate knowledge of a category and/or topic(s) in order to be associated with the topic(s). The content of the guide topic ID field 915 may be compared to the content of a search request in order to determine a ranking of a guide(s) for responding to a search request. Using the example illustrated in FIG. 9, the topics 'reggie miller', 'basketball' and 'fishing' are associated with the guide 'Guide1'. This may indicate that 'Guide1' has indicated an interest in those topics.

The guide profile ID field 920 includes information of a profile(s) associated with a guide. The content of the guide profile ID field 920 may be modified based on actions of a guide. A person may select a profile which is associated with a guide. For example, a guide may select a profile(s) to be associated with the guide during a registration process. A profile may be associated with a guide based on testing of a guide(s). For example, a guide may be required to demonstrate knowledge relevant to a profile(s) in order to be associated with the profile(s), or a guide may take a test which is used to generate a profile, or a guide may provide information such as demographic, geographic, personality or other information which may be indicated in a profile(s) associated with the guide. Information indicated in the content of the guide profile ID field 920 may be compared to information indicated in the content of a profile(s) associated with search request in order to determine a ranking of a guide(s) for responding to a search request. Likewise, a profile(s) associated with a guide(s) may be used to select and/or rank a guide(s) for voting. Using the example illustrated in FIG. 9, the profiles 'Demoprofileg1', 'Geoprofileg1' and 'Persprofileg1' are associated with the guide 'Guide1'. This may indicate that 'Guide1' has indicated and/or generated the profiles 'Demoprofileg1' which may be a demographic profile, 'Geoprofileg1' which may be a geographic profile and 'Persprofileg1' which might indicate personality information regarding the guide 'Guide1'.

The guide result ID field 925 includes information of a result(s) associated with a guide. The content of the guide result ID field 925 may be modified based on actions of a guide. If a guide produces a search result(s) responsive to a search request(s), an identifier of the search result(s) may be included in the guide result ID field 925. A rating(s) and/or ranking(s) associated with a search result(s) associated with a guide may affect compensation for a guide. Likewise a usage indicator associated with a search result(s) provided by a guide may affect a rating(s) or ranking(s) associated with a guide. Using the example illustrated in FIG. 9, the results 'Result1.1', 'Result3.1' and 'Result3.2' are associated with the guide 'Guide1'. This may indicate that 'Guide1' has provided the results 'Result1.1', 'Result3.1', and 'Result3.2' responsive to a search request(s).

The guide communication info field 930 includes information of a device(s) and/or service(s) associated with a guide. The content of the guide communication info field 930 may be modified based on actions of a guide. If a guide establishes communications with the search system using a device(s) and/or service(s) information regarding the device(s) and/or service(s) may be included in the guide communication info field 930. Any type of communication service(s) and/or system(s) may be indicated in the guide communication info field 930. For example, a username and/or password associated with a guide may be indicated in the guide communication info field 930. Communication services such as Instant Messaging (IM), e-mail, SMS, MMS, EMS, telephone, wireless or wired communication, etc. may be indicated in the guide communication info field 930. A telephone number, an email address, an IM provider and login ID, a keyword(s) associated with a service, etc. may be indicated in the guide communication info field 930, Using the example illustrated in FIG. 9, the login 'guide1', the email 'guide1@chacha.com', the IM credential 'guide1 @AIM' and the phone number '317.224.2242' are associated with the guide 'Guide1'. This may indicate that 'Guide1' may be contacted using the login ID 'guide1', via email at 'guide1@chacha.com', via IM as 'guide1@AIM' and via voice, text, or other service(s) associated with the phone number '317.224.2242'.

The guide request ID field 935 includes information of a request(s) associated with a guide. The content of the guide request ID field 935 may be modified based on actions of a guide. If a guide produces a search result(s) responsive to a search request(s), an identifier of the search request(s) may be included in the guide request ID field 935. A rating(s) and/or ranking(s) associated with a search request(s) associated with a guide may affect compensation for a guide. Likewise a usage indicator associated with a search request(s) and a guide may affect a rating(s) or ranking(s) associated with the guide. A request may be associated with a guide based on a vote(s) cast by a guide regarding items associated with the search request. Using the example illustrated in FIG. 9, the requests 'Request1', 'Request3' and others are associated with the guide 'Guide1'. This may indicate that 'Guide1' has responded to, been selected to respond to, and/or has voted regarding one or more item(s) associated with the requests 'Request1' and 'Request3'.

As illustrated in FIG. 10, an exemplary user record 1000 is provided, of which one or more may be associated with or resident in the search database 120 (FIG. 1), and may include a user identification (ID) field 1005, a user profile ID field 1010, a user request ID field 1015, a user result ID field 1020, a user advertisement ID field 1025, and a user communication info field 1030.

The user ID field 1005 preferably contains a unique identifier of a user, which is preferably used consistently. For example, in at least one embodiment, the user ID field 1005 can include a randomly generated numerical code, and/or a text string indicating a name associated with a user. A user ID serves to distinguish a user record associated with a user from a user record associated with other users. Other unique identifiers of a user may be utilized without departing from the spirit and scope of the embodiments. In at least one embodiment, a user ID may include a phone number associated with a user. Using the example illustrated in FIG. 10, 'User1' is the user ID associated with the user record 1000.

The user profile ID field 1010 includes information of a profile(s) associated with a user. The content of the user profile ID field 1010 may be modified based on actions of a user. A person may select a profile which is associated with a user. For example, a user may select a profile(s) to be associated with the user during a registration process. A profile may be associated with a user based on testing of a user(s). For example, a user may be required to demonstrate knowledge relevant to a profile(s) in order to be associated with the profile(s), or a user may take a test which is used to generate a profile, or a user may provide information such as demographic, geographic, personality or other information which may be indicated in a profile(s) associated with the user. A profile(s) associated with a user(s) may be used to select and/or rank a user(s) for voting. Using the example illustrated in FIG. 10, the profiles 'DemoprofileU1', 'GeoprofileU1' and 'PersprofileU1' are associated with the user 'User1'. This may indicate that 'User1' has indicated and/or generated the profiles 'DemoprofileU1' which may be a demographic profile, 'GeoprofileU1' which may be a geographic profile and 'PersprofileU1' which might indicate personality information regarding the user 'User1'.

The user request ID field 1015 includes information of a request(s) associated with a user. The content of the user request ID field 1015 may be modified based on actions of a user. If a user submits a search request to the search system 130 (FIG. 1) an identifier of the search request(s) may be included in the user request ID field 1015. Using the example illustrated in FIG. 10, the requests 'Request1', 'Request2' are associated with the user 'User1'. This may indicate that 'User1' has submitted the requests 'Request1' and 'Request2' to the search system 130 (FIG. 1).

The user result ID field 1020 includes information of a result(s) associated with a user. The content of the user result ID field 1020 may be modified based on actions of a user. If a user receives a search result(s) responsive to a search request(s), an identifier of the search result(s) may be included in the user result ID field 1020. A usage indicator associated with a search result(s) provided to a user(s) may affect a rating(s) or ranking(s) associated with a guide. Using the example illustrated in FIG. 10, the results 'Result1.1', 'Result1.2' and 'Result2.1' are associated with the user 'User1'. This may indicate that 'User1' has been presented with the results 'Result1.1', 'Result1.2', and 'Result2.1' responsive to a search request(s).

The user advertisement ID field 1025 includes information of an advertisement(s) associated with a user. The content of the user advertisement ID field 1025 may be modified based on actions of a user. If a user receives an advertisement(s) responsive to a search request(s), an identifier of the advertisement(s) may be included in the user advertisement ID field 1025. A usage indicator associated with an advertisement(s)

provided to a user(s) may affect a rating(s) or ranking(s) associated with a guide, compensation for the search system, and/or rating(s) or ranking(s) of an advertisement(s). Using the example illustrated in FIG. 10, the advertisements 'Advert1', 'Advert2' are associated with the user 'User1'. This may indicate that 'User1' has been presented with the advertisements 'Advert1', 'Advert2'.

The user communication info field 1030 includes information of a device(s) and/or service(s) associated with a user. The content of the user communication info field 1030 may be modified based on actions of a user. If a user establishes communications with the search system using a device(s) and/or service(s), information regarding the device(s) and/or service(s) may be included in the user communication info field 1030. Any type of communication service(s) and/or system(s) may be indicated in the user communication info field 1030. For example, a username and/or password associated with a user may be indicated in the user communication info field 1030. Communication services such as Instant Messaging (IM), e-mail, SMS, MMS, EMS, telephone, wireless or wired communication, etc. may be indicated in the user communication info field 1030. A telephone number, an email address, an IM provider and login ID, a keyword(s) associated with a service, etc. may be indicated in the user communication info field 1030, Using the example illustrated in FIG. 10, the login 'user1', the email 'user1@chacha.com', the twitter account 'twitter:user1' and the phone number '317.924.2242' are associated with the user 'User1'. This may indicate that 'User1' may be contacted using the login ID 'user1', via email at 'user1@chacha.com', via Twitter as 'user1' and via voice, text, or other service(s) associated with the phone number '317.924.2242'.

As illustrated in FIG. 11, an exemplary profile record 1100 is provided, of which one or more may be associated with or resident in the search database 120 (FIG. 1), and may include a profile identification (ID) field 1105, a profile geographic info field 1110, a profile demographic info field 1115, a profile personality info field 1120, a profile guide ID 1125 and a profile guide rating 1130.

The profile ID field 1105 preferably contains a unique identifier of a profile, which is preferably used consistently. For example, in at least one embodiment, the profile ID field 1105 can include a randomly generated numerical code, and/or a text string indicating a name associated with a profile. A profile ID serves to distinguish a profile record associated with a profile from a profile record associated with other profiles. Other unique identifiers of a profile may be utilized without departing from the spirit and scope of the embodiments. In at least one embodiment, a profile ID may include a description associated with a profile. Using the example illustrated in FIG. 11, 'Profile1' is the profile ID associated with the profile record 1100.

The profile geographic info field 1110 may include geographic information associated with a profile. Any type of geographic information may be indicated in the profile geographic info field 1110. For example, GPS coordinates, a street address, a neighborhood name, a postal code, a city name, a state name, etc. could be indicated in the profile geographic info field 1110. Using the example illustrated in FIG. 1 the name 'Indiana' is associated with the profile 'Profile1'. This may indicate that guides and/or users with home addresses in the state of 'Indiana' will match the profile 'Profile1'.

The profile demographic info field 1115 may include demographic information associated with a profile. Any type of demographic information may be indicated in the profile demographic info field 1115. For example, date of birth, sex, race, political affiliation, income, number of children, marital status, membership in organizations, etc. could be indicated in the profile demographic info field 1115. Using the example illustrated in FIG. 11, the profile 'under30 'AND'over20' is associated with the profile 'Profile1'. This may indicate that guides and/or users with ages greater than 20 years and less than 30 years will match the profile 'Profile1'.

The profile personality info field 1120 may include personality information associated with a profile. Any type of personality information may be indicated in the profile personality info field 1120. For example, information of personality traits such as aggressiveness, curiosity, friendliness, intelligence, honesty etc. could be indicated in the profile personality info field 1120. Using the example illustrated in FIG. 11, the profile 'Foodie' is associated with the profile 'Profile1'. This may indicate that guides and/or users with an interest in food and restaurants will match the profile 'Profile1'.

The profile guide ID field 1125 includes information of a guide(s) who are associated with a profile. For example, if a guide elects to receive search requests associated with the profile 'Profile1', an identifier of the guide may be indicated in the profile guide ID field 1125. Information indicated in the profile guide ID field may be used to obtain information associated with a guide using a record(s) such as the guide record 900 (FIG. 9). Using the example illustrated in FIG. 11 the guides 'Guide1', 'Guide3', 'Guide2', 'Guide4' and 'Guide5' have been associated with the profile 'Profile1'.

The profile guide rating field 1130 includes information regarding a rating of a guide(s) associated with a profile. In at least one embodiment, the profile guide ID field 1125 and the profile guide rating field 1130 are linked by for example a pointer. Using the example illustrated in FIG. 11, the guide 'Guide1' has a rating of '2', the guide 'Guide3' has a rating of '2', the guide 'Guide2' has a rating of '1', the guide 'Guide4' has a rating of '3' and the guide 'Guide5' has a rating of '3'. The content of the profile guide ID field 1125 and the profile guide rating field 1130 may be used at least in part to determine an order in which a guide(s) are notified responsive to a search request, a voting activity, or other types of tasks and/or activities associated with a profile(s). Using the example illustrated in FIG. 11, the guide 'Guide2' might be preferentially notified of a search request associated with the profile 'Profile1'.

As illustrated in FIG. 12, an exemplary category record 1200 is provided, of which one or more may be associated with or resident in the search database 120 (FIG. 1), and may include a category identification (ID) field 1205, a category description field 1210, a category guide ID field 1215, a category guide rating field 1220, a category resource ID field 1225, a category resource rating field 1230, a category advertisement ID field 1235, and a category advertisement rating field 1240.

A category record may be created by various processes, including through a guided search session, an interactive training session, a non-interactive training session, a selection(s) made by a guide(s), and may be imported from an external resource accessible to the search system 130 (FIG. 1), submission of a search request to a resource(s) such as a search engine(s), etc.

The category ID field 1205 preferably contains a unique identifier of a category, which is preferably used consistently. For example, in at least one embodiment, the category ID field 1205 can include a randomly generated numerical code, and/or a text string indicating the content of a query. A category ID serves to distinguish the category record associated with a category from a category record associated with other categories. Other unique identifiers of a category may be utilized without departing from the spirit and scope of the embodiments. As illustrated in FIG. 12, 'Category1' is the category ID associated with the category record 1200 (FIG. 12).

The category description field 1210 includes information of a description associated with a category. For example, text associated with a category may be indicated in the category description field 1210. Such information may be used to assist a guide in associating a search request with a category(ies). In at least one embodiment, a description of a category and other item(s) associated with a category may be presented to a guide(s) in order to allow a guide(s) to indicate a preferred item(s). For example, an advertisement(s), a search resource(s), etc. may be presented to a guide(s) associated with a category(ies) in order that a guide(s) may vote regarding the advertisement(s), the search resource(s), etc. As illustrated in FIG. 12, 'Entertainment>Dining' is the category description associated with the category 'Category1'.

The category guide ID field 1215 includes information of a guide(s) who are associated with a category. For example, if a guide elects to receive search requests associated with the category 'Category1', an identifier of the guide may be indicated in the category guide ID field 1215. Information indicated in the category guide ID field may be used to obtain information associated with a guide using a record(s) such as the guide record 900 (FIG. 9). Using the example illustrated in FIG. 12 the guides 'Guide1', 'Guide2', and 'GuideN' have been associated with the category 'Category1'.

The category guide rating field 1220 includes information regarding a rating of a guide(s) associated with a category. In at least one embodiment, the category guide ID field 1215 and the category guide rating field 1220 are linked by for example a pointer. Using the example illustrated in FIG. 12, the guide 'Guide1' has a rating of '10', the guide 'Guide2' has a rating of '6', and the guide 'GuideN' has a rating of '2'. The content of the category guide ID field 1215 and the category guide rating field 1220 may be used at least in part to determine an order in which a guide(s) are notified responsive to a search request, a voting activity, or other types of tasks and/or activities associated with a category(ies). Using the example illustrated in FIG. 12, the guide 'Guide1' might be preferentially notified of a search request associated with the category 'Category1'.

The category resource ID field 1225 includes information of a resource(s) associated with a category. For example, if a guide utilizes a resource to respond to a search request(s) associated with the category 'Category1', an identifier of the resource may be indicated in the category resource ID field 1225. Information indicated in the category resource ID field may be used to obtain information associated with a resource using a record(s) such as the resource record 1400 illustrated in FIG. 14. Using the example illustrated in FIG. 12 the resources 'Resource1', 'Resource2', and 'ResourceN' have been associated with the category 'Category1'.

The category resource rating field 1230 includes information regarding a rating of a resource(s) associated with a category. In at least one embodiment, the category resource ID field 1225 and the category resource rating field 1230 are linked by for example a pointer. Using the example illustrated in FIG. 12, the resource 'Resource1' has a rating of '8', the resource 'Resource2' has a rating of 8.5°, and the resource 'ResourceN' has a rating of '3'. The content of the category resource ID field 1225 and the category resource rating field 1230 may be used at least in part to determine an order in which a search resource(s) are presented and/or utilized responsive to a search request associated with a category(ies). Using the example illustrated in FIG. 12, the resource 'Resource2' might be preferentially presented to a guide(s) associated with the category 'Category1'.

The category advertisement ID field 1235 includes information of an advertisement(s) associated with a category. For example, if a guide selects an advertisement to be sent to a user responsive to a search request(s) associated with the category 'Category1', an identifier of the advertisement may be indicated in the category advertisement ID field 1235. Information indicated in the category advertisement ID field may be used to obtain information associated with an advertisement using a record(s) such as the advertisement record 1500 illustrated in FIG. 15. Using the example illustrated in FIG. 12 the advertisements 'Advert1', 'Advert2', and 'AdvertN' have been associated with the category 'Category1'.

The category advertisement rating field 1240 includes information regarding a rating of an advertisement(s) associated with a category. In at least one embodiment, the category advertisement ID field 1235 and the category advertisement rating field 1240 are linked by for example a pointer. Using the example illustrated in FIG. 12, the advertisement 'Advert1' has a rating of '1', the advertisement 'Advert2' has a rating of '3', and the advertisement 'AdvertN' has a rating of '9'. The content of the category advertisement ID field 1235 and the category advertisement rating field 1240 may be used at least in part to determine an order in which an advertisement(s) are presented to a guide(s) and/or a user(s) responsive to a search request associated with a category(ies). Using the example illustrated in FIG. 12, the advertisement 'AdvertN' might be preferentially presented to a guide(s) and/or a user(s) responsive to a search request associated with the category 'Category1'.

Rating information of a guide(s), an advertisement(s), a search resource(s), and other information associated with a category may be based at least in part on votes of guides associated with the category, but may be based on any information indicated in the database 120 (FIG. 1).

As illustrated in FIG. 13, an exemplary result record 1300 is provided, of which one or more may be associated with or resident in the search database 120 (FIG. 1), and may include a result identification (ID) field 1305, a result guide ID field 1310, a result content info field 1315, a result resource ID field 1320 and a result usage information field 1325.

The result ID field 1305 preferably contains a unique identifier of a result, which is preferably used consistently. For example, in at least one embodiment, the result ID field 1305 can include a randomly generated numerical code, and/or a text string indicating a name associated with a result. A result ID serves to distinguish the result record associated with a result from a result record associated with other results. Other unique identifiers of a result may be utilized without departing from the spirit and scope of the embodiments. In at least one embodiment, a result ID may include a description associated with a result. Using the example illustrated in FIG. 13, 'Result1.1' is the result ID associated with the result record 1300.

The result guide ID field 1310 may include information of a guide(s) associated with a result. For example, a guide who obtained a search result may be indicated in the result guide ID field 1310. In at least one embodiment a guide ID associated with a guide(s) who have voted on a result may be indicated in the result guide ID field 1310. Information contained in the result guide ID field 1310 may be used to obtain information regarding a guide associated with a search result based on records such as the guide record 900 (FIG. 9). Using the example illustrated in FIG. 13 the guide ID 'Guide1' is associated with the result 'Result1.1' which may indicate that the guide 'Guide1' has provided the search result 'Result1.1'.

The result content info field 1315 may include information of content of a search result. For example, a text snippet associated with a search result may be indicated in the result content info field 1315. A URL or other information associated with a search result may be indicated in the result content info field 1315. Information contained in the result content info field 1315 may be used to provide a search result to a user(s) and/or a guide(s). Using the example illustrated in FIG. 13, the text snippet 'That sensations is the best That restaurant in Indy' is associated with the result 'Result1.1'. This may indicate that the text snippet may be provided to a user when the result 'Result1.1' is selected to be presented to a user.

The result resource ID field 1320 may include information of a search resource associated with a search result For example, a URL associated with a web page from which a text snippet was obtained may be indicated in the result resource ID field 1320. A URL or other information such as a search query and/or a macro instruction(s) associated with a search resource may be indicated in the result resource ID field 1320. Information contained in the result resource ID field 1320 may be used to provide access to a search resource(s) for a guide(s) and/or the search system 130 (FIG. 1). Using the example illustrated in FIG. 13, 'Resource2' is the resource ID associated with the result 'Result1.1'. This may indicate that the resource 'Resource2' was used to obtain the search result 'Result1.1'.

The result usage information field 1325 may include information regarding the use of a search result. For example, a number of times that a search result has been presented to a user(s) may be indicated in the result usage information field 1325. Using the example illustrated in FIG. 13, the indicator 'use counter=120' is associated with the result 'Result1.1'. This may indicate that the result 'Result1.1' has been presented to a user(s) one hundred twenty times. Information in the result usage information field 1325 may be utilized to determine whether a search result is to be reviewed.

As illustrated in FIG. 14, an exemplary resource record 1400 is provided, of which one or more may be associated with or resident in the search database 120 (FIG. 1), and may include a resource identification (ID) field 1405, a resource guide ID field 1410, a resource description field 1415, a resource access info field 1420 and a resource usage information field 1425.

The resource ID field 1405 preferably contains a unique identifier of a resource, which is preferably used consistently. For example, in at least one embodiment, the resource ID field 1405 can include a randomly generated numerical code, and/or a text string indicating a name associated with a resource. A resource ID serves to distinguish the resource record associated with a resource from a resource record associated with other resources. Other unique identifiers of a resource may be utilized without departing from the spirit and scope of the embodiments. In at least one embodiment, a resource ID may include a description associated with a resource. Using the example illustrated in FIG. 14, 'Resource2' is the resource ID associated with the resource record 1400.

The resource guide ID field 1410 may include information of a guide(s) associated with a resource. For example, a guide(s) who utilized a search resource may be indicated in the resource guide ID field 1410. In at least one embodiment a guide ID associated with a guide(s) who have voted on a resource may be indicated in the resource guide ID field 1410. Information contained in the resource guide ID field 1410 may be used to obtain information regarding a guide associated with a search resource based on records such as the guide record 900 (FIG. 9). Using the example illustrated in FIG. 14, the guide ID 'Guide1' is associated with the resource 'Resource2' which may indicate that the guide 'Guide1' has administrative access to the search resource 'Resource2'.

The resource description field 1415 may include information of a description of a search resource. For example, a text snippet associated with a search resource may be indicated in the resource description field 1415. A URL or other information associated with a search resource may be indicated in the resource description field 1415. Information contained in the resource description field 1415 may be used to provide a description of search resource to a user(s) and/or a guide(s). Using the example illustrated in FIG. 14, the text snippet 'Dining in Indiana' is associated with the resource 'Resource2'.

The resource access info field 1420 may include access information associated with a search resource. For example, a URL associated with a web page may be indicated in the resource access info field 1420. A password, a login ID, a template for submitting a search query, an API for submitting and receiving information or any other information which may be utilized to access a search resource may be indicated in the resource access info field 1420. Information contained in the resource access info field 1420 may be used to provide access to a search resource(s) for a guide(s) and/or the search system 130 (FIG. 1). Using the example illustrated in FIG. 14, the URL 'www.diningindy.com' is the access information associated with the resource 'Resource2'. This may for example indicate that a search result(s) may be obtained using the resources found at 'www.diningindy.com'.

The resource usage information field 1425 may include information regarding the use of a search resource. For example, a number of times that a search resource has been utilized by a guide(s) may be indicated in the resource usage information field 1425. Using the example illustrated in FIG. 14, the indicator 'use counter=180' is associated with the resource 'Resource2'. This may indicate that the resource 'Resource2' has been utilized by a guide(s) one hundred eighty times. Information in the resource usage information field 1425 may be utilized to determine whether a search resource is to be reviewed.

As illustrated in FIG. 15, an exemplary advertisement record 1500 is provided, of which one or more may be associated with or resident in the search database 120 (FIG. 1), and may include an advertisement identification (ID) field 1505, an advertisement description field 1510, an advertisement access info field 1515 and an advertisement usage information field 1520.

The advertisement ID field 1505 preferably contains a unique identifier of an advertisement, which is preferably used consistently. For example, in at least one embodiment, the advertisement ID field 1505 can include a randomly generated numerical code, and/or a text string indicating a name associated with an advertisement. An advertisement ID serves to distinguish the advertisement record associated with an advertisement from an advertisement record associated with other advertisements. Other unique identifiers of an advertisement may be utilized without departing from the spirit and scope of the embodiments. In at least one embodiment, an advertisement ID may include a description associated with an advertisement. Using the example illustrated in FIG. 15, 'Advert1' is the advertisement ID associated with the advertisement record 1500.

The advertisement description field 1510 may include information of a description associated with an advertisement. For example, a description of an advertisement may be presented to a guide(s) in order that a guide may select an advertisement to be associated with a search request. Using the example illustrated in FIG. 15, 'Gokimchee the asian grocery in fishers' is the advertisement description associated with the advertisement 'Advert1'. Any type of information such as text, audio, video, images, etc. may be indicated in the advertisement description field 1510.

The advertisement access info field 1515 may include access information associated with an advertisement. For example, a URL associated with a web page may be indicated in the advertisement access info field 1515. Information contained in the advertisement access info field 1515 may be used to provide access to an advertisement(s) for a guide(s) and/or the search system 130 (FIG. 1). Using the example illustrated in FIG. 15, the URL 'https://adserverchacha.com\gokimchee' is the access information associated with the advertisement 'Advert1'. This may for example indicate that the advertisement 'Advert1' may be delivered to a user using content accessed at 'https://adserver.chacha.com\gokimchee'.

The advertisement usage information field 1520 may include information regarding the use of an advertisement. For example, a number of times that an advertisement has been delivered to a user(s) may be indicated in the advertisement usage information field 1520. Using the example illustrated in FIG. 15, the indicator 'use counter=180' is associated with the advertisement 'Advert1'. This may indicate that the advertisement 'Advert1' has been delivered to user(s) one hundred eighty times. Information in the advertisement usage information field 1520 may be utilized to determine whether an advertisement is to be reviewed, and may be utilized to determine compensation for a guide(s) and/or the provider of the search system 130 (FIG. 1).

Figure 16:
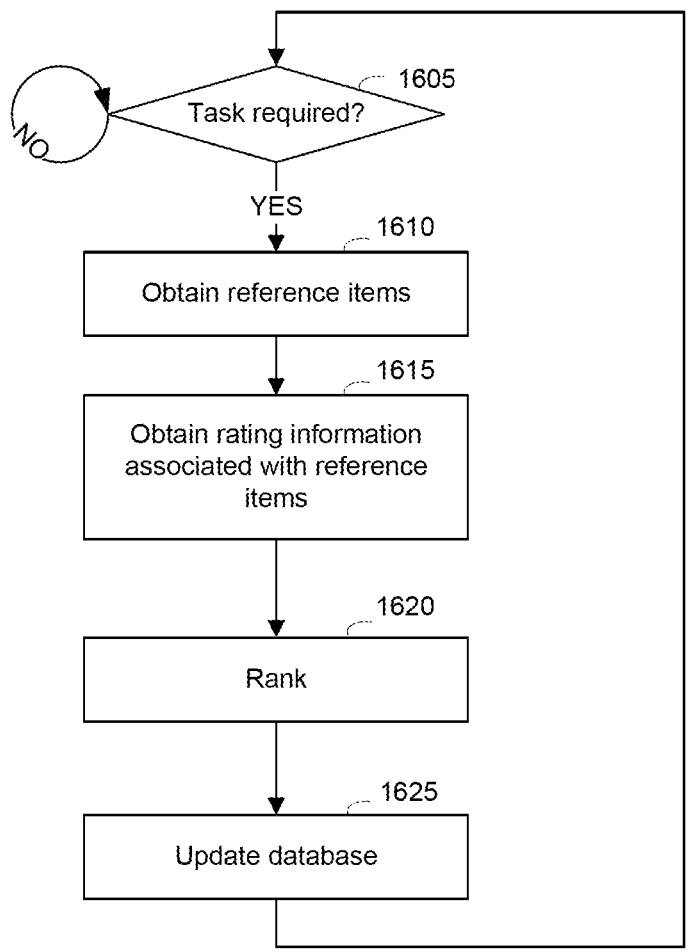
FIG. 16 is a flowchart of a process of creating a notification table.

As illustrated in FIG. 16, a process 1600 for creating a notification table is provided. A notification table may be used to determine an order in which one or more persons and/or entities may be notified of a task.

In operation 1605 a determination is made as to whether a notification table preparation task is required. If it is determined in operation 1605 that a notification table is not to be prepared, control remains at operation 1605 and process 1600 continues. If in operation 1605 it is determined that a notification table is to be prepared, control is passed to operation 1610 and process 1600 continues. In at least one embodiment, the determination that a notification table is to be prepared is based on a task becoming available. For example, if a search request is submitted, or if a review is needed, or if any other type of task requiring work to be performed is identified, it may be determined that a notification table is to be prepared. In at least one embodiment, if all resources associated with a notification table have been notified, it may be determined that a notification table is to be prepared.

In operation 1610, a reference item(s) associated with task is obtained. For example, information of a search request may be obtained, which may include a query, image(s), audio, media, keyword(s), category(ies), tag(s), profile(s), etc. Likewise, information of a category, an advertisement, or any item(s) which may be associated with information which may be associated with rating information may be obtained. Control is passed to operation 1615 and process 1600 continues.

In operation 1615, rating and/or ranking information associated with a reference item(s) is obtained. For example, rating information of a person resource, or entity associated with a reference item, which may include a query, image(s), audio, media, keyword(s), category(ies), tag(s), profile(s), etc. may be obtained. A rating(s) may be based on any type of information. For example, a guide rating associated with a category(ies), a keyword(s), a profile(s), etc. may be based on user ratings, peer ratings, ratings of results produced by the guide, activity(ies) of a guide, training of a guide, etc. Any number of items associated with rating information may be used to identify rating information associated with a guide. While a guide has been used for the purpose of simplicity, users, resource(s) and/or other items may be associated a reference item which may be associated with rating information. Control is passed to operation 1620 and process 1600 continues.

In operation 1620, a ranking of a guide(s) and/or other items identified in operation 1615 is performed. For example, all guides who are eligible and/or available for an activity may be ranked based on the rating data identified in operation 1615. Likewise, users who might be available and/or eligible to perform an activity might be ranked, or resources which might respond to a request might be ranked, or resources which might provide information of any sort might be ranked. Any type of item(s) indicated in the database 120 (FIG. 1) might be ranked based on rating information. Control is passed to operation 1625 and process 1600 continues.

In operation 1625, the system database 120 is updated. In at least one embodiment, a notification table is made available for use by the system 130 (FIG. 1). Information associated with a notification table may be recorded, such as a task ID associated with a notification table, etc. Information associated with items indicated in a notification table may be updated to indicate that an item has been added to a notification table, or that an item was not included in a notification table, or a ranking associated with an item in a notification table, etc. Control is passed to operation 1605 and process 1600 continues.

Figure 16A:
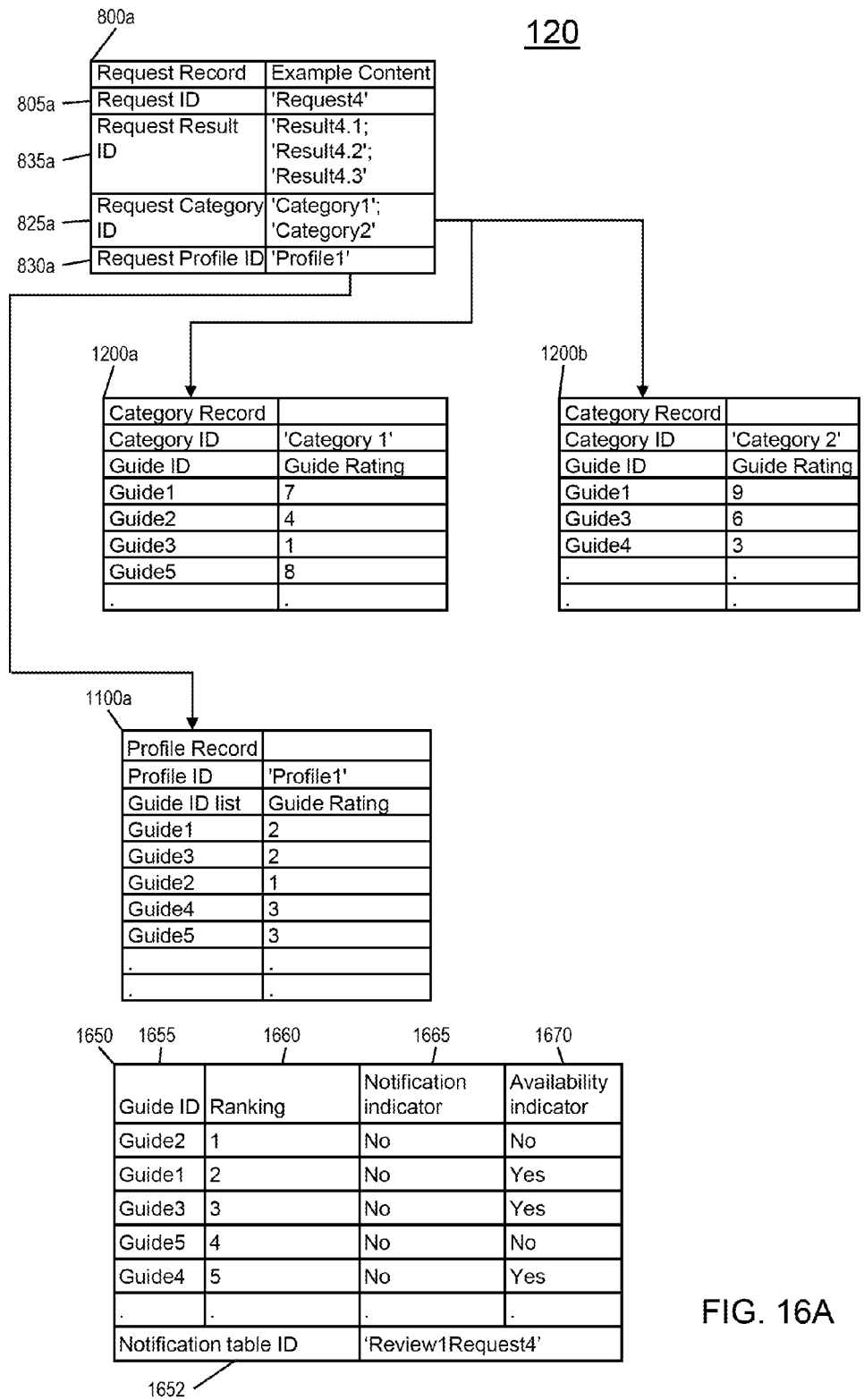
FIG. 16A illustrates a database relationship.

A database relationship for creating a ranked list of guides to be associated with a reference item and a review items is illustrated in FIG. 16A. A reference item may be an item such as a search request, a category, or any combination of item(s) which may be presented to a guide as a reference for an action. For example, a search request may be presented to a guide in order that a guide may provide a search result(s) responsive to a search request, or a search request may be presented to a guide in order that a guide may vote regarding search result(s) associated with the search request, or an indicator of a category may be presented to a guide in order that a guide may vote regarding a search resource(s), a topic, or a related category associated with the category. A review item may be an item such as a search result, a search resource, an advertisement, or any other item which may be presented for rating or voting. An index item may be any item such as a category, a profile, a location, a keyword, etc. which is used to select and/or rank guides based on a rating or ranking of guides associated with the guides and the index item. An index item may be associated with a reference item.

A notification table such as the notification table 1650 illustrated in FIG. 16A may be created of which one or more may be associated with or resident in the search database 120 (FIG. 1), and may include a notification table ID field 1652, a notification table guide ID field 1655, a notification table guide ranking field 1660, a notification indicator field 1665 and an availability indicator field 1670. A task notification table may be associated with a reference item such as a search request.

The notification table ID field 1652 preferably contains a unique identifier of a notification table, which is preferably used consistently. For example, in at least one embodiment, the notification table ID field 1652 can include a randomly generated numerical code, and/or a text string indicating a name associated with a task. A notification table ID serves to distinguish the notification table record associated with a notification table from a notification table record associated with other notification tables. Other unique identifiers of a notification table may be utilized without departing from the spirit and scope of the embodiments. In at least one embodiment, a notification table ID may include a description associated with a task. Using the example illustrated in FIG. 16A, 'Review1Request4' is the notification table ID associated with the notification table 1650.

The notification table guide ID field 1655 includes a list of guide identifiers which may be used to contact a guide(s), the notification table guide ranking field 1660 indicates a ranking of the guide associated with the guide ID indicated in the notification table guide ID field 1655. Using the example in FIG. 16, 'Guide2' is ranked '1', 'Guide1' is ranked '2', 'Guide3' is ranked '3', 'Guide5' is ranked '4', and 'Guide4' is ranked '5'. The notification indicator field 1665 indicates whether a guide indicated in the notification table guide ID field 1655 has been notified of a task. Using the example in FIG. 16A, none of the guides has been notified of the task 'Review1Request4' as indicated by the 'No' in the notification indicator field 1665. The availability indicator field 1670 indicates the availability of a guide. The availability status of a guide may change from time to time as guides become available from a task, as guides login to the system 100 (FIG. 1), or as guides are assigned tasks. Using the example in FIG. 16A, the guides 'Guide1', 'Guide3' and 'Guide4' are available as indicated by the 'Yes' in the availability indicator field 1670.

In order to determine the ranking of guides as indicated in the notification table guide ranking field 1660 of the notification table 1650, the rating(s) and/or ranking(s) of a guide(s) associated with one or more index items may be utilized. Using the example illustrated in FIG. 16A, a search 'Request4' associated with the request record 800a as indicated in the request ID field 805a, is associated with the review items 'Result4.1', 'Result4.2', and 'Result4.3' as indicated in the request result ID field 835a. The request 'Request 4' is associated with the categories 'Category1' and 'Category2' as indicated in the request category ID field 825a, and the profile 'Profile1' as indicated in the request profile ID field 830a. A ranking of guides is performed based on information contained in the category records 1200a and 1200b, and the profile record 1100a, For example, a geographic profile which includes a location may be associated with a search request, and a guide within a first distance of the location may be given a rating '1', guides within a second distance of the location may receive a rating of '2', and guide at any greater distance may receive a rating of '3'. A guide(s) may have a rating(s) associated with a category. For example, a guide rating may be based on a rating(s) of search results produced by a guide for search requests associated with a category, wherein a higher rating indicates a better success rate. Using the example illustrated in FIG. 16A, the guide ranking is based first on the rating associated with geographic location indicated in 'Profile1' and second on the average of rating(s) associated with 'Category1' and 'Category2'. Continuing with the example in FIG. 16A, the guide with the lowest rating with respect to the profile 'Profile 1' (i.e. 'Guide 2') is ranked first due to geographic proximity even though 'Guide2' has a low average rating associated with 'Category1' and 'Category2'. The guides 'Guide1' and 'Guide3' are ranked '2' and '3', respectively, as they have the same rating with respect to 'Profile1' and 'Guide1' has a higher average rating associated with 'Category1' and 'Category2', and 'Guide5' and 'Guide4' are ranked '4' and '5', respectively, as they are rated '3' with respect to 'Profile1' and 'Guide5' has a higher average rating associated with 'Category1' and 'Category2'.

While a few index items are illustrated in FIG. 16A, no limitation is implied thereby. Any number of index items may be utilized and any number of guides may be ranked using the method 1600 (FIG. 16). Any criteria may be applied to determine a ranking and/or rating associated with an index item such as a category, a location, a keyword, a profile, a tag, a topic, etc. While a group of guides who may vote regarding a search result(s) associated with a search request is used for the purposes of illustration, no limitation is implied thereby. For example, a group of users might be selected to review a search result(s) associated with a search request, or a group of guides might be notified of a search request which is pending a response. A notification table may be used to notify any person(s) or entity(ies) of a pending task(s).

Figure 17:
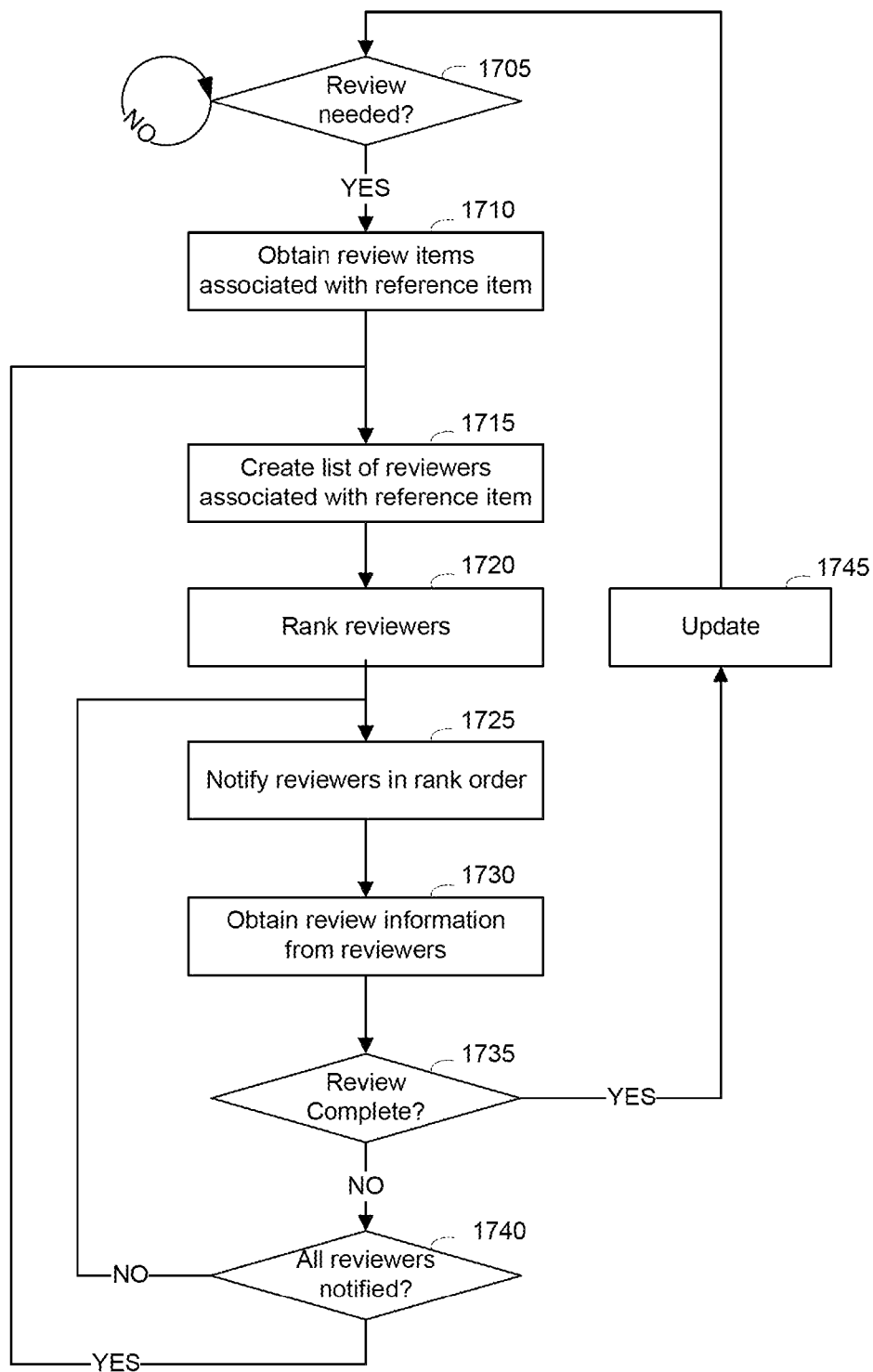
FIG. 17 is a flowchart of a process of reviewing items.

As illustrated in FIG. 17, a process 1700 for notification is provided.

In operation 1705, a determination is made as to whether review of an item is needed. If it is determined in operation 1705 that review of an item is not needed, control remains at operation 1705 and process 1700 continues. If in operation 1705 it is determined that review of an item is needed, control is passed to operation 1710 and process 1700 continues. In at least one embodiment, a value of a usage count associated with an item is utilized to determine whether review of an item is needed. In at least one embodiment, a number of review items associated with a reference item is utilized to determine whether review of an item is needed.

In operation 1710, review items associated with a reference item are obtained. For example if a review item such as a search result or a search resource has been determined to need review, a reference item such as a search query or a category may be presented to a searcher in order that an additional review item may be associated with a reference item. Likewise if a number of search results have been associated with a search request, or a number of topics have been associated with a category, a list of the reference items may be compiled for review. Control is passed to operation 1715 and process 1700 continues.

In operation 1715, a list of reviewers associated with a reference item is created. Voters associated with a reference item such as a search request may be identified. For example, voters associated with topic(s) and/or keyword(s) of a search request may be added to a reviewer list, or voters associated with a category(ies) and/or a profile(s) may be added to a reviewer list. Any information regarding a reviewer or voter may be used to select members of a list of reviewers for a reference item. For example, if a list of reviewers has been previously compiled based on one or more criteria, a list of reviewers may be compiled based on different criteria. Control is passed to operation 1720 and process 1700 continues.

In operation 1720, a ranking of reviewers is performed. For example, a notification table such as the notification table 1650 (FIG. 16A) may be constructed. Reviewers may be ranked based on various criteria. For example, reviewers may be ranked based on a rating(s) and/or ranking(s) associated with a reference item, as illustrated in FIG. 16A. In at least one embodiment, reviewers may be ranked based at least in part on a vote weight associated with a reviewer. Control is passed to operation 1725 and process 1700 continues.

In operation 1725, a reviewer(s) are notified in an order determined by the reviewer's rank. The highest ranking reviewer who is currently available and has not been notified of a review task is notified. Control is passed to operation 1730 and process 1700 continues.

In operation 1730 review information is obtained from a reviewer(s). For example one or more voters may register a vote regarding a review item(s), a reviewer may indicate acceptance or rejection of a review item(s), etc, Control is passed to operation 1735 and process 1700 continues.

In operation 1735, a determination is made as to whether a review is complete. If it is determined in operation 1735 that a review is complete, control is passed to operation 1745 and process 1700 continues. If in operation 1735 it is determined that a review is not complete, control is passed to operation 1740 and process 1700 continues. Various criteria may be used to determine whether a review is complete. Completion of a process such as the process 300 (FIG. 3) or the process 600 (FIG. 6) or the processes illustrated in FIG. 7C, 7D, or 7E may be used to determine that a review is complete. A review may be determined to be complete if a time period between the start of a review and the current time has exceeded a value.

In operation 1740, a determination is made as to whether all available reviewers in the review list created in operation 1715 have been notified. If it is determined in operation 1740 that all available reviewers in the review list created in operation 1715 have not been notified, control is passed to operation 1725 and process 1700 continues. If in operation 1740 it is determined that all available reviewers in the review list created in operation 1715 have been notified, control is passed to operation 1715 and process 1700 continues.

In operation 1745, the search database 120 (FIG. 1) is updated. Information of a rating and/or vote weight associated with a voter(s) and/or a profile(s), a category(ies), keyword(s), etc. is recorded. Information of a rating(s) and/or ranking(s) associated with item(s) such as a search result(s), a search resource(s), an advertisement(s), etc. is recorded and updated. Control is passed to operation 1705 and process 1700 continues.

FIG. 17A illustrates a notification process utilizing a notification table such as the notification table 1650a. A notification table ID is assigned to the notification table as indicated in the notification table ID field 1652a of the notification table 1650a. When the notification table 1650a is created, the notification indicator field 1665a, and the availability indicator field 1670a indicate the notification status and the availability status respectively of the selected reviewers at an initial time, t1. Likewise, the guide ID and the guide rank are indicated in the notification table guide ID field 1655a and the notification table guide ranking field 1660a.

As guides are notified of a task, the notification indicator field 1665a is modified to indicate the notification status of guides at a later time, t2. As illustrated in FIG. 17A, the notification status of the guides 'Guide2' and 'Guide3' have been set to 'Yes' to indicate that 'Guide2' and 'Guide3' have been notified of a task. As each guide may be allowed a time interval in which to respond to a task, a lower ranking guide such as 'GuideN' may not be notified at the time t2 although the guide is available for the task 'Review1Request2'.

As the availability status of guides may change, the guide 'Guide1' may become available at a time t3 which is later than t2 as indicated in the availability indicator field 1670a. In such a case, the guide 'Guide1' will be notified before the guide 'GuideN' due to the higher ranking of 'Guide1'.

At some later time, t4, all available guides may have been notified, as indicated in the notification indicator field 1665a of the notification table 1650a. In such a case, a new notification table 1650b may be created as indicated by the notification table ID field 1652b. The notification table guide ID field 1655b may include one or more guides who have previously been notified, as indicated in the notification indicator field 1665b. A guide who has been previously notified may not be notified again. A higher ranking guide as indicated in the notification table guide ranking field 1660b such as the guide 'Guide0' who has been included in the notification table 1650b may be notified first. A lower ranking guide such as the guide 'Guide4' who has become available as indicated in the availability indicator field 1670b and was not previously notified as indicated in the notification indicator field 1665b may not be notified until higher ranking guides such as 'Guide0' and 'Guide5' have been notified of a task associated with the notification tables 1650a and 1650b. The persistence of the notification indicator associated with a task which is associated with a notification table may improve the quality of the guides, who may be guides or other voters who are assigned to a task while avoiding notifying the same guide multiple times of a task.

Figure 18A:
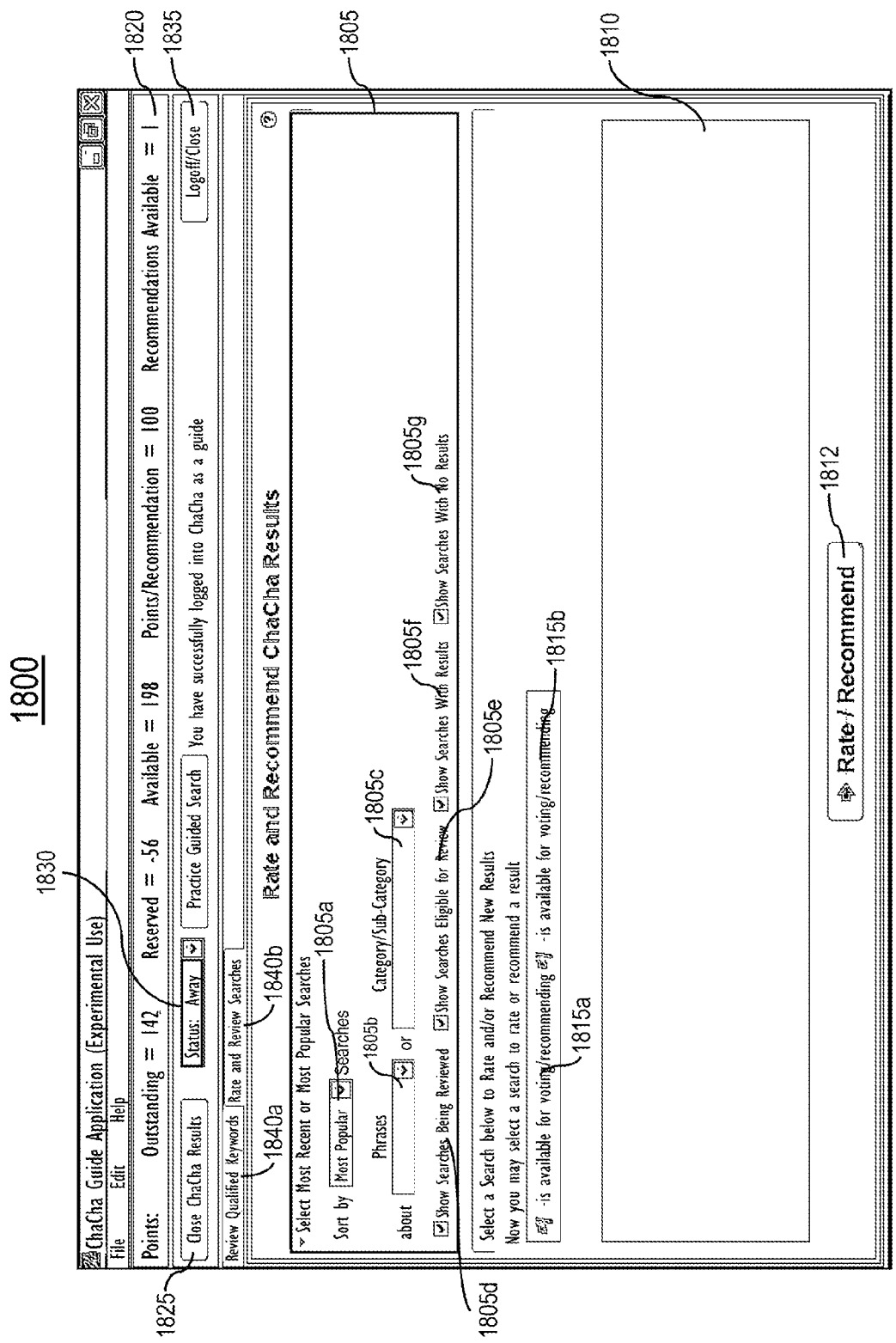

As illustrated in FIG. 18A, an exemplary GUI is provided for selection of result(s) associated with a query, resources associated with a branch of a taxonomy, or any review items(s) associated with a reference item(s). The GUI 1800 includes selection filtering controls 1805, a selection display window 1810, a rate/recommend button 1812, selection type indicators 1815, a scorecard indicator window 1820, a close button 1825, an availability selection control 1830, a logoff control 1835, and activity selection tabs 1840. The GUI 1800 may be used to select result(s) and/or other items to rate and/or edit. Items may be selected using filtering criteria. For example, queries may be sorted by most popular queries, most recent queries, queries which have a specific number of votes, queries associated with a profile, queries associated with a category or taxonomy branch, etc. A profile might include information such as a time interval, geographic location, or any other item(s) which might be used to filter queries based on information indicated in the search database 120 (FIG. 1). In at least one embodiment, a guide is able to indicate filtering criteria via a list that is provided as a drop-down menu, or by typing one or more words in a text entry box, etc.

The filter controls 1805 may be used to select a query(ies) using information associated with a query, such as a category (ies), keyword(s), tag(s), etc. Using the example illustrated in FIG. 18, the query type selector 1805a may be used to select requests or queries by popularity, time submitted, or other filtering options indicated in a drop-down list and/or typing box. The phrase selection filter control 1805b may be used to select queries which contain one or more words and/or phrases, and may be provided as a drop-down list and/or typing box. The category selection filter control 1805c may be used to select one or more categories which may be associated with a search request or search query. Various other forms of filtering interface may also be used.

In at least one embodiment, the filter controls 1805 include checkboxes for selecting a variety of selection options. The filter selection control 1805d may be used to select queries which are under review by selecting the check-box indicated. The filter selection control 1805e may be used to select queries which are eligible for review by selecting the check-box indicated. The filter selection control 1805f may be used to select queries which are associated with one or more results by selecting the check-box indicated. The filter selection control 1805g may be used to select queries which are not associated with a result by selecting the check-box indicated. Other viewing options might be presented, such as displaying only queries with recommendations, queries with no recommendations, queries with automated results, queries with human selected results, etc. Any filtering options may be selected and alternate filtering mechanisms and criteria may be provided in the GUI 1800, and thus the disclosure is not limited to only the options mentioned.

If a filtering method is selected, the selection display window 1810 displays the selected query(ies). In at least one embodiment the GUI 1800 includes an indicator(s) to designate whether a result is available for rating, for rating and recommending, and/or for recommending new results, or other activities. Alternate indications and/or multiple indications might be presented without departing from the spirit of the embodiments disclosed herein. In at least one embodiment, the indicators are "flags" of different colors to indicate the status of a query and/or search results such as the selection type indicators 1815. Using the example illustrated in FIG. 18A, the selection type indicator 1815a may be used to indicate that a selected search query is available for voting and recommending a search result. The selection type indicator 1815b may be used to indicate that a search query is available for recommending a result. Other types of indicators and/or other designations for the results may be provided, and the GUI 1800 is not limited to the particular embodiment shown. For example, queries with results from a particular source, or queries with results from multiple sources, etc. might be indicated using an indicator such as the selection type indicators 1815a and 1815b. Multiple indicators might be associated with a query(ies).

A query and associated results for review may be chosen from the selection window 1810 by "clicking" on or otherwise selecting the displayed item. If an item(s) is selected in the selection display window 1810, the rate/recommend button 1812 may be used to initiate a rating and/or review session. If an item is selected a GUI such as the GUI 1850 illustrated in FIG. 18B may be displayed which may be used to rate, and/or otherwise indicate preferences for an item(s) associated with a selected query. In at least one embodiment, a query and/or result(s), etc. may be selected without guide actions. The search system 130 (FIG. 1) may make a selection based on any information indicated in the search database 120.

The close button 1825 may be used to close a session and return to other activities. The log-off control 1835 may be used to log off of the search system 130 (FIG. 1).

The scorecard indicator 1820 (FIG. 18A) allows a user of the GUI 1800 to view information related to his or her accumulation of 'points' which may be related to compensation and/or rating, etc. of a guide or PaidSearcher™. In at least one embodiment, a total available points, points reserved (i.e., in suspense for any reason), points available (which might be put at risk via for example, a competition provided by the provider of the search system 130 (FIG. 1), the outcome of a rating session, etc. or any mechanism), a points/recommendation (number of points put 'at risk' via adding a result and/or resource for vetting by other guides) and an indicator of available recommendation 'tickets' available may be displayed. In this way a guide or user of the GUI 1800 is readily apprised of his or her point totals regardless of the activity selected.

The GUI 1800 (FIG. 18A) may include one or more selection tabs such as selection tabs 1840. The selection tabs 1840 may be used to select activities, and/or to review other items. Using the example illustrated in FIG. 18, the 'Rate and Review Searches' tab 1840b may cause the GUI 1800 to be displayed, and the 'Review Qualified Keywords' tab 1840a may cause a GUI such as GUI the 1980 illustrated in FIG. 18F to be presented.

The availability selection control 1830 (FIG. 18A) may be used to indicate a status. In at least one embodiment a guide may indicate his or her availability to accept queries from users, and/or availability for other types of activity. As shown in FIG. 18A, a drop-down menu may be provided from which a guide may for example elect to be 'available' for live queries and/or voice queries, but 'not available' for training other guides in an interactive session. Alternate options and/or selection techniques might be employed within the spirit of this disclosure.

Figure 18B:
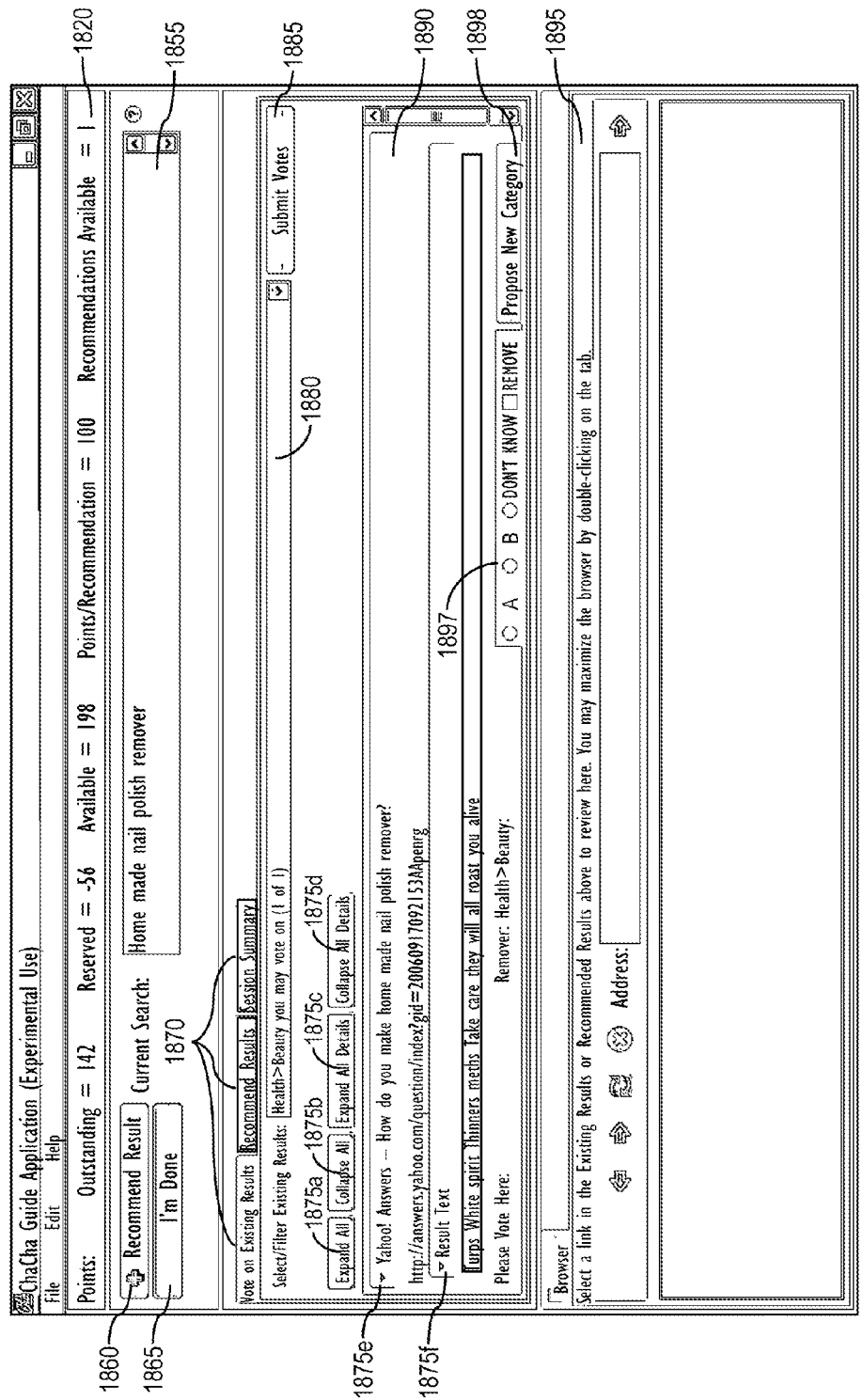

As illustrated in FIG. 18B, an exemplary GUI 1850 is shown for rating and/or voting on result(s) associated with a query and/or a profile, a category(ies), etc. and/or recommending new result(s) to be associated with a query. For example, a query record(s) 800 (FIG. 8) or category record(s) 1200 (FIG. 12) might be selected using a GUI such as GUI 1800 (FIG. 18A). The GUI 1850 (FIG. 18B) includes a scorecard indicator 1820, a search query box 1855, a recommend button 1860, a done button 1865, a selection tabs 1870, viewing controls 1875, a filter control 1880, a submit button 1885, an item display window 1890, a browser window 1895, voting controls 1897 and a new category button 1898.

The functionality of the scorecard indicator 1820 was previously described with respect to FIG. 18A. The search query box 1855 may contain information of a query which is associated with a result(s) to be reviewed by a user of the GUI 1850. The search query box 1855 may serve as an aid as to the objective of the rating session. While the GUI 1850 is illustrated using a text query, other media, such as an image, a media clip, or a combination of media, etc. might be presented within the spirit of the disclosure herein.

The recommend button 1860 may be used to elect to associate one or more results with a query. In at least one embodiment, activation of the recommend button 1860 may cause a GUI such as the GUI 1900 illustrated in FIG. 18C to be displayed.

The 'I'm Done' button 1865 (FIG. 18B) may be used to submit a vote(s) and/or recommendation(s) for use by the search system 130 (FIG. 1). For example, a vote(s) may be recorded in the search system database 120, and/or a recommended search result may be associated with a query by for example being added to the results field of a query record (e.g., the request record 800 (FIG. 8)).

The selection tabs 1870 may be used to select additional GUI's which may display information regarding a session. In the example illustrated in FIG. 18B, the selection tabs 1870 may display a voting GUI such as the GUI 1850, a list of results recommended in session(s), and a summary of voting and recommendation activity performed in a current session.

The viewing controls 1875 may be used to control the information displayed in the item display window 1890. In the example illustrated in FIG. 18B, the 'expand all' button 1875a allows the user to view a summary and a URL indicator for each result. The 'collapse all' button 1875b makes each result appear as a label. The 'expand all details' button 1875c allows the user to see the URL, a comment added by a guide or author of the result, and other information associated with the result. The 'collapse all details' button 1875d collapses the details associated with a result and displays only the label. Any individual result may be independently collapsed or expanded using viewing controls, such as the viewing controls 1875e and 1875f, in the display window 1890. Activating the viewing control 1875e may cause the answer details to be toggled between being displayed or not. Activating the viewing control 1875f may toggle between displaying detail associated with a result and not.

The filter control 1880 may be used to alter the filtering criteria applied to a query. For example, an alternate profile or categorization of a query might be selected in order to view results associated with a query which has been categorized according to an alternate intent. Using the example illustrated in FIG. 18B, the query 'home made nail polish remover' might be categorized under 'Health>Beauty', and a result(s) associated with it based on that categorization. However, other result(s) might be associated with a query (i.e., 'home made nail polish remover') categorized as 'Science>Chemistry'. In the former instance a result(s) might relate to common household products which could be used as a nail polish remover whereas in the latter a result(s) might discuss the chemicals involved and their properties. The filter control 1880 may be implemented as a drop-down menu, a typing box, etc.

The item display window 1890 may be used to display information relating to results which have been associated with a query. In particular, results which are associated with the query string in the search query box 1855 and filtered per the selection made using the filter control 1880. The item display window 1890 may further allow a user to register opinions about a result(s) group displayed in the display window. The voting controls 1897 allow a user to select a best result from a group(s) of results appearing in the item display window 1890. In the example illustrated in FIG. 18B, the 'A/B' buttons allow a user to select a result labeled 'A' as the superior result compared to a result labeled 'B', or vice versa. Alternately, a user may elect to use a control such as the 'propose new category' button 1898 to propose an alternate categorization of a result group which might make a result(s) more relevant in response to a query indicated in the query box 1855. An action such as activating the 'propose new category' button 1898 may cause a GUI such as the GUI 1920 illustrated in FIG. 18D to be displayed.

The browser window 1895 may be used to display information of a result(s) indicated by information in the display window 1890. In at least one embodiment, selecting the URL text displayed in the display window 1890 may cause a web page associated with the URL to be rendered in the browser window 1895. Information regarding a result(s) may be displayed in tabs within the browser window and the browser window and tabs may be scaled and otherwise manipulated as is well known in the existing art. This may allow a guide or a user of the GUI 1850 to make an examination of a result(s).

Figure 18C:
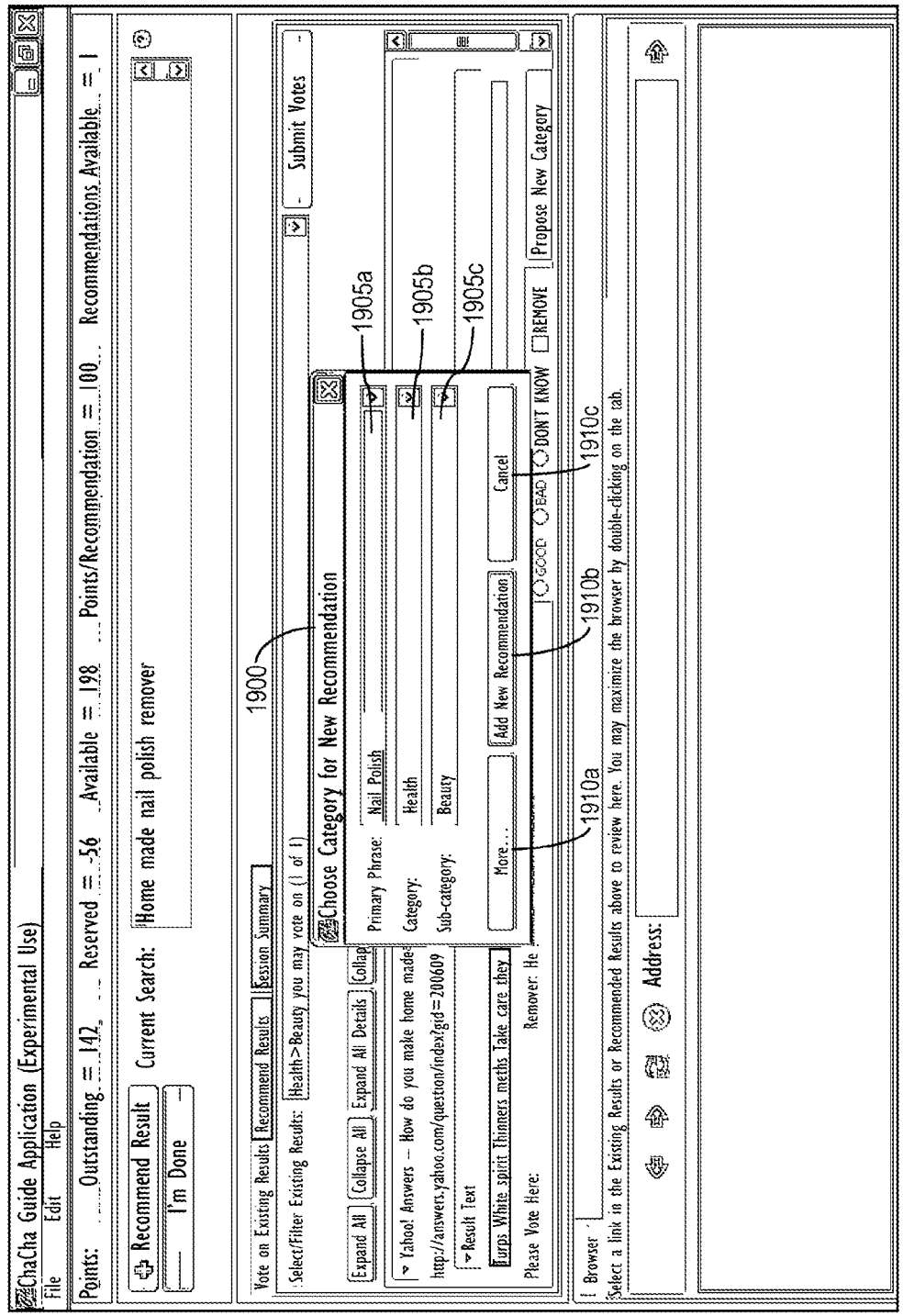

As illustrated in FIG. 18C, an exemplary GUI 1900 is shown for recommending that a search result(s) may be associated with a query and/or a profile and/or a categorization within a taxonomy, etc. The GUI 1900 includes selection controls 1905 and action controls 1910.

The selection controls 1905 may be used to select and/or modify the content of and/or information associated with a query. This may alter the association of ratings data associated with a result, may create a new request or query record, etc. In the example illustrated in FIG. 18C, the 'primary phrase' selection box 1905a may be used to alter the primary phrase or query phrase (which may be stored in a query record) in order to form a different query. The selection control 1905a may be implemented using a drop-down list, a prompted typing box, or other interface. The category selection control 1905b may be used to select a categorization within a taxonomy. The subcategory selection control 1905c may be used to select a subcategory to be associated with a query. In other words, a branch within a taxonomy may be selected using the selection controls 1905. In at least one embodiment, the filtering options may be more or less complex than those illustrated as desired to effectively operate the embodiments.

The action controls 1910 may be used to take various actions. In the example illustrated in FIG. 18C, the 'more' button 1910a may enable a more complex filtering GUI which may be used to make modifications to a query and/or information associated with the query. The 'add new recommendation' button 1910b may be used to select a result to be associated with a query and information selected. In at least one embodiment, the GUI 1940 illustrated in FIG. 18E may be provided when the 'add new recommendation' button 1910b is activated. The 'cancel' button 1910c may be used to close the GUI 1900 and return to the GUI 1850.

Figure 18D:
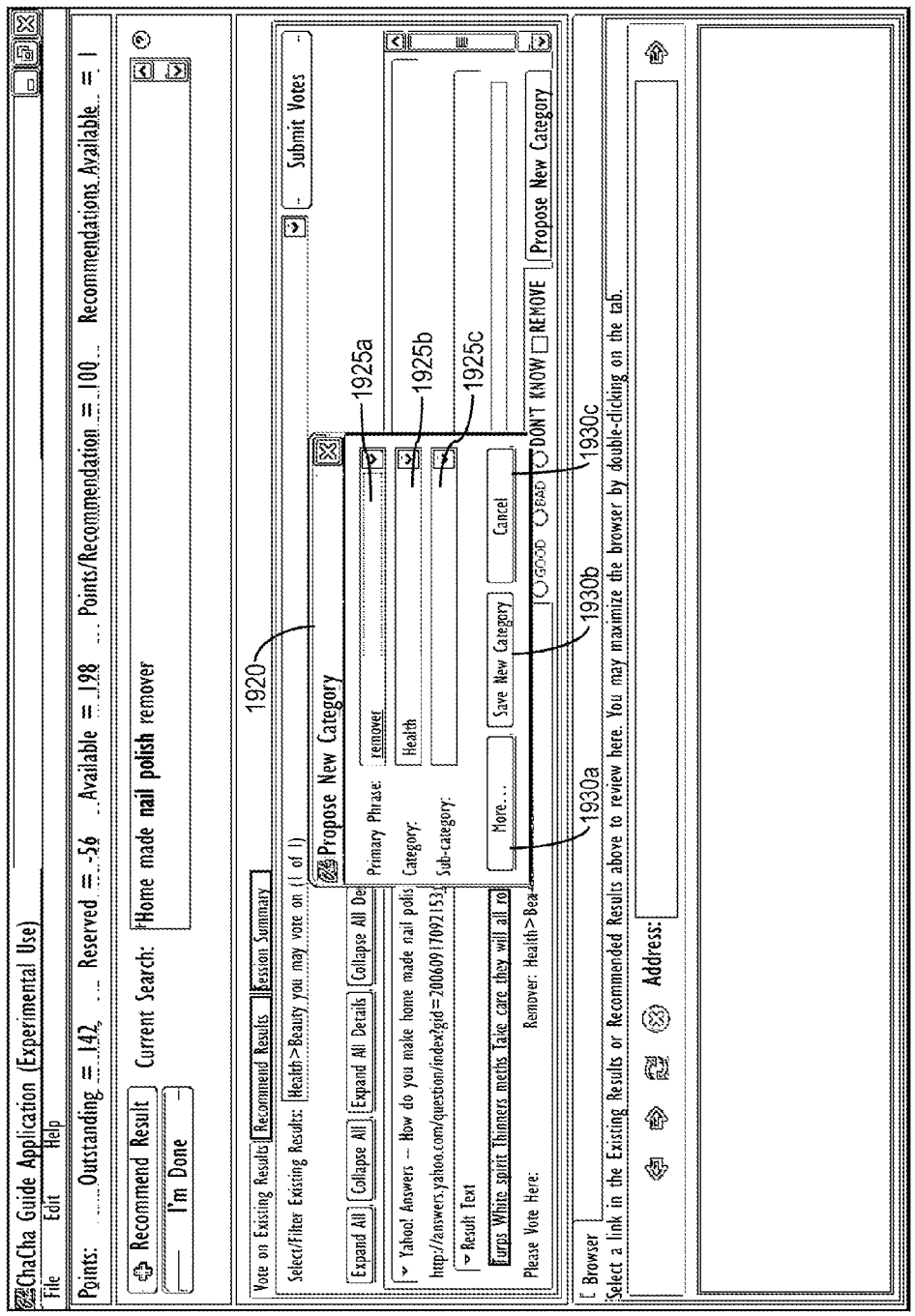

As illustrated in FIG. 18D, an exemplary GUI 1920 is shown for recommending a category and/or other information to be associated with a query. The GUI 1920 includes selection controls 1925 and action controls 1930.

The selection controls 1925 may be used to select and/or modify the content of and/or information associated with a query or search request. This may alter the association of ratings data associated with a result, may create a new request or search query, etc. In the example illustrated in FIG. 18D, the 'primary phrase' selection control 1925a may be used to alter the primary phrase (which may be stored in a query record) in order to form a query. This may be done using a drop-down list, a prompted typing box, or other interface. The 'category' selection control 1925b may be used to select a root term within a taxonomy. The 'subcategory' selection control 1925c may be used to select a topic. In other words, a branch within the taxonomy (one type of profile) may be selected using controls such as the selection controls 1925. In at least one embodiment, the filtering options may be more or less complex than those illustrated as required to effectively operate the embodiments.

The action buttons 1930 may be used to take actions. In the example illustrated in FIG. 18D, the 'more' button 1930a leads to a more complex filtering GUI which may allow a user to make modifications to the query text and/or information associated with a query. The 'save new category' button 1930b may be used to record information selected (e.g. a categorization of a query) and return to the GUI 1850. The 'cancel' button 1930c may be used to close the GUI 1920 and return to the GUI 1850 without making modifications to information associated with a query.

Figure 18E:
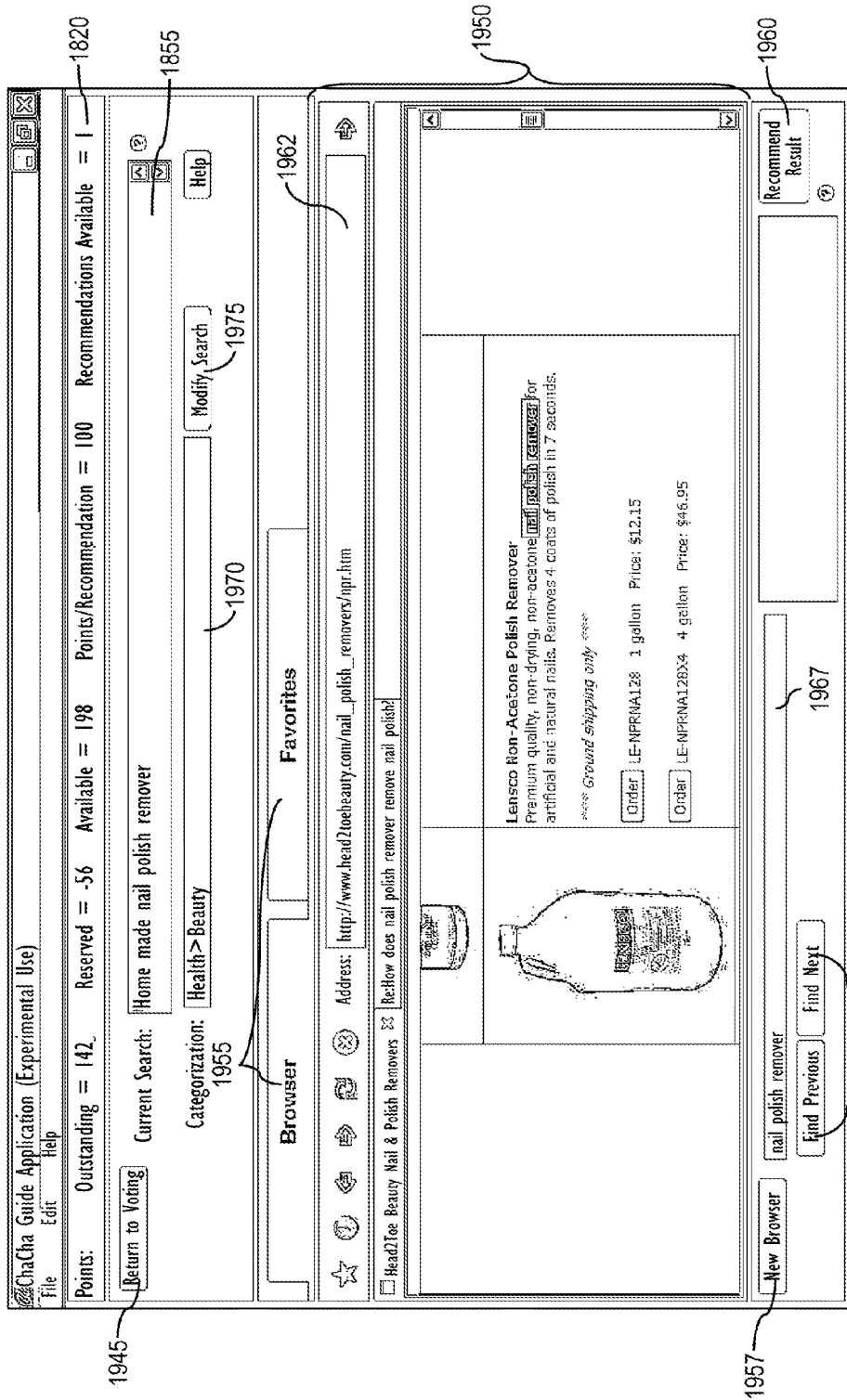

As illustrated in FIG. 18E, an exemplary GUI 1940 is shown for associating a result with a query. The GUI 1940 includes a scorecard indicator 1820, a query field 1855, a return button 1945, a browser window 1950, selection tabs 1955, a new browser button 1957, a recommend button 1960, a URL entry box 1962, locator controls 1965, a search target window 1967, a categorization indicator 1970 and a search modification control 1975.

The functionality of the scorecard indicator 1820 and the query field 1855 were previously explained with respect to FIG. 18B. The return button 1945 may be used to return to the voting GUI 1850 without recommending a new result to be associated with the selected query and/or profile and/or categorization.

The browser window 1950 may be used to locate and select a result. In the example illustrated in FIG. 18E, the URL entry 1962 is provided which may be used to enter the target URL of a resource. An additional browser window(s) and/or tabs may be opened using the 'new browser' button 1957. Multiple browser tabs may be opened, as illustrated in FIG. 18E, and a user may navigate between them using controls well known in the relevant art.

The selection tabs 1955 may be used to view a browser window such as the browser window 1950 for obtaining a search result, and/or other GUIs such as a resource management GUI described in the related U.S. application Ser. No. 11/774,852 previously mentioned. The locator controls 1965 may be used to locate occurrences of an item in a web page or other resource rendered in a browser window, such as the browser window 1950. The items may include but are not limited to elements of a query. A query may include text and/or other media. Such information may be displayed in the the query field 1855. In the example illustrated in FIG. 18E, the 'find previous' control 1965a and the 'find next' control 1965b may be used to navigate within the content of a web page and locate information which may provide a result relating to a query and/or information selected. Information to be located in the resource rendered in the browser window 1950 may be displayed in the search target window 1967. The search target window 1967 may be used to identify information to be located in a resource. For example, any or all of query may be entered in the search target window 1967.

The recommend button 1960 may be used to indicate completion of the task of locating a search result and a desire to associate a result with a selected query and/or other information. In at least one embodiment, the recommend button 1960 may be inactive based on information indicated in the search database 120 (FIG. 1). For example the 'recommend result' button 1960 may be inactive if a guide does not have sufficient points to allow a recommendation to be performed.

The categorization indicator 1970 may indicate a category and/or other information associated with a query contained in the query field 1855. For example, the categorization indicator 1970 might contain information regarding a category and/or a profile, etc. associated with a query.

The search modification control 1975 may be used to modify a query, a categorization and/or other information associated with a result(s). In the example illustrated in FIG. 18E, the 'modify search' button 1975 is provided which may cause a GUI such as GUI 1920 (FIG. 18D) to be presented.

Figure 18F:
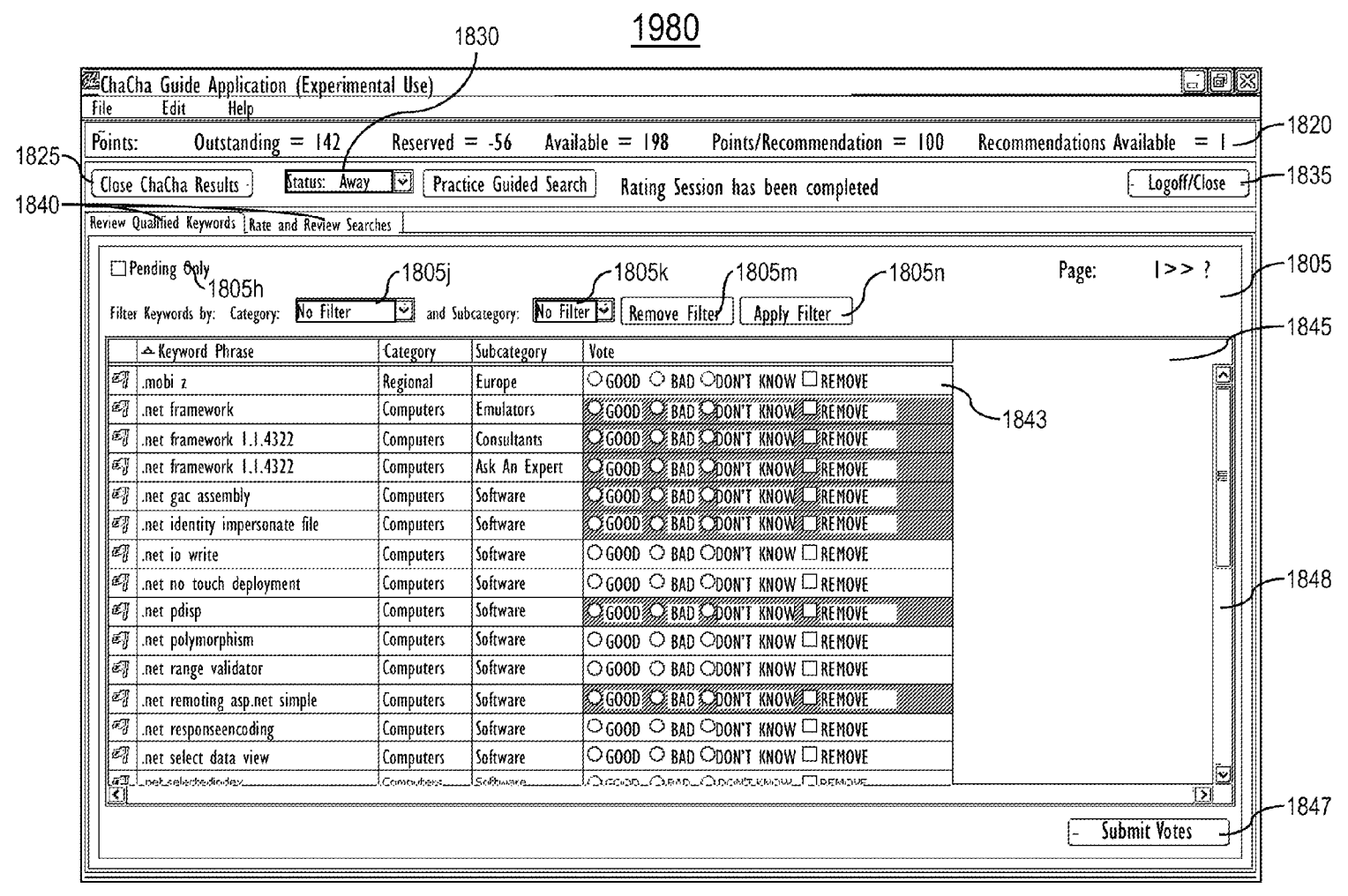

As illustrated in FIG. 18F, an exemplary GUI 1980 is shown for reviewing a category associated with a query. The GUI 1980 includes filter controls 1805, scorecard indicator 1820, close button 1825, availability selection control 1830, logoff control 1835, selection tabs 1840, voting controls 1843, query categorization review window 1845, navigation controls 1848 and 'submit votes' button 1847. The function of the scorecard indicator 1820, the close button 1825, the availability selection control 1830, the logoff control 1835, and selection tabs 1840 were previously explained with respect to FIG. 18A. The filter controls 1805 may include elements which may be used to designate a filter(s) which may be applied to a search request(s) and/or other items. Using the example illustrated in FIG. 18F, the 'pending only' filter control 1805h may be used to select all search queries or only search queries which are pending voting activities by activating and/or deactivating the check box. The category filter control 1805j may be used to select one or more root terms which may be used to select a search request. The subcategory filter control 1805k may be used to select one or more topics which may be used to select a search request. The 'remove filter' control 1805m may be used to clear all filter controls selected using the GUI 1980. The 'apply filter' control 1805n may be used to apply a filter condition selected using the GUI 1980.

The query categorization review window 1845 displays information related to a query(ies) and a category(ies) or other information associated with a query, and allows a user of the GUI 1980 to make indications of his/her opinion(s). In the embodiment illustrated in FIG. 18F, an indicator of the status of a query, such as a colored flag may be provided to identify queries that are pending voting by a guide(s) may be provided. Query text (e.g., '.net framework') is displayed; a category indicator, a subcategory indicator, and voting controls 1843 are provided. The voting controls 1843 may be used to indicate judgment of the relevance of a category and/or subcategory assigned to a query. Options may include 'good', 'bad', 'don't know', and 'remove' which may indicate a positive, negative, neutral, or 'veto' opinion, respectively. Queries for which a user of the GUI 1980 may not vote, based upon information indicated in the search system database 120 (FIG. 1) may be indicated by being 'grayed out' as shown in FIG. 18F.

The 'submit votes' button 1847 may be used to indicate the intent to record votes or opinions obtained using the GUI 1980. Activation of the 'submit votes' button 1847 may cause the search system 130 (FIG. 1) to update information contained in the search database 120 to reflect information obtained using the GUI 1980 (FIG. 18F). The navigation controls 1848 may be used to navigate within the query categorization review window 1845.

As previously described herein, a comparison voting method may be used to determine a 'best' result by comparing at least two search results. It may be desirable that a group(s) of results under consideration may be displayed to a person who is making a comparison. A side-by-side presentation may improve a person's ability to compare the content of a group(s) of result(s).

Figure 18G:
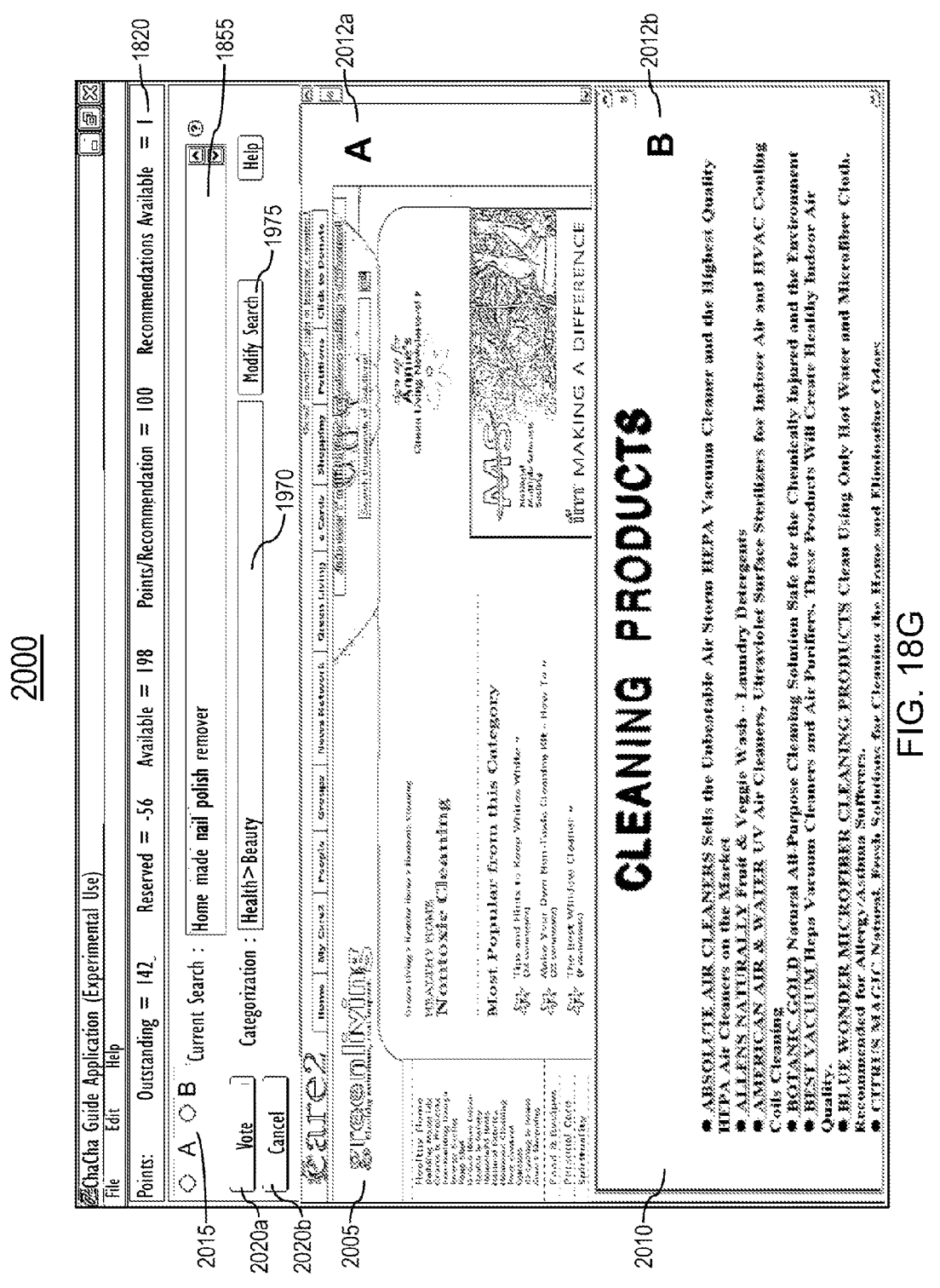

As illustrated in FIG. 18G, an exemplary GUI 2000 is provided for comparison voting regarding a group of result(s) associated with a query. The GUI 2000 includes scorecard indicator 1820, query field 1855, categorization indicator 1970, search modification control 1975, first result window 2005, second result window 2010, result identifiers 2012, preference indication controls 2015, and action buttons 2020.

The scorecard indicator 1820 and the query field 1855 were previously described with respect to FIG. 18B. The categorization indicator 1970 and search modification control 1975 were previously described with respect to FIG. 18E.

The first result window 2005 may be used to view information associated with a first result which has been selected for comparison. The second result window 2010 may be used to view information associated with a second result which has been selected for comparison. The GUI 2000 may contain any number of result windows. Result windows are displayed simultaneously to a user of the GUI 2000. The result identifiers 2012 may be used to indicate which content is associated with an option(s) indicated in the preference indication controls 2015. Using the example illustrated in FIG. 18G, the result identifier 2012a may indicate that the first result window 2005 is rendering option 'A', and the result identifier 2012b may indicate that the second result window 2010 is rendering option 'B'.

The preference indication controls 2015 may be used to indicate which search result is judged superior. Using the example illustrated in FIG. 18G, checkboxes are provided to select result 'A' or 'B'. In at least one embodiment, only one result may be selected as the preferred result. As previously described herein, two or more items may be presented for consideration using the GUI 2000.

The action buttons 2020 may be used to take actions relating to preferences indicated using the GUI 2000. Using the example illustrated in FIG. 18G, the 'submit votes' button 2020a may be used to indicate the intent to record preferences in the search system database 120 (FIG. 1). The 'cancel' button 2020b may be used to indicate the intent to exit the GUI 2000 and discard information obtained using the GUI 2000 (FIG. 18G).

While the embodiments herein have been described with respect to the GUI's depicted in FIGS. 18A-18G, other interfaces, and alternate ways for indicating actions known within the relevant art may be employed without departing from the spirit of the embodiments described herein. For example, a voice controlled interface, (e.g., voice xML) a motion-based input (e.g., gyroscopic or other mechanically based motion detection), a keypad based input (e.g., a phone keypad), etc. may be utilized to provide a suitable interface(s) to operate the embodiments.

While the GUIs illustrated in FIGS. 18A-18G have been illustrated using the example of reviewing a result(s) associated with a search query or search request, no limitation is implied thereby. Any review item(s) associated with a reference item(s) may be selected and/or reviewed using the GUIs illustrated herein. For example, a search resource(s) associated with a category and/or other information might be selected and reviewed using the tools described herein, or an advertisement(s) associate with a profile and/or other information might be selected and reviewed.

Figure 19:
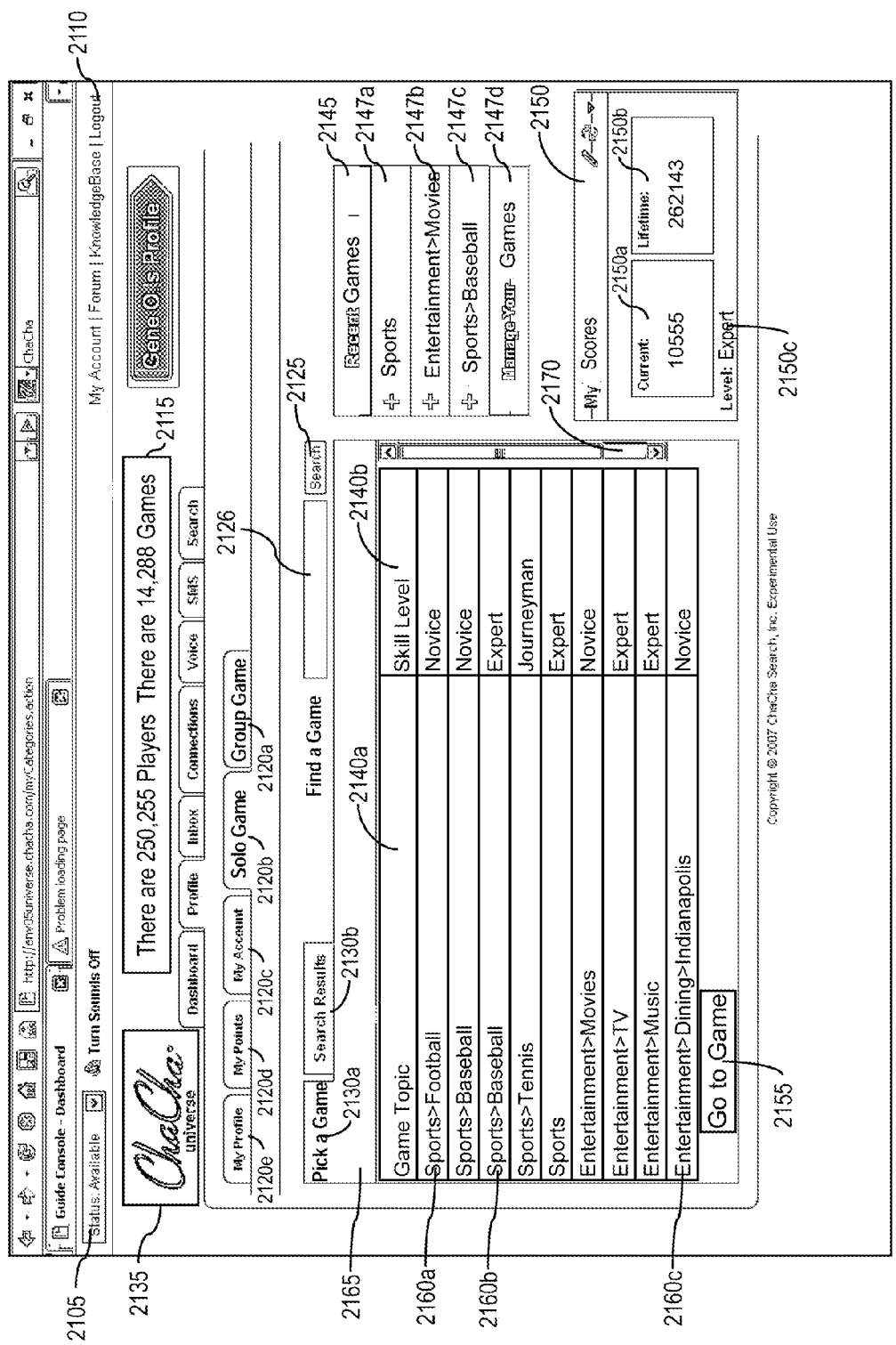
FIG. 19 illustrates a GUI.

As illustrated in FIG. 19, an exemplary GUI is provided for selection of a game associated with a category, topic, word, phrase, or any combination thereof. The GUI 2100 includes an availability selection control 2105, a logoff control 2110, a game information indicator 2115, a activity selection tabs 2120, a search button 2125, a search box 2126, game location tabs 2130, an advertisement window 2135, game information indicators 2140, a recent game display 2145, a recent game selection controls 2147, a scoreboard indicator 2150, action buttons 2155, game selection controls 2160, a game information window 2165, and navigation controls 2170. The GUI 2100 may be used to select a game(s) which may be played as a solo activity. Games may be selected using filtering criteria. For example, games may be selected by entering and/or selecting a topic, keyword, category, etc or based on a skill level, or any other information which may be associated with a game. For example, games might be associated with an affiliate group, a profile, etc. A profile might include information such as a time interval, geographic location, personality characteristics, or any other item(s). Selections available may be based on information associated with a person(s). For example, some games may be available only to persons associated with an item, or with a set of skills, etc.

The availability selection control 2105 may be used to indicate a status. In at least one embodiment the availability selection control 2105 may be used to indicate availability for various activities. As shown in FIG. 19, a drop-down menu may be provided from which a list of availability options may be selected. Any options and/or selection techniques might be employed to select a status within the spirit of this disclosure. For example, activation of the availability selection control 2105 may provide a menu of activities, or might be as simple as a toggle of a check-box.

The logoff controls 2110 may be used to log off of the search system 130 (FIG. 1) and may include navigation controls which may be used to select other GUI's, etc.

The system information indicator 2115 may include information relating to aggregated information of players and/or games etc. which are in progress, or historical information, or any information regarding system status.

The GUI 2100 may include one or more activity selection tabs such as selection tabs 2120. The activity selection tabs 2120 may be used to select activities, and/or to review other items. Using the example illustrated in FIG. 19, the 'Solo Game' tab 2120b may cause the GUI 2100 to be displayed, the 'Group Game' tab 2120a may cause a GUI such as GUI the 2300 illustrated in FIG. 21 to be presented, the 'My Account' tab 2120c, the 'My Points' tab 2120d, and the 'My Profile tab 2120e may display other GUIs which may be used for review of information.

The search box 2126 may be used to enter a search term. The search button 2125 may be used to initiate a search based on the content of the search box 2126. Activation of the search button 2125 may cause the GUI 2200 (FIG. 22) to be presented. Alternately, entry of a term in the search box 2126 may cause games associated with the content of the search box to be displayed in the game information window 2165

The game location tabs 2130 may be used to view GUIs such as the GUI 2100. The selection tab 2130a ('Pick a Game') may present table format for selection of a game, and the selection tab 2130b ('Search results') may present a GUI such as the GUI 2500 illustrated in FIG. 23.

The advertisement window 2135 may be used to present an advertisement and/or other information. Content of the advertising window 2135 may be modified based on other information selected in the GUI 2100. For example, a category or keywords, etc. selected may cause information presented in the advertising window 2135 to be modified. More than one advertisement window 2135 may be included in a GUI such as the GUI 2100, the GUI 2200, the GUI 2250, the GUI 2275, the GUI 2300 and the GUI 2400.

The game information indicators 2140 may present information regarding types of information associated with a game(s). The 'Game Topic' game information indicator 2140a may indicate a category. A left-click on the 'Game Topic' game information indicator 2140a may sort games in the game information window 2165 by categories associated with the game. A right-click on the 'Game Topic' game information indicator 2140a may present a drop-down list of categories. The 'Skill Level' game information indicator 2140b may indicate a skill. A left-click on the 'Skill Level' game information indicator 2140b may sort games in the game information window 2165 by skill level associated with the game. A right-click on the 'Skill Level' game information indicator 2140b may present a drop-down list of skill levels. Any number of game information indicators 2140 may be provided in the GUI 2100, and it may be possible to add and/or remove game information indicators 2140. For example a 'type' indicator (comparative, good/bad, comparison, etc.) might be provided as a game information indicator.

The recent game display 2145 may be used to indicate information of games which have been played recently. Any type of information associated with a game may be presented in the recent game display 2145. The recent game selection controls 2147 may indicate recently played games, and may be activated to provide information regarding games. For example the '+' indicator in the game selection indicators might expand the information displayed in the recent game display 2145. Activation of a recent game selection control may cause games with similar characteristics to be displayed in the game information window 2165. Activation of the 'Sports' game selection control 2147a may take a user directly to a game related to the topic 'Sports'. Activation of the 'Entertainment>Movies' game selection control 2147b may take a user directly to a game related to the topic 'Entertainment>Movies'. Activation of the 'Sports>Baseball' game selection control 2147c may take a user directly to a game related to the topic 'Sports>Baseball'. Activation of the 'Manage Your Games' game selection control 2147d may cause a GUI for editing and/or reviewing a game usage history to be provided.

The scoreboard indicator 2150 provides information of 'points'. Any type of scoring indications may be provided. The 'current' scoreboard indicator 2150a may indicate points accrued during a game session. The 'lifetime' scoreboard indicator 2150b may indicate total points accrued. The 'Level' scoreboard indicator 2150c may indicate a skill level.

For example, a skill level associated with a user of the GUI which may be related to a topic(s), etc. may be indicated in the 'Level' scoreboard indicator 2150c.

The action buttons 2155 may be used to take actions regarding information indicated in the GUI 2100. The 'Go to Game' action button 2155 may be used to activate a game GUI such as the GUI's 2200, 2250, and 2275 illustrated in FIGS. 20A-20C associated with a selected game selection control 2160. For example if the game selection indicator 2160b is selected, activation of the 'Go to Game' action button 2155 might present a GUI such as the GUI 2200 associated with the category 'Sports>Baseball' at the 'Expert' level of skill.

The game selection controls 2160 may be used to select a game associated with a game selection control 2160. For example, the game selection control 2160a may be used to select the 'Novice' level game associated with 'Sports>Football', a 'left' click might select the game selection indicator 2160a and a 'double' click might cause a GUI such as the GUI 2200 (FIG. 20A) associated with the 'Sports>Football' category at the 'Novice' skill level to be presented. Likewise, the game selection indicator 2160c may be used to select the 'Novice' level game associated with the category 'Entertainment>Dining>lndianapolis', a left-click might select the game selection indicator 2160c and a double click might cause a GUI such as the GUI 2200 (FIG. 20A) associated with the 'Entertainment>Dining>Indianapolis' category at the 'Novice' skill level to be presented. The navigation controls 2170 may be used to navigate within the game information window 2165.

As illustrated in FIG. 20A, an exemplary GUI is provided for voting regarding a review item associated with reference item. The GUI 2200 may be presented as a single panel such as the voting window 2220, or may be an element of a GUI such as the GUI 2400 illustrated in FIG. 22. The GUI 2200 may include availability selection control 2105, logoff control 2110, advertisement window 2135, scoreboard indicator 2205, system topic information indicator 2210, activity selection tabs 2215, voting information window 2220, voting controls 2225, reference item indicator 2230, review item indicator 2235, and action controls 2240. The GUI 2200 may be used to indicate opinion regarding a review item related to a reference item.

The function of the availability selection control 2105, logoff control 2110 and the advertisement window 2135 were previously explained with respect to FIG. 19.

The scoreboard indicator 2205 provides information of scoring. Any type of scoring indications may be provided. The scoreboard indicator 2205a may indicate points accrued by a player during a game session. The scoreboard indicator 2150b may indicate the highest point total accrued in a game. The scoreboard indicator 2150c may indicate a score associated with a different player. A scoreboard indicator 2205 may indicate any type of information relating to scores, and it may be possible to add or remove scoreboard indicators in the GUI 2200.

The system topic information indicator 2210 may include information relating to aggregated information of players and/or games etc. which are in progress, or historical information, or any information regarding system status. For example, the system topic information indicator 2210 may indicate system information which is related to a game topic related to the voting in progress.

The selection tabs 2215 may allow selection of a GUI, and/or may indicate an activity. The selection tab 2215a may be used to select 'Games' as an activity and/or GUI. The selection tab 2215b may be used to indicate that the activity 'Search' has been selected. Any number of selection tabs 2215 may be presented in the GUI 2200.

The voting information window 2220 may be used to present information associated with voting. Any type of information might be presented in the voting information window 2220. For example, images, video, or other types of media might be present in the voting information window 2220.

The reference item indicator 2230 may include information associated with a reference item. While a text display is used as the reference item indicator 2230 for the purposes of illustration in FIG. 20A, any type of media and/or information associated with a reference item might be presented. For example, an image(s), an audio clip, a hyperlink and/or other types of information associated with a reference item might be included in the reference item indicator 2230.

The review item indicator 2235 may include information associated with a review item. While a text display is used as the review item indicator 2235 for the purposes of illustration in FIG. 20A, any type of media and/or information associated with a review item might be presented. For example, an image(s), an audio clip, a hyperlink and/or other types of information associated with a review item might be included in the review item indicator 2235.

The voting controls 2225 may be used to indicate an opinion regarding a review item. The voting controls 2225 are mutually exclusive. A user may select exactly one voting control to register an opinion regarding each review item indicated in the review item information indicator 2235. The voting control 2225a allows a user to register a 'Wow' or positive opinion regarding a review item indicated in the review item indicator 2235. The voting control 2225b allows a user to register a 'Not' or negative opinion regarding a review item indicated in the review item indicator 2235. The voting control 2225c allows a user to register an 'I don't know' or neutral opinion regarding a review item indicated in the review item indicator 2235. A vote may be indicated by for example clicking on a voting control which may cause an indicator such as a filled dot such as that indicated in the voting control 2225b to be displayed.

Any number of review item information indicators 2235 and voting controls 2225 associated with a review item may be presented in the voting information window 2220 in the GUI 2200.

The action controls 2240 may be used to take actions regarding information obtained using the GUI 2200. The 'Vote' action control 2240a may be used to indicate that opinions indicated in the GUI 2200 are to be recorded. The 'Skip' action control 2240b may be used to indicate that a review item is to be skipped without voting. The 'Exit' action control 2240c may be used to indicate that a game session or voting session is to be terminated.

As illustrated in FIG. 20B, an exemplary GUI is provided for voting regarding group of review items associated with reference item. The GUI 2250 may be presented as a single panel such as the voting window 2220, or may be an element of a GUI such as the GUI 2400 illustrated in FIG. 22. The GUI 2200 may include availability selection control 2105, logoff control 2110, advertisement window 2135, scoreboard indicator 2205, system topic information indicator 2210, activity selection tabs 2215, voting information window 2220, voting controls 2265, reference item indicator 2255, review item indicator 2260, and action controls 2240. The GUI 2250 may be used to indicate opinion regarding review items related to a reference item.

The function of the availability selection control 2105, logoff control 2110 and the advertisement window 2135 were previously explained with respect to FIG. 19. The function of the scoreboard indicator 2205, system topic information indicator 2210, activity selection tabs 2215, voting information window 2220, and the action controls 2240 were previously explained with respect to FIG. 20A.

The reference item information indicator 2255 may include information associated with a reference item. While a text display is used as the reference item indicator 2225 for the purposes of illustration in FIG. 20B, any type of media and/or information associated with a reference item might be presented. For example, an image(s), an audio clip, a hyperlink and/or other types of information associated with a reference item might be included in the reference item indicator 2255.

The review item information indicators 2260 may include information associated with review items. While a text display is used as a review item indicator 2260 for the purposes of illustration in FIG. 20B, any type of media and/or information associated with a review item might be presented. For example, an image(s), an audio clip, a hyperlink and/or other types of information associated with a review item might be included in the review item indicator 2260. At least two review item indicators are provided in the GUI 2250. In a preferred embodiment, exactly two review item indicators are presented. The review item indicator 2260a may present information associated with a first review item such as the answer 'A George Washington, C in C Continental Army'. The review item indicator 2260b may present information associated with a second review item such as the answer 'B George Washington, Martha's husband'.

The voting controls 2265 may be used to indicate an opinion regarding a review item. The voting controls 2265 are mutually exclusive. A user may select exactly one voting control to register an opinion regarding each review item indicated in the review item information indicator 2255. The voting control 2265a allows a user to register a positive opinion regarding a review item indicated in the review item indicator 2260a. The voting control 2265b allows a user to register a positive opinion regarding a review item indicated in the review item indicator 2260b. A vote may be indicated by for example clicking on a voting control which may cause an indicator such as a filled dot such as that indicated in the voting control 2265a to be displayed.

Any number of groups of review item indicators 2260 and mutually exclusive voting controls 2265 may be presented along with an associated reference item indicator 2255 in the voting information window 2220 in the GUI 2250.

Figure 20C:
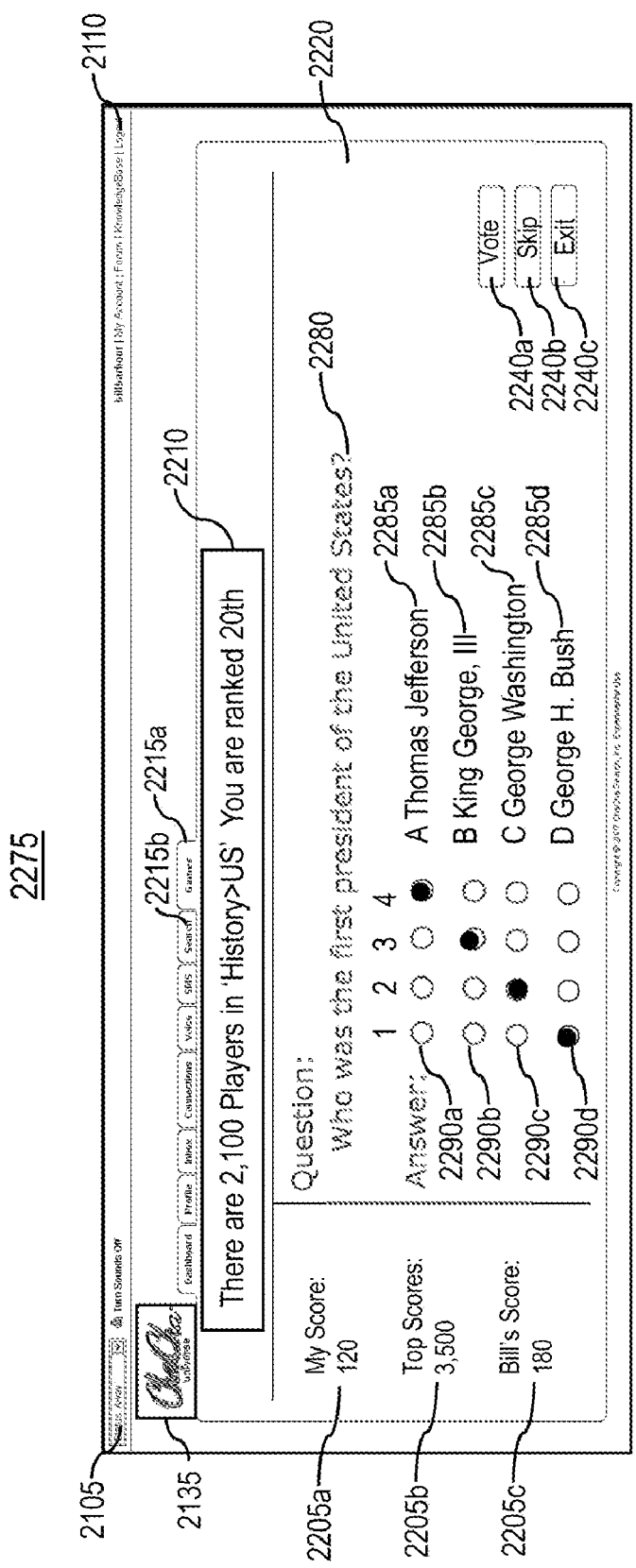

As illustrated in FIG. 20C, an exemplary GUI is provided for voting regarding group of review items associated with reference item. The GUI 2275 may be presented as a single panel such as the voting window 2220, or may be an element of a GUI such as the GUI 2400 illustrated in FIG. 22. The GUI 2200 may include availability selection control 2105, logoff control 2110, advertisement window 2135, scoreboard indicator 2205, system topic information indicator 2210, activity selection tabs 2215, voting information window 2220, voting controls 2290, reference item indicator 2280, review item indicator 2285, and action controls 2240. The GUI 2275 may be used to indicate opinion regarding review items related to a reference item.

The function of the availability selection control 2105, logoff control 2110 and the advertisement window 2135 were previously explained with respect to FIG. 19. The function of the scoreboard indicator 2205, system topic information indicator 2210, activity selection tabs 2215, voting information window 2220, and the action controls 2240 were previously explained with respect to FIG. 20A.

The reference item information indicator 2280 may include information associated with a reference item. While a text display is used as the reference item indicator 2280 for the purposes of illustration in FIG. 20B, any type of media and/or information associated with a reference item might be presented. For example, an image(s), an audio clip(s), a hyperlink(s) and/or other types of information associated with a reference item might be included in the reference item indicator 2280.

The review item information indicators 2285 may include information associated with review items. While a text display is used as a review item indicator 2285 for the purposes of illustration in FIG. 20B, any type of media and/or information associated with a review item might be presented. For example, an image(s), an audio clip(s), a hyperlink(s) and/or other types of information associated with a review item might be included in the review item indicator 2285. At least two review item indicators are provided in the GUI 2275. In a preferred embodiment, at least three review item indicators are presented. The review item indicator 2285a may present information associated with a first review item such as the answer 'A Thomas Jefferson'. The review item indicator 2285b may present information associated with a second review item such as the answer 'B King George, III'. The review item indicator 2285c may present information associated with a third review item such as the answer 'C. George Washington'. The review item indicator 2285d may present information associated with a fourth review item such as the answer 'D George H. Bush'.

The voting controls 2290 may be used to indicate an opinion regarding a review item. The voting controls 2290 may be mutually exclusive (i.e., only one review item may be give a rating). A user may select exactly one ranking in each voting control 2290 to register an opinion regarding each review item indicated in the review item information indicator 2285 associated with the review item and the voting control 2290. The voting control 2290a allows a user to indicate an opinion regarding a ranking of a review item indicated in the review item indicator 2285a. The voting control 2290b allows a user to indicate an opinion regarding a ranking of a review item indicated in the review item indicator 2285b. The voting control 2290c allows a user to indicate an opinion regarding a ranking of a review item indicated in the review item indicator 2285c. The voting control 2290d allows a user to indicate an opinion regarding a ranking of a review item indicated in the review item indicator 2285d. The number of positions in the voting controls 2290 may be the same as the number of reference item indicators 2285.

A vote may be indicated by for example clicking on a voting control which may cause an indicator such as a filled dot to be displayed. For example, the dot in the position '4' as indicated in the voting control 2290a, the dot in the position '3' as indicated in the voting control 2290b, the dot in the position '2' as indicated in the voting control 2290c, and the dot in the position '1' as indicated in the voting control 2290d.

Any number of groups of review item indicators 2285 and controls 2290 associated with a review item indicator may be presented along with an associated reference item indicator 2280 in the voting information window 2220 in the GUI 2275.

Alternately, it may be possible to select any position in a voting control 2290 regardless of a vote which has been indicated in other voting controls. The voting controls 2290 have been illustrated using 'radio button' indicators, but other interfaces such as check boxes, slider bars, etc. which is well known in the art might be utilized.

Figure 21:
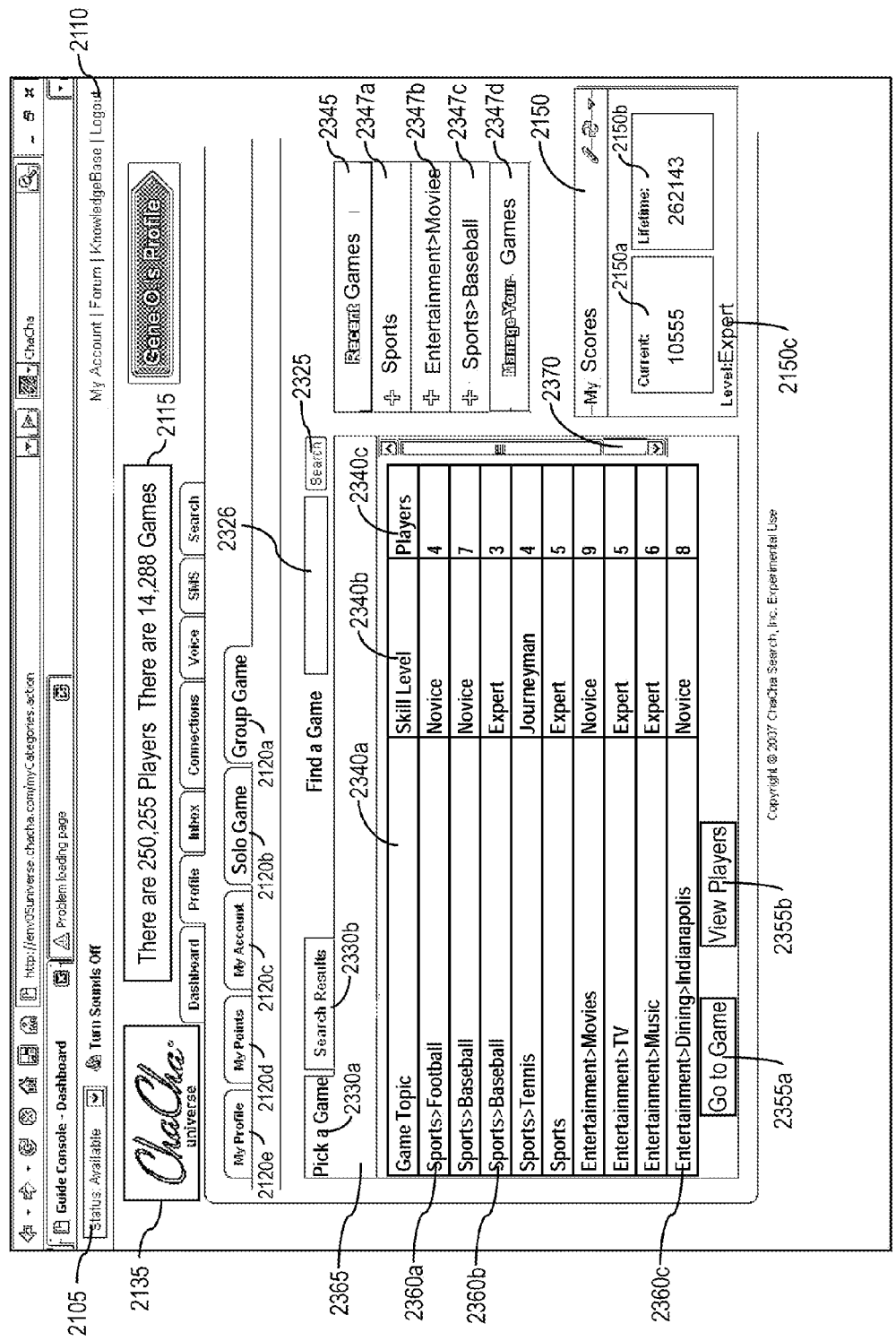
FIG. 21 illustrates a GUI.

As illustrated in FIG. 21, an exemplary GUI is provided for selection of a multi-player game associated with a category, topic, word, phrase, or any combination thereof. The GUI 2300 includes availability selection control 2105, logoff control 2110, game information indicator 2115, activity selection tabs 2120, search button 2325, search box 2326, game location tabs 2330, advertisement window 2135, game information indicators 2340, recent game display 2345, recent game selection controls 2347, scoreboard indicator 2150, action buttons 2355, game selection controls 2360, game information window 2365, and navigation controls 2370. The GUI 2300 may be used to select a game(s) which may be played as a multi-player activity. Games may be selected using filtering criteria. For example, games may be selected by entering and/or selecting a topic, keyword, category, etc or based on a skill level, or any other information which may be associated with a game. For example, games might be associated with an affiliate group, a profile, etc. A profile might include information such as a time interval, geographic location, personality characteristics, or any other item(s). Selections available may be based on information associated with a person(s). For example, some games may be available only to persons associated with an item, or with a set of skills, etc.

The function of the availability selection control 2105, logoff control 2110 game information indicator 2115, activity selection tabs 2120, scoreboard indicator 2150, and the advertisement window 2135 were previously explained with respect to FIG. 19.

The game location tabs 2330 may be used to view GUIs such as the GUI 2300. The selection tab 2330a ('Pick a Game') may present table format for selection of a game, and the selection tab 2330b ('Search results') may present a GUI such as the GUI 2500 illustrated in FIG. 23.

The advertisement window 2135 may be used to present an advertisement and/or other information. Content of the advertising window 2135 may be modified based on other information selected in the GUI 2300. For example, a category or keywords, etc. selected may cause information presented in the advertising window 2135 to be modified. More than one advertisement window 2135 may be included in the GUI 2300.

The game information indicators 2340 may present information regarding types of information associated with a game(s). The 'Game Topic' game information indicator 2340a may indicate a category. A left-click on the 'Game Topic' game information indicator 2340a may sort games in the game information window 2365 by categories associated with the game. A right-click on the 'Game Topic' game information indicator 2340a may present a drop-down list of categories. The 'Skill Level' game information indicator 2340b may indicate a skill. A left-click on the 'Skill Level' game information indicator 2340b may sort games in the game information window 2365 by skill level associated with the game. A right-click on the 'Skill Level' game information indicator 2340b may present a drop-down list of skill levels. The 'Players' game information indicator 2340c may indicate a number of participants in a game. A left-click on the 'Players' game information indicator 2340c may sort games in the game information window 2365 by number of participants associated with the game. A right-click on the 'Players' game information indicator 2340c may present a drop-down list. Any number of game information indicators 2340 may be provided in the GUI 2300, and it may be possible to add and/or remove game information indicators 2340. For example a 'type' indicator (comparative, good/bad, comparison, etc.) might be provided as a game information indicator 2340.

The recent game display 2345 may be used to indicate information of games which have been played recently. Any type of information associated with a game may be presented in the recent game display 2345. The recent game selection controls 2347 may indicate recently played games, and may be activated to provide information regarding games. For example the '+' indicator in the game selection indicators might expand the information displayed in the recent game display 2345. Activation of a recent game selection control may cause games with similar characteristics to be displayed in the game information window 2365. Activation of the 'Sports' game selection control 2347a may take a user directly to a game related to the topic 'Sports'. Activation of the 'Entertainment>Movies' game selection control 2347b may take a user directly to a game related to the topic 'Entertainment>Movies'. Activation of the 'Sports>Baseball' game selection control 2347c may take a user directly to a game related to the topic 'Sports>Baseball'. Activation of the 'Manage Your Games' game selection control 2347d may cause a GUI for editing and/or reviewing a game usage history to be provided.

The action buttons 2355 may be used to take actions regarding information indicated in the GUI 2300. The 'Go to Game' action button 2355a may be used to activate a game GUI such as the GUI 2400 illustrated in FIG. 22 associated with a selected game selection control 2360. For example if the game selection indicator 2360b is selected, activation of the 'Go to Game' action button 2355a might present a GUI such as the GUI 2400 (FIG. 22) associated with the category 'Sports>Baseball' at the 'Expert' level of skill. The action button 2355b may be used to view information of players associated with a game selection indicator 2360. For example, if the game selection indicator 2360c is selected, activation of the action button 2355b may cause a list of players associated with the game indicated in the game selection indicator 2360c to be displayed. Any number of action buttons 2355 may be included in the GUI 2300.

The game selection controls 2360 may be used to select a game associated with a game selection control 2360. For example, the game selection control 2360a may be used to select the 'Novice' level game associated with 'Sports>Football', a 'left' click might select the game selection indicator 2360a and a 'double' click might cause a GUI such as the GUI 2400 (FIG. 21) associated with the 'Sports>Football' category at the 'Novice' skill level to be presented. Likewise, the game selection indicator 2360c may be used to select the 'Novice' level game associated with the category 'Entertainment>Dining>Indianapolis', a left-click might select the game selection indicator 2360c and a double click might cause a GUI such as the GUI 2400 (FIG. 24) associated with the "Entertainment>Dining>Indianapolis' category at the 'Novice' skill level to be presented. The navigation controls 2370 may be used to navigate within the game information window 2365.

Figure 22:
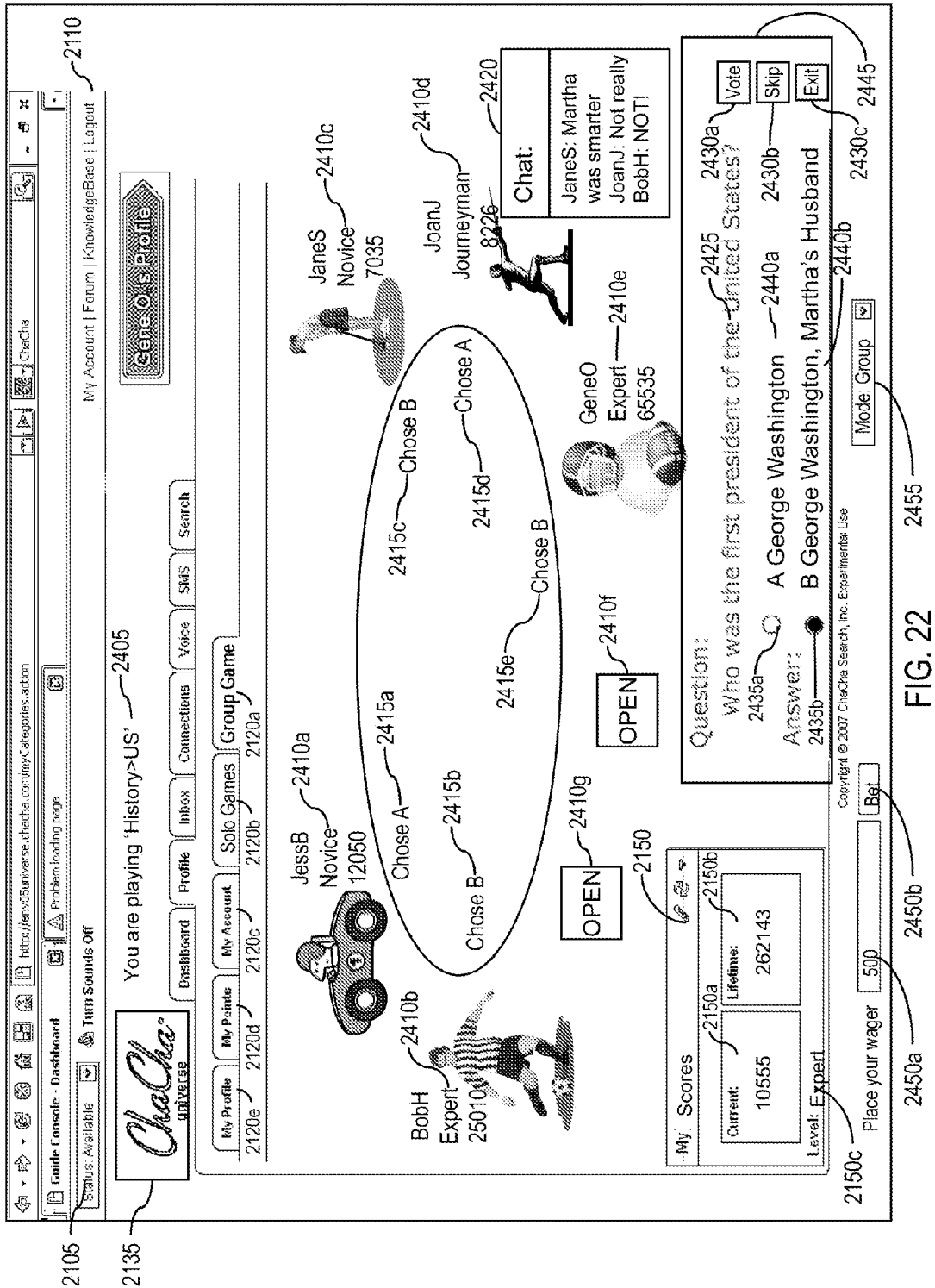
FIG. 22 illustrates a GUI.

As illustrated in FIG. 22, an exemplary GUI is provided for participation in a multi player game is provided. The GUI 2400 includes an availability selection control 2105, a logoff control 2110, an activity selection tabs 2120, an advertisement window 2135, a scoreboard indicator 2150, a game information indicator 2405, a player indicator 2410 a player selection indicator 2415, a chat window 2420, player voting window 2445, a reference item indicator 2425, voting controls 2435, a review item indicator 2440, action controls 2430, wagering controls 2450, and a mode selector 2455. The GUI 2400 may be used to participate in a game(s) which may be played as a multi-player activity.

The function of the availability selection control 2105, logoff control 2110, activity selection tabs 2120, scoreboard indicator 2150, and the advertisement window 2135 were previously explained with respect to FIG. 19.

The game information indicator 2405 may be used to present information associated with a game. For example, the topic of a game, time information, usage information, or any other information related to players, games, or other status may be presented in the game information indicator 2405.

The player indicator 2410 may indicate information associated with players participating in a multi-player game. For example a 'handle' associated with a user, an image or avatar, a skill level, a number of points, etc. might be presented in a player indicator 2410. The player indicator 2410*a* may indicate the player 'JessB' at the 'Novice' skill level. The player indicator 2410*b* may indicate the player 'BobH' at the 'Expert' skill level. The player indicator 2410*c* may indicate the player 'JaneS' at the 'Novice' skill level. The player indicator 2410*d* may indicate the player 'JoanJ' at the 'Journeyman' skill level. The player indicator 2410*e* may indicate the player 'GeneO' at the 'Expert' skill level. The player indicator 2410*f* and 2410*g* may indicate that a vacant space exists and that new players may join the game.

The player selection indicator 2415 may indicate information associated with a selection made by players participating in a multi-player game. For example a letter indicated in a review item indicator 2440 may be displayed once all players have registered an opinion using a control such as the action buttons 2430. The player selection indicator 2415*a* may indicate the player 'JessB' selected review item A. The player selection indicator 2415*b* may indicate the player 'BobH' selected review item B. The player selection indicator 2415*c* may indicate the player 'JaneS' selected review item B. The player selection indicator 2415*d* may indicate the player 'JoanJ' selected review item A. The player selection indicator 2415*e* may indicate the player 'GeneO' selected review item B. Automated responses based on information stored in and/or derived from the database 120 (FIG. 1) may be presented using a player indicator and a player selection indicator. For example, responses associated with a solo session may be presented using a player indicator 2410 and a player selection indicator 2415.

The chat window 2420 may be used to allow players participating in a multi-player game to exchange messages via a 'chat' function.

The player voting window 2445 may display a GUI such as the GUI 2200 (FIG. 20A), 2250 (FIG. 20B), 2275 (FIG. 20C) or any other voting GUI. Information presented in the player voting window 2445 may be presented to any or all players.

The reference item indicator 2425 may include information associated with a reference item. While a text display is used as the reference item indicator 2425 for the purposes of illustration in FIG. 22, any type of media and/or information associated with a reference item might be presented. For example, an image(s), an audio clip(s), a hyperlink(s) and/or other types of information associated with a reference item might be included in the reference item indicator 2425. The reference item indicator 2425 indicates that the query 'Who was the first president of the United States?' is the reference item presented in the player voting window 2445.

The review item indicator 2440 may include information associated with a review item. While a text display is used as the review item indicator 2440 for the purposes of illustration in FIG. 22, any type of media and/or information associated with a review item might be presented. For example, an image(s), an audio clip(s), a hyperlink(s) and/or other types of information associated with a review item might be included in the review item indicator 2440. The review item indicator 2440*a* indicates that 'A George Washington' is associated with a first review item. The review item indicator 2440*b* indicates that 'B George Washington, Martha's husband' is associated with a second review item. Any or all information indicated in a review item indicator may be presented in a player selection indicator 2415 to indicate a selection made.

The voting controls 2435 may be used to indicate an opinion regarding a review item. Using the example in FIG. 22, the voting controls 2435 are mutually exclusive. A user may select exactly one voting control to register an opinion regarding each review item indicated in the review item information indicator 2425. The voting control 2435*a* allows a user to register a positive opinion regarding a review item indicated in the review item indicator 2440*a*. The voting control 2435*b* allows a user to register a positive opinion regarding a review item indicated in the review item indicator 2440*b*. A vote may be indicated by for example clicking on a voting control which may cause an indicator such as a filled dot such as that indicated in the voting control 2435*b* to be displayed. While a particular example of a voting GUI has been used for the purposes of illustration in FIG. 22, no limitation is implied thereby.

The action controls 2430 may be used to take actions regarding information obtained using the GUI 2400. The 'Vote' action control 2430*a* may be used to indicate that opinions indicated in the GUI 2400 are to be recorded. The 'Skip' action control 2430*b* may be used to indicate that a review item is to be skipped without voting. The 'Exit' action control 2430*c* may be used to indicate that a game session or voting session is to be terminated. Activation of the action control 2430*c* may close the GUI 2400 and return to a GUI such as the GUI 2300 (FIG. 21).

The wagering controls 2450 may be used to modify a number of points which may be awarded to and/or lost by a player based on the outcome of a game. For example, a player might be allowed to increase or decrease a number of points wagered on an outcome, such as whether the player will agree with other players, will agree with an expert, and any other type of outcome. The wagering control 2450*a*, the 'Place your wager' box, may be a text box and/or other numeric entry interface which may allow a player to designate a number of points. The wagering control 2450*b*, the 'Bet' button, may be used to confirm a wager. While a simple set of wagering controls is illustrated in the example in FIG. 22, more complex types of wagering controls might be provided for various types of wagers, such as side-bets on the success or failure of other players, matching with other player's opinions, etc. within the scope of the disclosure herein. Likewise, the GUI 2400 might allow a player not participating in a game to make wagers on various outcomes.

The mode control 2455 may be used to change the mode of the game being played. For example, a player might elect to play against an expert opinion, a consensus opinion of various groups, a consensus of the players identified in the GUI 2400, a majority of voters who have voted regarding an item(s), any other type of reference group, such as only 'Novice' players, or players from a geographic region, or players who fit a profile of any sort. The mode control 2455 may be implemented as a drop-down list, or other interface which may be used to designate a type of game.

Figure 23:
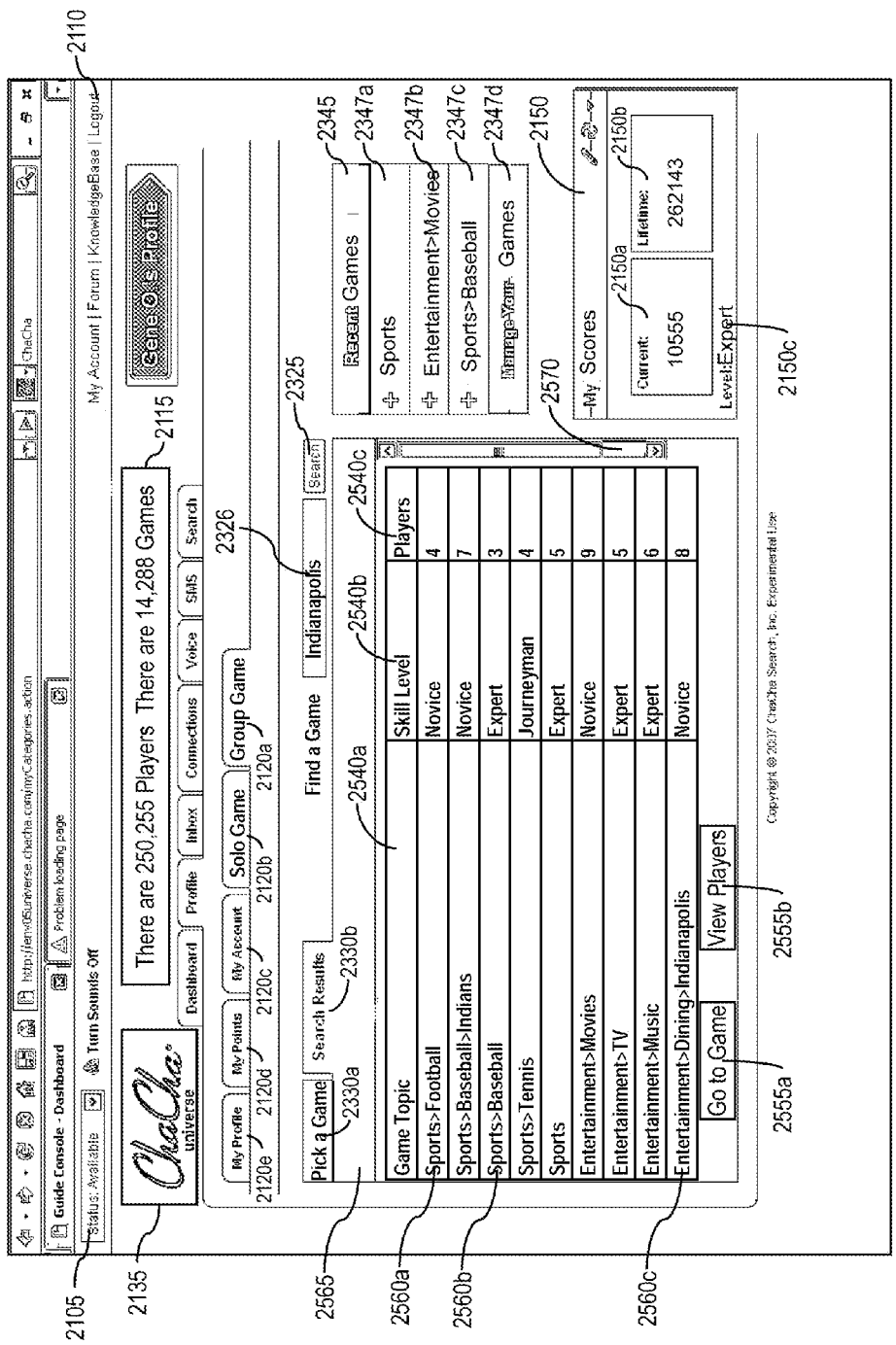
FIG. 23 illustrates a GUI.

As illustrated in FIG. 23, an exemplary GUI is provided for selection of a multi player game associated with a category, topic, word, phrase, or any combination thereof. The GUI 2500 includes availability selection control 2105, logoff control 2110, game information indicator 2115, activity selection tabs 2120, search button 2325, search box 2326, game location tabs 2330, advertisement window 2135, game information indicators 2540, recent game display 2345, recent game selection controls 2347, scoreboard indicator 2150, action buttons 2555, game selection controls 2560, game information window 2565, and navigation controls 2570. The GUI 2500 may be used to select a game(s) which may be played as a multi-player activity. Games may be selected using filtering criteria. For example, games may be selected by entering and/or selecting a topic, keyword, category, etc or based on a skill level, or any other information which may be associated with a game. For example, games might be associated with an affiliate group, a profile, etc. A profile might include information such as a time interval, geographic location, personality characteristics, or any other item(s). Selections available may be based on information associated with a person(s). For example, some games may be available only to persons associated with an item, or with a set of skills, etc.

The function of the availability selection control 2105, logoff control 2110 game information indicator 2115, activity selection tabs 2120, scoreboard indicator 2150, the advertisement window 2135 and the scoreboard indicator 2150 were previously explained with respect to FIG. 19. The function of the search button 2325, search box 2326, game location tabs 2330, recent game display 2345, and recent game selection controls 2347 were previously explained with respect to FIG. 21.

The content of the game information window 2565 may be based on the results of a search performed responsive to a search term entered in the search box 2326 and executed using the search button 2325. Using the example illustrated in FIG. 23, the search term 'Indianapolis' has been entered in the search box 2326. The game information indicators 2560 displayed in the game information window 2565 may indicate that the term 'Indianapolis' is associated with games indicated in the game information indicators.

The game information indicators 2540 may present information regarding types of information associated with a game(s). The 'Game Topic' game information indicator 2540a may indicate a category. A left-click on the 'Game Topic' game information indicator 2540a may sort games in the game information window 2565 by categories associated with the game. A right-click on the 'Game Topic' game information indicator 2540a may present a drop-down list of categories. The 'Skill Level' game information indicator 2540b may indicate a skill. A left-click on the 'Skill Level' game information indicator 2540b may sort games in the game information window 2565 by skill level associated with the game. A right-click on the 'Skill Level' game information indicator 2540b may present a drop-down list of skill levels. The 'Players' game information indicator 2540c may indicate a number of participants in a game. A left-click on the 'Players' game information indicator 2540c may sort games in the game information window 2365 by number of participants associated with the game. A right-click on the 'Players' game information indicator 2540c may present a drop-down list. Any number of game information indicators 2540 may be provided in the GUI 2300, and it may be possible to add and/or remove game information indicators 2540. For example a 'type' indicator (comparative, good/bad, comparison, etc.) might be provided as a game information indicator 2540.

The action buttons 2555 may be used to take actions regarding information indicated in the GUI 2300. The 'Go to Game' action button 2555a may be used to activate a game GUI such as the GUI 2400 illustrated in FIG. 22 associated with a selected game selection control 2560. For example if the game selection indicator 2560b is selected, activation of the 'Go to Game' action button 2555a might present a GUI such as the GUI 2400 (FIG. 22) associated with the category 'Sports>Baseball' at the 'Expert' level of skill. The action button 2555b may be used to view information of players associated with a game selection indicator 2560. For example, if the game selection indicator 2560c is selected, activation of the action button 2555b may cause a list of players associated with the game indicated in the game selection indicator 2560c to be displayed. Any number of action buttons 2555 may be included in the GUI 2300.

The game selection controls 2560 may be used to select a game associated with a game selection control 2560. For example, the game selection control 2560a may be used to select the 'Novice' level game associated with 'Sports>Football', a 'left' click might select the game selection indicator 2560a and a 'double' click might cause a GUI such as the GUI 2400 (FIG. 21) associated with the 'Sports>Football' category at the 'Expert' skill level to be presented. Likewise, the game selection indicator 2560c may be used to select the 'Novice' level game associated with the category 'Entertainment>Dining>lndianapolis', a left-click might select the game selection indicator 2560c and a double click might cause a GUI such as the GUI 2400 (FIG. 24) associated with the "Entertainment>Dining>Indianapolis' category at the 'Novice' skill level to be presented. The navigation controls 2570 may be used to navigate within the game information window 2565.

While the GUIs described herein have been described using specific examples of interface elements, no limitation is implied thereby other interface elements which may accomplish the functionalities which are well known in the art may be used without departing from the scope and spirit of the embodiments herein. Any or all of the elements of the GUIs described herein may be suppressed as needed to operate the embodiments.

Using the GUIs described herein, a voting and review activities may be selected and presented as a form of entertainment, which may increase participation and may improve utilization of resources associated with a search system. Advertisements may be presented to players in the games based on contextual information such as a topic, category, profile, or other information associated with reference items and/or review items presented as part of the gaming experience.

While specific examples of games which might be provided to reviewers have been presented, no limitation is implied thereby. Additional games which might involve other forms of cooperation and/or competition might be implemented. A gaming activity may be an uncompensated activity, or may be a compensated activity in which 'points' may be converted into some form of compensation. The way in which points are converted to compensation is not limited to a particular process.

A framework is provided whereby information may be persisted in the database 120 (FIG. 1) which is independent of the form of game and/or review which is used to produce the information. For example, rating and/or ranking of a review item(s) may be associated with information which may be passed back and forth to software and/or a system which implements a game using a defined data structure which is independent of the game application. Likewise, a rating of a guide may be independent of the types of games played. For example, a guide might play multiple games which affected rating information associated with the guide or rating information of a guide might be based on information obtained with a game(s) and rating information of another guide might be based on information obtained using the same game(s) or a different game(s). Using this process, a guide may have a rating which is not dependent on any particular activity, but is linked to information associated with the guide which is persisted.

A review item such as a search result, or a resource, etc. is associated with persistent information which identifies the status of the review item. For example, if an answer is identified as a 'best' answer to a query, that information is persisted after a review session has been completed. Usage of a review item may be based on the persistent information associated with the review item. Multiple review sessions may be used to determine information associated with a review item.

A method and system for reviewing or vetting an item(s) associated with a reference item is described. A voter or reviewer may have a vote weight which is determined based on a voting history associated with the voter. A group of one or more reference voters, who may have a higher vote weight, is identified. A rating function is computed based on a comparison of votes associated with a voter to votes associated with a reference voter(s) and/or other voters. A group of voters may be determined based on the value of a rating function associated with the voters. A vote weight is assigned to a voter based on the value of a rating function associated with the voter. A vote weight and/or a rating function may be associated with an item(s) associated with a voter, such as a keyword(s), a category(ies), a profile(s), a tag(s), a topic(s), etc. which may be used to select a voter(s).

Voting by guides may be used to determine the ranking of review items such as an answer, a search result, a search resource, a web page, an advertisement, a category, a keyword, a query, etc. which may be associated with a reference item such as a search request, a question, a category, a web page, a profile, etc.

A method and system are described for comparative voting. A voter may be presented with a reference item such as a query or search request, and/or other items and a choice of two or more review items which may be voted on by the voter. A voter is allowed to compare the review items simultaneously and may be allowed to select a limited number of the review items. Review items may be grouped in groups of two or more. A review item which is determined to be a superior result may be required to meet specific criteria to be presented to a user and/or a guide(s) when a reference item is selected. A search result obtained by a human searcher responsive to a search request may be required to be judged superior to one or more other search results in order to be designated as a superior result or 'web gem'. A search result produced by a human searcher responsive to a search request may be required to be rated superior to each of 3 other search results produced responsive to the search request to be considered a Web Gem™.

A method and system are described for determining when human judgment may be required to evaluate a search result(s) or other item(s). For example, if a search request or search query has been submitted more than a number of times, search results associated with the search request may be reviewed by guides and/or users to determine a ranking of search results associated with the search request. If a number of answers associated with a search request exceed a value, the judgment of voters may be used to determine a ranking of the answers. Usage indications of a reference item and/or a review item may be used to determine whether human judgment should be used to review a reference item(s) associated with a review item(s). A review item which has been presented or accessed more than a number of times may be subjected to review and/or voting by a guide(s) and/or a user(s).

Voters may be selected based on ratings associated with a reference item. For example, voters who are located in closer proximity to a location associated with a search request may be preferentially selected to vote regarding answers associated with the search request, or voters may be selected based on a rating(s) associated with a category(ies), a profile(s), a keyword(s), a topic(s), etc. which may be associated with a reference item.

A method for reviewing a search result associated with a search request is described. If a search request has been submitted more than a number of times, a first search result associated with a search request may be presented to a reviewer to determine whether the search result is relevant and if the reviewer determines that the first search result is not relevant, the search request may be presented to a searcher or guide who may obtain a second search result responsive to the search request, which may be compared to the first search result in order to determine whether the first search result or the second search result is more relevant.

Any of the voting methods and/or review methods described herein may be used separately or in conjunction with each other, and may improve the relevance of a search result, an advertisement, a search resource, and/or other items presented responsive to a search request.

The many features and advantages of the claimed invention are apparent from the detailed specification and thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A method of rating review items associated with a reference item, comprising:
    initiating a voting session;
    selecting one or more voters;
    presenting one or more reference items to a voter;
    presenting one or more review items to the voter when determining that an unranked review item is associated with the one or more reference items;
    obtaining voter preferences regarding relevance of the review items to the reference items;
    tabulating voter preferences;
    closing the voting session; and
    rating the review items for the reference item based on the voter preferences.

2. The method of claim 1, comprising:
    weighting the preferences obtained based on a trust level of a voter from whom the preference is obtained.

3. The method of claim 2, wherein the weighting is based on historical preferences of the voter relative to preferences of one or more reference voters.

4. The method of claim 2, wherein the voting session is closed when a predetermined plurality of votes is obtained.

5. The method of claim 3, wherein the one or more reference voters are designated by a system administrator.

6. The method of claim 3, wherein the historical preferences are associated with one or more items associated with a reference item.

7. The method of claim 5, wherein one or more temporary reference voters are determined based on historical preferences of a voter relative to preferences of the one or more reference voters.

8. The method of claim 1, wherein said one or more voters are searchers associated with the reference item.

9. The method of claim 1, wherein said one or more voters are selected based on ratings associated with the reference item.

10. The method of claim 1, wherein a review item includes one or more of an answer, a web page, an advertisement, a search resource, a category, a keyword, a search request, a query, and a profile.

11. The method of claim 1, wherein a reference item includes one or more of an answer, a web page, an advertisement, a search resource, a category, a keyword, a search request, a query, and a profile.

12. The method of claim 1, wherein a searcher associated with an index item linked to the reference item recommends a review item by performing an information search responsive to the reference item.

13. The method of claim 1, wherein said one or more voters are compensated for registering a preference.

14. The method of claim 13, wherein compensation is weighted.

15. A method of rating review items associated with a reference item based upon voting, comprising:
opening a voting session;
presenting a simultaneous comparison of two or more review items to a voter when determining that an unranked review item is associated with a reference item;
presenting the reference item to the voter;
obtaining a relevancy preference indication from the voter;
closing the voting session; and
rating relevance of the review items to the reference item based on an outcome of one or more voting sessions.

16. The method of claim 15, wherein the voter is selected based on a ranking of the voter based on one or more index items associated with the reference item and said review items.

17. The method of claim 15, wherein an unrated review item is compared to a review item which is rated with respect to the reference item.

18. The method of claim 15, wherein the review item is one or more of an answer, a web page, an advertisement, a search resource, a category, and a profile.

19. The method of claim 15, wherein the reference item is one or more of a search query, a web page, an advertisement, a search resource, a category, a location, and a profile.

20. The method of claim 15, wherein the voters are searchers associated with an index item linked to the reference item.

21. The method of claim 15, wherein the voting session compares an unranked review item to a predetermined number of rated review items selected based on a rating assigned to the rated review items.

22. The method of claim 15, wherein an unranked review item is compared to a next higher ranked review item until the unranked review item is determined to be inferior to the next higher ranked review item or to be a highest ranked review item.

23. The method of claim 15, comprising:
receiving a search request matching the reference item; and
presenting a review item based at least in part on the rating of the review item associated with the reference item.

24. A system, comprising:
a voter system providing an opinion regarding a review item associated with a reference item;
a server selecting a reference item, the review item, and the voter system based on a searcher system and tracking voting activities;
the searcher system performing a search for information responsive to the reference item to associate the review item with the reference item; and
a database recording opinion and rating information regarding the review item.

25. An interface component of a computing device comprising:
a plurality of indicators of review items including a review item ranked based on an index item and a reference item and a review item determined to be unranked for the index item and the reference item;
an indicator of the reference item; and
a plurality of opinion controls associated with the plurality of indicators of the review items causing the ranking of the plurality of review items to be modified when activated.

26. An interface component of a computing device comprising:
a plurality of reference item selection controls indicating reference items determined to be associated with an unranked review item;
an election status indicator providing status regarding the reference items;
a plurality of review item opinion controls indicating the unranked review item and a ranked review item of the reference item, receiving input from a voter regarding the review items and modifying a ranking of review items associated with a reference item when activated; and
a voter information selector indicating a status of a voter.

27. A method of rating review items associated with a reference item comprising:
associating a review item with a reference item;
presenting the review item responsive to a request associated with the reference item;
determining whether the review item has been presented more than a pre-determined number of times;
presenting the review item and the reference item to a reviewer when said determining indicates that the pre-determined number has been exceeded;
determining whether the review item is accepted by the reviewer based on the reference item;
associating an additional review item with the reference item when said determining indicates that the review item is not accepted;
presenting the review items and the reference item to a second reviewer, the second reviewer selecting a preferred review item; and
providing the preferred review item responsive to a subsequent request associated with the reference item.

28. The method of claim 27, wherein the reference item is a query and the review item is an answer produced responsive to the query.

29. The method of claim 28, wherein the reviewer is a searcher associated with one or more items associated with the reference item.

30. The method of claim 28, wherein items associated with the query are one or more of a category, a keyword, a profile, and a search query.

31. A method of rating review items associated with a reference item, comprising:

associating a number of review items with a topic reference item;

determining whether the number of review items associated with the topic reference item is greater than a predetermined value;

presenting pairs of the review items and the topic reference item to one or more reviewers;

obtaining information from the one or more reviewers of a preferred review item in the pairs; and determining a ranking of the review items for the topic reference item based on the preferred review item.

32. The method of claim 31, wherein the topic reference item is a query and the review items are answers produced by a search by a human searcher responsive to the query.

33. The method of claim 32, wherein the reviewer is a second searcher associated with one or more items associated with the query.

34. The method of claim 33, wherein the one or more items associated with the query are one or more of a category, a keyword, a profile, and a search query.

35. A user interface component of a computing device, comprising:

an indicator of a reference item;

an indicator of one or more review items including a review item unranked for the reference item or a review item ranked for the reference item when determining that the unranked review item is associated with the reference item; and voting controls for indicating an opinion regarding pertinence of the review items to the reference item, the voting controls causing a ranking of the review items associated with the reference item to be adjusted when activated.

36. The user interface component of claim 35, wherein the indicators comprise one or more of a URL, text, an image, audio, and video.

37. The user interface component of claim 35, comprising:

an indicator of at least one other opinion regarding the one or more review items.

38. The user interface component of claim 35, comprising:

an interface for placing a wager on the pertinence of the one or more review items;

a chat interface;

an indicator of one or more voters; and an indicator of a score associated with the wager.

39. A method, comprising:

ranking, by a processor, relevance of a review item when determining that the review item is an unranked review item associated with a first search query;

receiving, by the processor, a vote of at least one human searcher;

presenting, to the at least one human searcher, the first search query, a review item ranked for the first search query and the review item; and providing the review items responsive to a second search query in an order based on the ranking when determining that the second search query matches the first search query.

40. The method of claim 39, wherein said review items comprise one or more of a search result, a search resource, and an advertisement.

41. The method of claim 39, wherein of said review items, review items ranked high are determined to be most relevant for said second search query.

42. A method of improving relevance of search results, comprising:

determining whether an unranked review item has been associated with a reference item;

receiving, by a processor, a vote of a human searcher, regarding relevance of a ranked review item and the unranked review item to a reference item presented to the human searcher;

selecting, by the processor, the human searcher based on a ranking of the human searcher associated with the reference item;

modifying a ranking of the ranked review item for the reference item based on the vote; and presenting the review items responsive to a search request matching the reference item in an order based on the ranking.

43. A computer-readable storage medium having a program recorded therein for causing a computer to execute operations improving relevance of search results, comprising:

determining whether an unranked review item has been associated with a reference item;

receiving a vote of a human searcher regarding relevance of a ranked review item and the unranked review item to a reference item presented to the human searcher;

selecting the human searcher based on a ranking of the human searcher associated with the reference item;

modifying a ranking of the ranked review item for the reference item based on the vote; and presenting the review items responsive to a search request matching the reference item in an order based on the ranking.

44. The computer-readable storage medium of claim 43, wherein the operations executed comprise:

selecting one or more of a search result, a search resource, and an advertisement as the reference item, the ranked review item, or the unranked review item.

45. The computer-readable storage medium of claim 43, wherein the operations executed comprise:

weighting the vote based on the ranking of the searcher.

46. The computer-readable storage medium of claim 43, wherein the operations executed comprise:

receiving a plurality of votes cast by human searchers, and notifying the human searchers to vote in an order based on availability of the human searchers.

* * * * *